United States Patent
Merlin et al.

(10) Patent No.: US 12,126,416 B2
(45) Date of Patent: *Oct. 22, 2024

(54) SOUNDING OPERATIONS FOR RADIO-FREQUENCY (RF) SENSING

(71) Applicant: QUALCOMM Incorporated, San Diego, CA (US)

(72) Inventors: Simone Merlin, San Diego, CA (US); Alireza Raissinia, Monte Sereno, CA (US); Bin Tian, San Diego, CA (US); Xiaoxin Zhang, Sunnyvale, CA (US); Solomon Trainin, Haifa (IL); Assaf Yaakov Kasher, Haifa (IL); Manish Madan, San Jose, CA (US); John Greszczuk, Stow, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,430

(22) Filed: Aug. 18, 2023

(65) Prior Publication Data

US 2024/0048205 A1 Feb. 8, 2024

Related U.S. Application Data

(63) Continuation of application No. 17/238,190, filed on Apr. 22, 2021, now Pat. No. 11,764,847.

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0617* (2013.01); *H04L 5/0053* (2013.01);
(Continued)

(58) Field of Classification Search
None
See application file for complete search history.

(56) References Cited

U.S. PATENT DOCUMENTS

| 11,764,847 B2 * | 9/2023 | Merlin ................. H04B 7/0617 370/329 |
| 2011/0205968 A1 | 8/2011 | Kim et al. |

(Continued)

OTHER PUBLICATIONS

International Search Report and Written Opinion—PCT/US2022/019347—ISA/EPO—Sep. 28, 2022.

(Continued)

*Primary Examiner* — Minh Trang T Nguyen
(74) *Attorney, Agent, or Firm* — Arun Swain

(57) ABSTRACT

This disclosure provides methods, devices and systems for radio frequency (RF) sensing in wireless communication systems. In some implementations, a transmitter device transmits sounding sequences configured for channel estimation over a wireless channel to a receiver device. The transmitter device also transmits or receives non-sounding frames associated with a channel report of the receiver device. The transmitter device transmits a frame soliciting the channel report from the receiver device. The transmitter device receives the channel report, which may include channel state information (CSI) of the wireless channel responsive to at least the sounding sequences. Some types of channel reports may take longer to generate than other types of channel reports. Transmitting or receiving the non-sounding frames during the time period may prevent other devices from accessing the wireless channel when the receiver device needs additional time to generate a certain type of channel report.

30 Claims, 25 Drawing Sheets

(51) Int. Cl.
H04L 25/02 (2006.01)
H04W 74/0816 (2024.01)
H04W 80/02 (2009.01)

(52) U.S. Cl.
CPC ..... *H04L 25/0226* (2013.01); *H04W 74/0816* (2013.01); *H04W 80/02* (2013.01)

(56) References Cited

U.S. PATENT DOCUMENTS

| | | |
|---|---|---|
| 2011/0222472 A1 | 9/2011 | Breit et al. |
| 2016/0197655 A1 | 7/2016 | Lee et al. |
| 2017/0070914 A1 | 3/2017 | Chun et al. |
| 2017/0230155 A1 | 8/2017 | Lee et al. |
| 2019/0165971 A1 | 5/2019 | Manolakos et al. |
| 2020/0169364 A1 | 5/2020 | Hao et al. |
| 2022/0345187 A1 | 10/2022 | Merlin et al. |

OTHER PUBLICATIONS

Partial International Search Report—PCT/US2022/019347—ISA/EPO—Jun. 27, 2022.

* cited by examiner

1400

1402

Transmit, to the receiver device, an indication of the transmit parameters used for transmitting the sounding sequences, where the channel report is further responsive to the indicated transmit parameters.

Exchange sounding parameters with the receiver device, the sounding parameters indicating one or more of a minimum period of time between respective transmissions of the sounding sequences and the frame, a maximum period of time between respective transmissions of the sounding sequences and the frame, a minimum period of time between respective transmissions of the sounding sequences and the channel report, a maximum period of time between respective transmissions of the sounding sequences and the channel report, conditions under which the receiver device is to generate the channel report, or conditions under which the receiver device is to delay transmission of the channel report.

Receive one or more empty frames from the receiver device during the time period.

*Figure 16*

SOUNDING OPERATIONS FOR RADIO-FREQUENCY (RF) SENSING

CROSS-REFERENCE TO RELATED APPLICATIONS

This application is a continuation of U.S. Non-Provisional application Ser. No. 17/238,190, entitled "SOUNDING OPERATIONS FOR RADIO-FREQUENCY (RF) SENSING", filed Apr. 22, 2021, which is hereby incorporated by reference in its entirety as if fully set forth below and for all applicable purposes.

TECHNICAL FIELD

This disclosure relates generally to wireless communication, and more specifically, to sounding techniques for RF sensing in wireless communication systems.

DESCRIPTION OF THE RELATED TECHNOLOGY

Wireless communication devices communicate by transmitting and receiving electromagnetic signals in the radio frequency (RF) spectrum. The operating environment of the wireless communication devices affects the propagation of the electromagnetic signals. For example, electromagnetic signals transmitted by a transmitting device may reflect off objects and surfaces in the environment before reaching a receiving device located a distance away. Accordingly, the amplitudes or phases of the electromagnetic signals received by the receiving device may depend, at least in part, on the characteristics of the environment.

RF sensing is a technique for sensing objects or movement in an environment based, at least in part, on the transmission and reception of electromagnetic signals. More specifically, changes in the environment can be detected based on changes in the electromagnetic signals (such as phase or amplitude) propagating through the environment. For example, a person moving through the environment interferes with the electromagnetic signals that are transmitted by a transmitting device. A receiving device may detect and characterize such changes to its received signals to determine the speed or direction of the person's movement.

The range of applications or accuracy of RF sensing may depend on the amount or detail of information communicated between the transmitting device and the receiving device. Accordingly, a mechanism is needed to facilitate the exchange of information between the transmitting device and the receiving device when performing RF sensing.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by an apparatus of a transmitter device, and may include transmitting sounding sequences over a wireless channel to a receiver device, the sounding sequences configured for obtaining channel state information (CSI) of the wireless channel. The method may include transmitting or receiving one or more non-sounding frames over the wireless channel associated with a channel report of the receiver device. The method may include transmitting a frame soliciting the channel report from the receiver device. The method may include receiving the channel report solicited from the receiver device, the channel report including CSI of the wireless channel responsive to at least the sounding sequences. In some instances, the one or more non-sounding frames may include frames transmitted over the wireless channel by a wireless communication device associated with the transmitter device or the receiver device. In some other instances, the one or more non-sounding frames may include a trigger frame that does not identify the receiver device, a poll frame that does not identify the receiver device, a clear-to-send (CTS) frame, a request-to-send (RTS) trigger frame, a buffer status request poll (BSRP) trigger frame, a bandwidth query report poll (BQRP) frame, a quality of service (QoS) Null frame, or an acknowledgement (ACK) frame.

In some implementations, the method also may include transmitting, to the receiver device, an indication of the transmit parameters used for transmitting the sounding sequences, where the channel report is further responsive to the indicated transmit parameters. The indication of the transmit parameters may be transmitted over the wireless channel in a Null Data Packet Announcement (NDPA), the sounding sequences may be transmitted over the wireless channel in a Null Data Packet (NDP), and the NDPA may indicate a type of channel report requested by the transmitter device. In some instances, the type of channel report may be one of a compressed beamforming report (CBR), a channel report including uncompressed CSI, a channel report including CSI normalized according to the indicated transmit parameters, or a channel report including CSI normalized according to receive parameters used by the receiver device to receive the NDP. In some aspects, the NDP, the frame, and the channel report may be transmitted over the wireless channel during the same transmission opportunity (TXOP). In some other aspects, the NDP may be transmitted over the wireless channel during a first TXOP, and the frame and the channel report may be transmitted over the wireless channel during a second TXOP.

In some other implementations, the indicated type of channel report may include CSI encoded with encoding parameters indicating one or more of a minimum quantization level for the CSI, a maximum quantization level for the CSI, a specified number of bits to be used for encoding each orthogonal frequency division multiplexed (OFDM) tone in the channel report, a subset of OFDM tones to be included in the channel report, a bandwidth allocation, a resource unit (RU) allocation, a tone grouping value, a number of spatial streams, or one or more antenna indexes.

The method also may include exchanging sounding parameters with the receiver device. In some implementations, the sounding parameters may indicate one or more of a minimum period of time between respective transmissions of the sounding sequences and the frame, a maximum period of time between respective transmissions of the sounding sequences and the frame, a minimum period of time between respective transmissions of the sounding sequences and the channel report, a maximum period of time between respective transmissions of the sounding sequences and the channel report, conditions under which the receiver device is to generate the channel report, or conditions under which the receiver device is to delay transmission of the channel report. In some instances, the minimum period of time between respective transmissions of the sounding sequences and the frame may be the same as the minimum period of time between respective transmissions of the sounding sequences and the channel report, and the maximum period of time between respective transmissions of the sounding sequences and the frame may be the same as the maximum period of time between respective transmissions of the sounding sequences and the channel report. In some other implementations, the sounding parameters may permit the receiver device to transmit empty frames responsive to the sounding sequences during the time period. In some aspects, the method also may include receiving one or more empty frames from the receiver device during the time period.

Another innovative aspect of the subject matter described in this disclosure can be implemented in an apparatus of a wireless communication device. The wireless communication device may include a processing system and an interface. In some implementations, the interface may be configured to output sounding sequences over a wireless channel to a receiver device, the sounding sequences configured for obtaining channel state information (CSI) of the wireless channel. The interface may be configured to output or obtain one or more non-sounding frames over the wireless channel associated with a channel report of the receiver device. The interface may be configured to output a frame soliciting the channel report from the receiver device. The interface may be configured to obtain the channel report solicited from the receiver device, the channel report including CSI of the wireless channel responsive to at least the sounding sequences. In some instances, the one or more non-sounding frames transmitted by the transmitter device during the time period include frames transmitted over the wireless channel by a wireless communication device associated with the transmitter device or the receiver device. In some other instances, the one or more non-sounding frames transmitted by the transmitter device during the time period may include a trigger frame that does not identify the receiver device, a poll frame that does not identify the receiver device, a clear-to-send (CTS) frame, a request-to-send (RTS) trigger frame, a buffer status request poll (BSRP) trigger frame, a bandwidth query report poll (BQRP) frame, a quality of service (QoS) Null frame, or an acknowledgement (ACK) frame.

In some implementations, the interface may be configured to output, to the receiver device, an indication of the transmit parameters used for transmitting the sounding sequences, where the channel report is further responsive to the indicated transmit parameters. The indication of the transmit parameters may be transmitted over the wireless channel in an NDPA, the sounding sequences may be transmitted over the wireless channel in an NDP, and the NDPA may indicate a type of channel report requested by the transmitter device. In some instances, the type of channel report may be one of a CBR, a channel report including uncompressed CSI, a channel report including CSI normalized according to the indicated transmit parameters, or a channel report including CSI normalized according to receive parameters used by the receiver device to receive the NDP. In some aspects, the NDP, the frame, and the channel report may be transmitted over the wireless channel during the same transmission opportunity (TXOP). In some other aspects, the NDP may be transmitted over the wireless channel during a first TXOP, and the frame and the channel report may be transmitted over the wireless channel during a second TXOP.

In some other implementations, the indicated type of channel report may include CSI encoded with encoding parameters indicating one or more of a minimum quantization level for the CSI, a maximum quantization level for the CSI, a specified number of bits to be used for encoding each orthogonal frequency division multiplexed (OFDM) tone in the channel report, a subset of OFDM tones to be included in the channel report, a bandwidth allocation, a resource unit (RU) allocation, a tone grouping value, a number of spatial streams, or one or more antenna indexes.

The interface also may be configured to output or obtain sounding parameters to or from the receiver device. In some implementations, the sounding parameters may indicate one or more of a minimum period of time between respective transmissions of the sounding sequences and the frame, a maximum period of time between respective transmissions of the sounding sequences and the frame, a minimum period of time between respective transmissions of the sounding sequences and the channel report, a maximum period of time between respective transmissions of the sounding sequences and the channel report, conditions under which the receiver device is to generate the channel report, or conditions under which the receiver device is to delay transmission of the channel report. In some instances, the minimum period of time between respective transmissions of the sounding sequences and the frame may be the same as the minimum period of time between respective transmissions of the sounding sequences and the channel report, and the maximum period of time between respective transmissions of the sounding sequences and the frame may be the same as the maximum period of time between respective transmissions of the sounding sequences and the channel report. In some other implementations, the sounding parameters may permit the receiver device to transmit empty frames responsive to the sounding sequences during the time period. In some aspects, the interface also may be configured to obtain one or more empty frames from the receiver device during the time period.

Another innovative aspect of the subject matter described in this disclosure can be implemented as a method of wireless communication. The method may be performed by an apparatus of a transmitter device, and may include exchanging sounding parameters for a sensing operation on a wireless channel with a receiver device, the sounding parameters indicating a channel report transmission time for the receiver device. The method may include transmitting sounding sequences over the wireless channel to the receiver device, the sounding sequences configured for obtaining channel state information (CSI) of the wireless channel. The method may include receiving, from the receiver device, a channel report sent according to the channel report transmission time, the channel report including CSI of the wireless channel responsive to at least the sounding sequences.

In some implementations, the channel report transmission time may be indicative of a channel report processing time of the receiver device. In some instances, the one or more non-sounding frames may include frames transmitted over the wireless channel by a wireless communication device associated with the transmitter device or the receiver device. In some other instances, the one or more non-sounding frames may include a trigger frame that does not identify the receiver device, a poll frame that does not identify the receiver device, a clear-to-send (CTS) frame, a request-to-send (RTS) trigger frame, a buffer status request poll (BSRP) trigger frame, a bandwidth query report poll (BQRP) frame, a quality of service (QoS) Null frame, or an acknowledgement (ACK) frame.

In some implementations, the method also may include transmitting, to the receiver device, an indication of the transmit parameters used for transmitting the sounding sequences, where the channel report is further responsive to the indicated transmit parameters. The indication of the transmit parameters may be transmitted over the wireless channel in an NDPA, the sounding sequences may be transmitted over the wireless channel in an NDP, and the NDPA may indicate a type of channel report requested by the transmitter device. The NDPA also may indicate whether the receiver device is to use the indicated transmit parameters when generating the channel report. In some instances, the type of channel report may be one of a CBR, a channel report including uncompressed CSI, a channel report including CSI normalized according to the indicated transmit parameters, or a channel report including CSI normalized according to receive parameters used by the receiver device to receive the NDP. In some aspects, the NDP and the channel report may be transmitted over the wireless channel during the same TXOP. In some other aspects, the NDP may be transmitted over the wireless channel during a first TXOP, and the channel report may be transmitted over the wireless channel during a second TXOP.

In some other implementations, the indicated type of channel report may include CSI encoded with encoding parameters indicating one or more of a minimum quantization level for the CSI, a maximum quantization level for the CSI, a specified number of bits to be used for encoding each orthogonal frequency division multiplexed (OFDM) tone in the channel report, a subset of OFDM tones to be included in the channel report, a bandwidth allocation, a resource unit (RU) allocation, a tone grouping value, a number of spatial streams, or one or more antenna indexes.

The method also may include transmitting, to the receiver device at a time indicated by the sounding parameters, a frame soliciting the channel report. In some implementations, transmissions of the NDP, the frame, and the channel report may be scheduled in an availability window on the wireless channel. In some instances, a duration of the availability window may correspond to a channel report processing time of the receiver device.

In some implementations, the sounding parameters also may indicate one or more of a minimum period of time between respective transmissions of the sounding sequences and the channel report, a maximum period of time between respective transmissions of the sounding sequences and the channel report, conditions under which the receiver device is to generate the channel report, or conditions under which the receiver device is to delay transmission of the channel report.

Another innovative aspect of the subject matter described in this disclosure can be implemented in an apparatus of a wireless communication device. The wireless communication device may include a processing system and an interface. In some implementations, the interface may be configured to obtain or output sounding parameters for a sensing operation on a wireless channel with a receiver device, the sounding parameters indicating a channel report transmission time for the receiver device. The interface may be configured to output sounding sequences over the wireless channel to the receiver device, the sounding sequences configured for obtaining channel state information (CSI) of the wireless channel. The interface may be configured to obtain, from the receiver device, a channel report sent according to the channel report transmission time, the channel report including CSI of the wireless channel responsive to at least the sounding sequences.

In some implementations, the channel report transmission time may be indicative of a channel report processing time of the receiver device. In some instances, the one or more non-sounding frames may include frames transmitted over the wireless channel by a wireless communication device associated with the transmitter device or the receiver device.

In some other instances, the one or more non-sounding frames may include a trigger frame that does not identify the receiver device, a poll frame that does not identify the receiver device, a clear-to-send (CTS) frame, a request-to-send (RTS) trigger frame, a buffer status request poll (BSRP) trigger frame, a bandwidth query report poll (BQRP) frame, a quality of service (QoS) Null frame, or an acknowledgement (ACK) frame.

In some implementations, the interface also may be configured to output, to the receiver device, an indication of the transmit parameters used for transmitting the sounding sequences, where the channel report is further responsive to the indicated transmit parameters. The indication of the transmit parameters may be transmitted over the wireless channel in an NDPA, the sounding sequences may be transmitted over the wireless channel in an NDP, and the NDPA may indicate a type of channel report requested by the transmitter device. The NDPA also may indicate whether the receiver device is to use the indicated transmit parameters when generating the channel report. In some instances, the type of channel report may be one of a CBR, a channel report including uncompressed CSI, a channel report including CSI normalized according to the indicated transmit parameters, or a channel report including CSI normalized according to receive parameters used by the receiver device to receive the NDP. In some aspects, the NDP and the channel report may be transmitted over the wireless channel during the same TXOP. In some other aspects, the NDP may be transmitted over the wireless channel during a first TXOP, and the channel report may be transmitted over the wireless channel during a second TXOP.

In some other implementations, the indicated type of channel report may include CSI encoded with encoding parameters indicating one or more of a minimum quantization level for the CSI, a maximum quantization level for the CSI, a specified number of bits to be used for encoding each orthogonal frequency division multiplexed (OFDM) tone in the channel report, a subset of OFDM tones to be included in the channel report, a bandwidth allocation, a resource unit (RU) allocation, a tone grouping value, a number of spatial streams, or one or more antenna indexes.

The interface also may be configured to output, to the receiver device at a time indicated by the sounding parameters, a frame soliciting the channel report. In some implementations, transmissions of the NDP, the frame, and the channel report may be scheduled in an availability window on the wireless channel. In some instances, a duration of the availability window may correspond to a channel report processing time of the receiver device.

In some implementations, the sounding parameters also may indicate one or more of a minimum period of time between respective transmissions of the sounding sequences and the channel report, a maximum period of time between respective transmissions of the sounding sequences and the channel report, conditions under which the receiver device is to generate the channel report, or conditions under which the receiver device is to delay transmission of the channel report.

Details of one or more implementations of the subject matter described in this disclosure are set forth in the accompanying drawings and the description herein. Other features, aspects, and advantages will become apparent from the description, the drawings and the claims. Note that the relative dimensions of the following figures may not be drawn to scale.

BRIEF DESCRIPTION OF THE DRAWINGS

FIG. 14 shows a flowchart illustrating an example operation for wireless sensing that supports explicit channel sounding.

FIG. 15 shows a flowchart illustrating an example operation for wireless sensing that supports explicit channel sounding.

FIG. 16 shows a flowchart illustrating an example operation for wireless sensing that supports explicit channel sounding.

Like reference numbers and designations in the various drawings indicate like elements.

DETAILED DESCRIPTION

Figure 1:
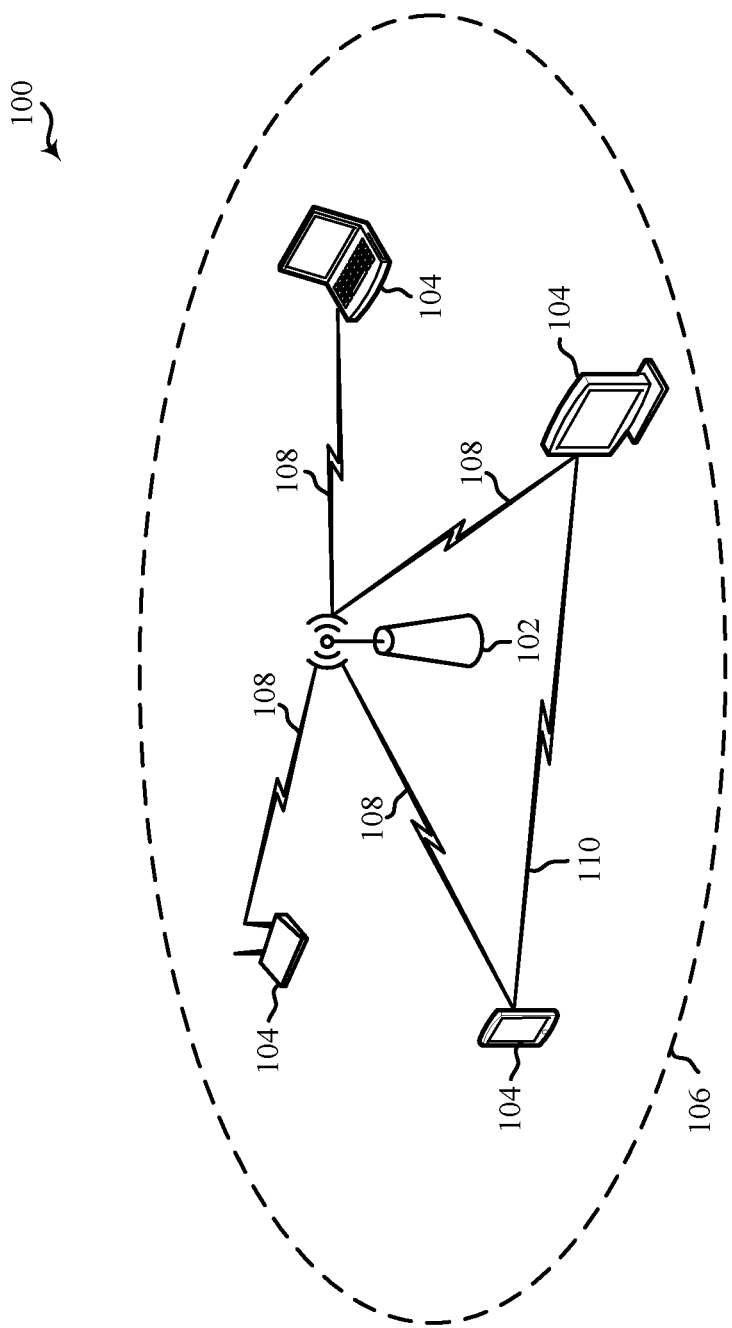
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to RF sensing in wireless communication systems. Some implementations more specifically relate to using signaling techniques and packet formats conforming to the IEEE 802.11 family of standards for performing RF sensing by one or more communication devices. A WLAN may be formed by one or more access points (APs) that provide a shared wireless communication medium for use by a number of client devices also referred to as stations (STAs). The basic building block of a WLAN conforming to the IEEE 802.11 family of standards is a Basic Service Set (BSS), which is managed by an AP. Each BSS is identified by a Basic Service Set Identifier (BSSID) that is advertised by the AP. Wireless communication devices (such as APs and STAs) communicate by transmitting and receiving electromagnetic signals in the RF spectrum. Electromagnetic signals transmitted by a transmitting device may reflect off objects and surfaces along the transmission path before reaching a receiving device located a distance away. The electromagnetic signals also may carry information and data that can be used by the receiving device to measure the wireless channel. Accordingly, signaling techniques conforming to the IEEE 802.11 family of standards may be well-suited for RF sensing.

A wireless communication network conforming to the IEEE 802.11 family of standards (such as a WLAN) may be used to implement an RF sensing system. A transmitter device may transmit sounding sequences over a wireless channel to a receiver device. The sounding sequences may be configured for obtaining channel state information (CSI) of the wireless channel. The receiver device may obtain the CSI of the wireless channel based on the received sounding sequences, and generate a channel report based at least in part on the sounding sequences. The channel report may indicate changes to the wireless channel which, in turn, may be used to sense objects in the vicinity of the transmitting device or the receiving device. In some instances, the channel report may include CSI responsive to the sounding sequences and to the transmit parameters used for transmitting the sounding sequences over the wireless channel. In some other instances, the channel report may include CSI responsive to the sounding sequences and to the receive parameters used for receiving the sounding sequences from the transmitter device.

Some types of channel reports may take longer to generate than other types of channel reports. For example, a first type of channel report that includes CSI responsive to sounding sequences and the transmit parameters used for transmitting the sounding sequences may take longer to generate than a second type of channel report that includes CSI responsive only to the sounding sequences. When the time needed by a receiver device to generate a specific type of channel report exceeds a threshold amount, the channel report may not be ready for transmission when requested by a transmitter device. The resulting time delay may preclude the use of conventional sounding exchanges.

Implementations of the subject matter disclosed herein may be used to provide the receiver device with additional time to generate certain types of channel reports. In some implementations, the transmitter device may send an indication of the requested type of channel report and an indication of the transmit parameters used for transmitting sounding sequences to the receiver device. During a time period associated with a channel report processing time of the receiver device, one of the transmitter device or the receiver device transmits non-sounding frames over the wireless channel. The non-sounding frames may prevent other devices from accessing the wireless channel while the receiver device generates the channel report. After expiration of the time period, the transmitter device solicits the channel report from the receiver device. In some instances, the channel report may include CSI responsive to the sounding sequences and the transmit parameters. In some other instances, the channel report may include CSI responsive to the sounding sequences and the receive parameters of the receiver device.

In some other implementations, the transmitter device and the receiver device may exchange or negotiate sounding parameters for sensing operations on the wireless channel. In some instances, the sounding parameters may indicate a schedule for transmitting channel reports to the transmitter device. In some other instances, the sounding parameters may indicate a schedule for soliciting channel reports from the receiver device. The transmitter device may transmit sounding sequences over the wireless channel to the receiver device according to the schedule, the sounding sequences configured for obtaining channel state information (CSI) of the wireless channel. The receiver device may generate the channel report, and transmit the channel report to the transmitter device based on the schedule. In some implementations, the schedule may be based on the channel report processing time of the receiver device such that the channel report is not transmitted by the initiator device or solicited by the transmitter device before the channel report is ready.

Particular implementations of the subject matter described in this disclosure can be implemented to realize one or more of the following potential advantages. As discussed, some types of channel reports may take longer to generate by a receiver device than other types of channel reports. In some instances, the time needed for the receiver device to generate a specific type of channel report may be longer than the period of time within which the receiver device is to respond to sounding sequences (such as NDPs) transmitted over the wireless channel by the transmitter device. By providing the receiver device with additional time to generate certain types of channel reports, implementations of the subject matter disclosed herein may ensure that the respective device has enough time to generate any type of channel report prior to its solicitation by or transmission to a requesting device. For example, by maintaining the wireless channel in a busy state while the receiver device generates channel reports, some sensing operations disclosed herein may prevent other devices from accessing the wireless channel while the receiver device generates the channel reports. For another example, by scheduling the transmission of sounding sequences or the transmission of channel reports (or both) over the wireless channel at periodic times or intervals, other sensing operations disclosed herein may prevent other devices from accessing the wireless channel while the receiver device generates the channel reports.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, 802.11be and 802.11bf, in addition to further amendments). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba, 802.11be and 802.11bf). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described herein). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
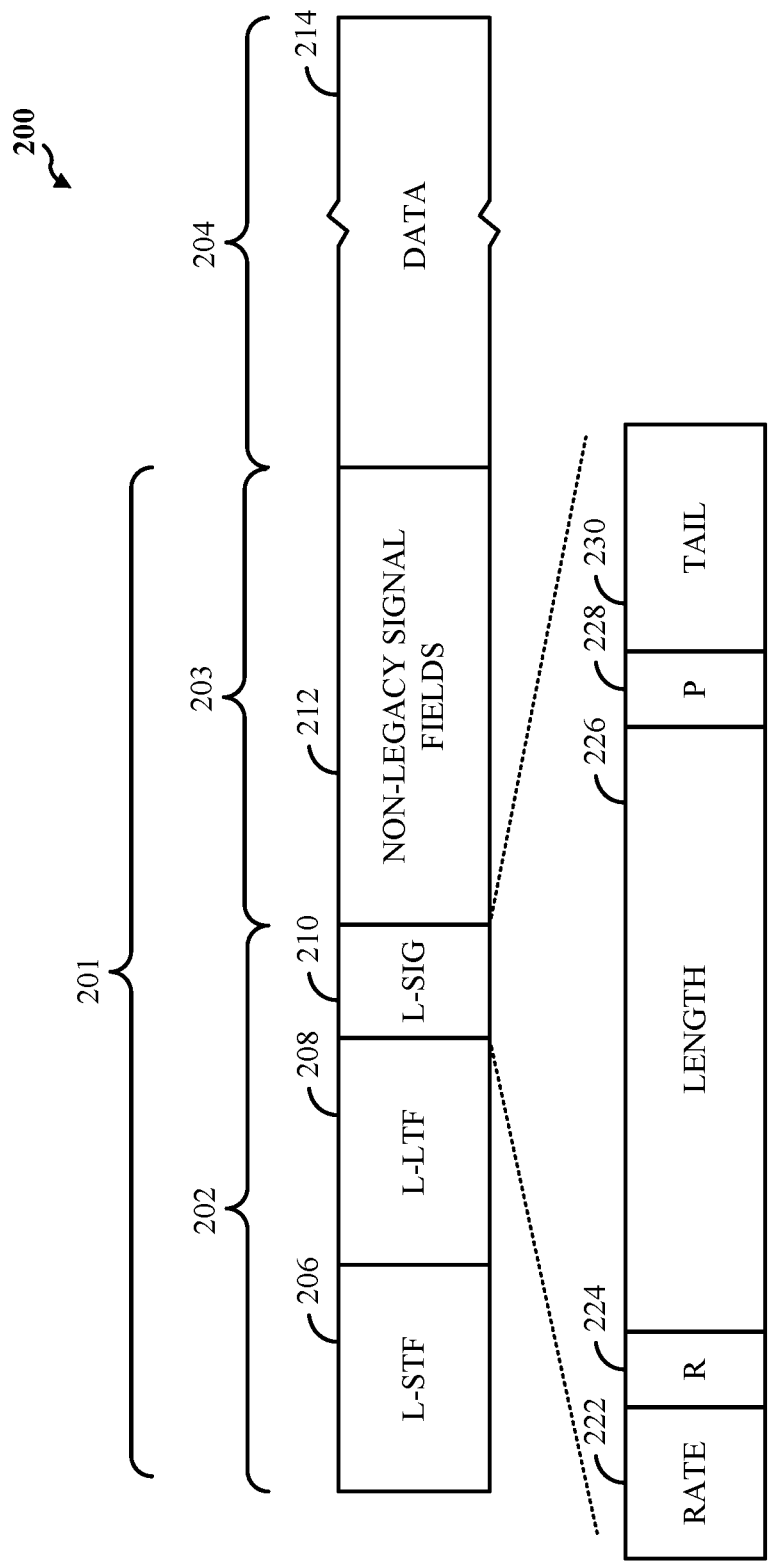
FIG. 2 shows an example protocol data unit (PDU) usable for communications between an access point (AP) and each of a number of stations (STAs).

FIG. 2 shows an example protocol data unit (PDU) 200 usable for wireless communication between an AP and a number of STAs. For example, the PDU 200 can be configured as a PPDU. As shown, the PDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard. The preamble 201 also may include a second portion 203 including one or more non-legacy signal fields 212, for example, conforming to an IEEE wireless communication protocol such as the IEEE 802.11ac, 802.11ax, 802.11be or later wireless communication protocol standards.

L-STF 206 generally enables a receiving device to perform automatic gain control (AGC) and coarse timing and frequency estimation. L-LTF 208 generally enables a receiving device to perform fine timing and frequency estimation and also to perform an initial estimate of the wireless channel. L-SIG 210 generally enables a receiving device to determine a duration of the PDU and to use the determined duration to avoid transmitting on top of the PDU. For example, L-STF 206, L-LTF 208 and L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2 also shows an example L-SIG 210 in the PDU 200. L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
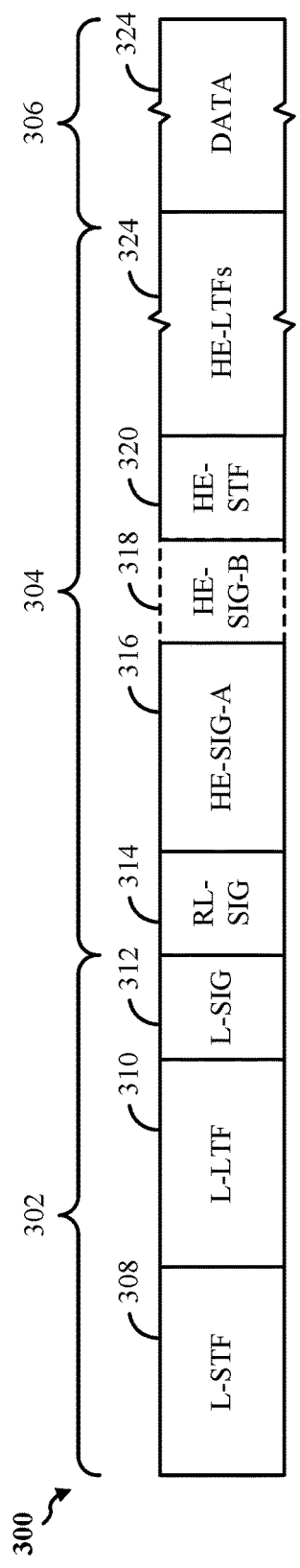
FIG. 3A shows an example PDU usable for communications between an AP and each of a number of STAs.

FIG. 3A shows another example PDU 300 usable for wireless communication between an AP and a number of STAs. The PDU 300 includes a PHY preamble including a first portion 302 and a second portion 304. The PDU 300 may further include a PHY payload 306 after the preamble, for example, in the form of a PSDU including a DATA field 322. The first portion 302 of the preamble includes L-STF 308, L-LTF 310, and L-SIG 312. The second portion 304 of the preamble and the DATA field 322 may be formatted as a Very High Throughput (VHT) preamble and frame, respectively, in accordance with the IEEE 802.11ac amendment to the IEEE 802.11 wireless communication protocol standard. The second portion 304 includes a first VHT signal field (VHT-SIG-A) 314, a VHT short training field (VHT-STF) 316, a number of VHT long training fields (VHT-LTFs) 318, and a second VHT signal field (VHT-SIG-B) 320 encoded separately from VHT-SIG-A 314. Like L-STF 308, L-LTF 310, and L-SIG 312, the information in VHT-SIG-A 314 may be duplicated and transmitted in each of the component 20 MHz subchannels in instances involving the use of a bonded channel.

VHT-STF 316 may be used to improve automatic gain control estimation in a MIMO transmission. VHT-LTFs 318 may be used for MIMO channel estimation and pilot subcarrier tracking. The preamble may include one VHT-LTF 318 for each spatial stream the preamble is transmitted on. VHT-SIG-A 314 may indicate to VHT-compatible APs 102 and STAs 104 that the PPDU is a VHT PPDU. VHT-SIG-A 314 includes signaling information and other information usable by STAs 104 to decode VHT-SIG-B 320. VHT-SIG-A 314 may indicate a bandwidth (BW) of the packet, the presence of space-time block coding (STBC), the number $N_{STS}$ of space-time streams per user, a Group ID indicating the group and user position assigned to a STA, a partial association identifier that may combine the AID and the BSSID, a short guard interval (GI) indication, a single-user/multi-user (SU/MU) coding indicating whether convolutional or LDPC coding is used, a modulation and coding scheme (MCS), an indication of whether a beamforming matrix has been applied to the transmission, a cyclic redundancy check (CRC) and a tail. VHT-SIG-B 320 may be used for MU transmissions and may contain the actual data rate and MPDU or A-MPDU length values for each of the multiple STAs 104, as well as signaling information usable by the STAs 104 to decode data received in the DATA field 322, including, for example, an MCS and beamforming information.

Figure 3B:
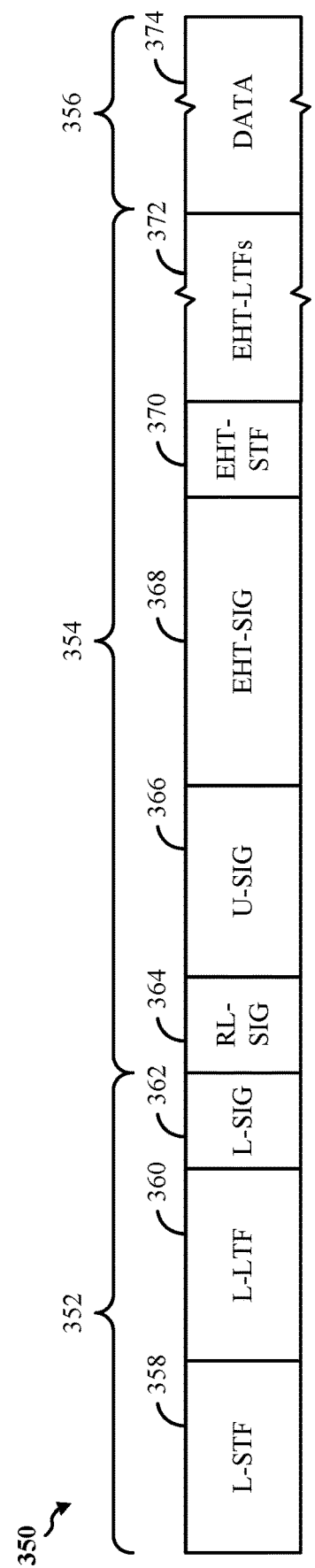
FIG. 3B shows another example PDU usable for communications between an AP and each of a number of STAs.

FIG. 3B shows another example PDU 350 usable for wireless communication between an AP and a number of STAs. The PDU 350 may be used for MU-OFDMA or MU-MIMO transmissions. The PDU 350 includes a PHY preamble including a first portion 352 and a second portion 354. The PDU 350 may further include a PHY payload 356 after the preamble, for example, in the form of a PSDU including a DATA field 374. The first portion 352 includes L-STF 358, L-LTF 360, and L-SIG 362. The second portion 354 of the preamble and the DATA field 374 may be formatted as a High Efficiency (HE) WLAN preamble and frame, respectively, in accordance with the IEEE 802.11ax amendment to the IEEE 802.11 wireless communication protocol standard. The second portion 354 includes a repeated legacy signal field (RL-SIG) 364, a first HE signal field (HE-SIG-A) 366, a second HE signal field (HE-SIG-B) 368 encoded separately from HE-SIG-A 366, an HE short training field (HE-STF) 370 and a number of HE long training fields (HE-LTFs) 372. Like L-STF 358, L-LTF 360, and L-SIG 362, the information in RL-SIG 364 and HE-SIG-A 366 may be duplicated and transmitted in each of the component 20 MHz subchannels in instances involving the use of a bonded channel. In contrast, HE-SIG-B 368 may be unique to each 20 MHz subchannel and may target specific STAs 104.

RL-SIG 364 may indicate to HE-compatible STAs 104 that the PPDU is an HE PPDU. An AP 102 may use HE-SIG-A 366 to identify and inform multiple STAs 104 that the AP has scheduled UL or DL resources for them. HE-SIG-A 366 may be decoded by each HE-compatible STA 104 served by the AP 102. HE-SIG-A 366 includes information usable by each identified STA 104 to decode an associated HE-SIG-B 368. For example, HE-SIG-A 366 may indicate the frame format, including locations and lengths of HE-SIG-Bs 368, available channel bandwidths, and modulation and coding schemes (MCSs), among other possibilities. HE-SIG-A 366 also may include HE WLAN signaling information usable by STAs 104 other than the number of identified STAs 104.

HE-SIG-B 368 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 368 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 374.

Figure 4:
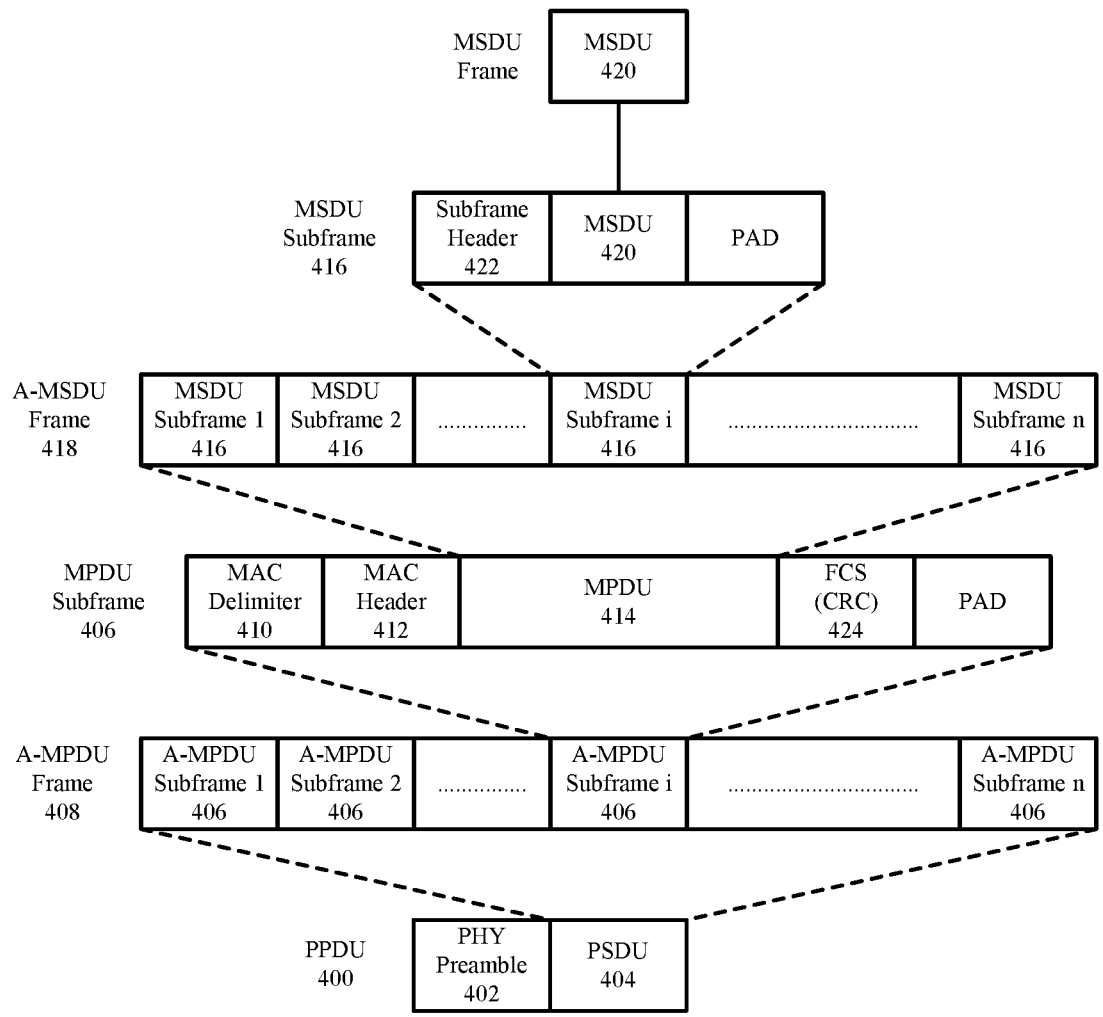
FIG. 4 shows an example physical layer convergence protocol (PLCP) protocol data unit (PPDU) usable for communications between an AP and each of a number of STAs.

FIG. 4 shows an example PPDU 400 usable for communications between an AP 102 and a number of STAs 104. As described herein, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which comprises the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 also may include a frame check sequence (FCS) field 424 for error detection. For example, the FCS field 416 may include a cyclic redundancy check (CRC).

As described herein, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas. APs and STAs that include multiple antennas also may support space-time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described herein). The $N_{SS}$ spatial streams may be mapped to a number $N_{STS}$ of space-time streams, which are mapped to $N_{Tx}$ transmit chains.

APs and STAs that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are separately encoded and transmitted in parallel via the multiple $N_{Tx}$ transmit antennas. If the transmitting device includes $N_{Tx}$ transmit antennas and the receiving device includes $N_{Rx}$ receive antennas, the maximum number $N_{SS}$ of spatial streams that the transmitting device can simultaneously transmit to the receiving device is limited by the lesser of $N_{Tx}$ and $N_{Rx}$. In some implementations, the AP 102 and STAs 104 may be able to implement both transmit diversity as well as spatial multiplexing. For example, in instances in which the number $N_{SS}$ of spatial streams is less than the number $N_{Tx}$ of transmit antennas, the spatial streams may be multiplied by a spatial expansion matrix to achieve transmit diversity.

APs and STAs that include multiple antennas also may support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device, referred to as the beamformer, transmits a signal from each of multiple antennas. The beamformer configures the amplitudes and phase shifts between the signals transmitted from the different antennas such that the signals add constructively along particular directions towards the intended receiver, which is referred to as a beamformee. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may perform measurements for each of the $N_{Tx} \times N_{Rx}$ sub-channels corresponding to all of the transmit antenna and receive antenna pairs based on the sounding signal. The beamformee generates a feedback matrix based on the channel measurements and, typically, compresses the feedback matrix before transmitting the feedback to the beamformer. The beamformer may generate a precoding (or "steering") matrix for the beamformee based on the feedback and use the steering matrix to precode the data streams to configure the amplitudes and phase shifts for subsequent transmissions to the beamformee.

As described herein, a transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions by increasing the number of transmit antennas. This is especially advantageous in MU transmission contexts in which it is particularly important to reduce inter-user interference.

Figure 5:
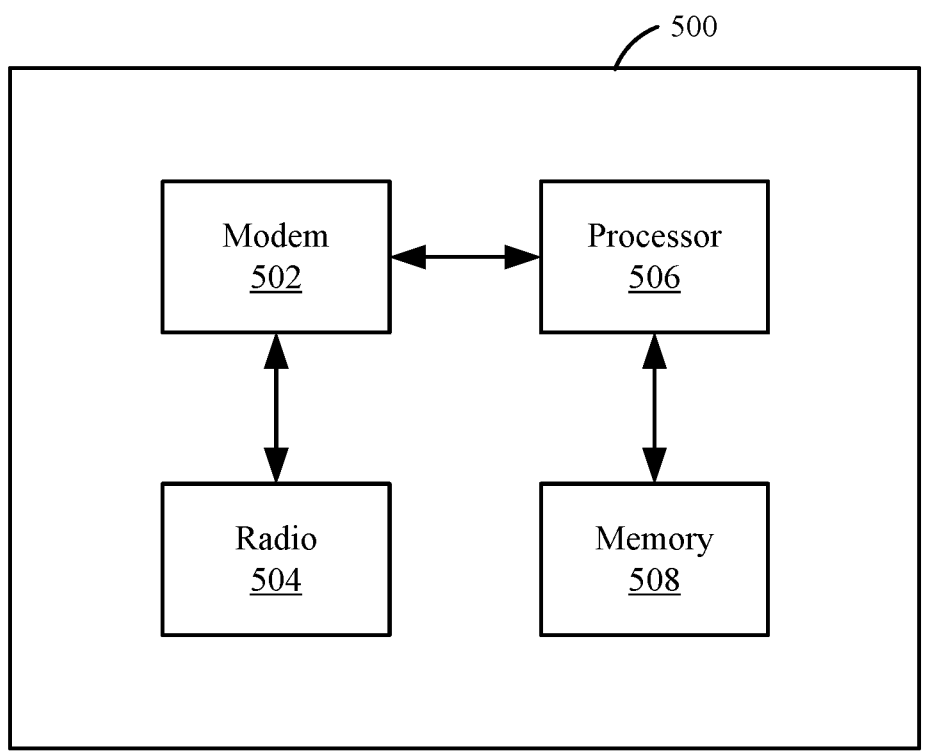
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described with reference to FIG. 1. In some implementations, the wireless communication device 500 can be an example of a device for use in an AP such as the AP 102 described with reference to FIG. 1. The wireless communication device 500 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba, 802.11be and 802.11bf.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506") and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer and a demultiplexer. For example, while in a transmission mode, data obtained from the processor 506 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which transmits the symbols via the coupled antennas. Similarly, symbols received via the antennas are obtained by the radio 504, which provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described herein.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
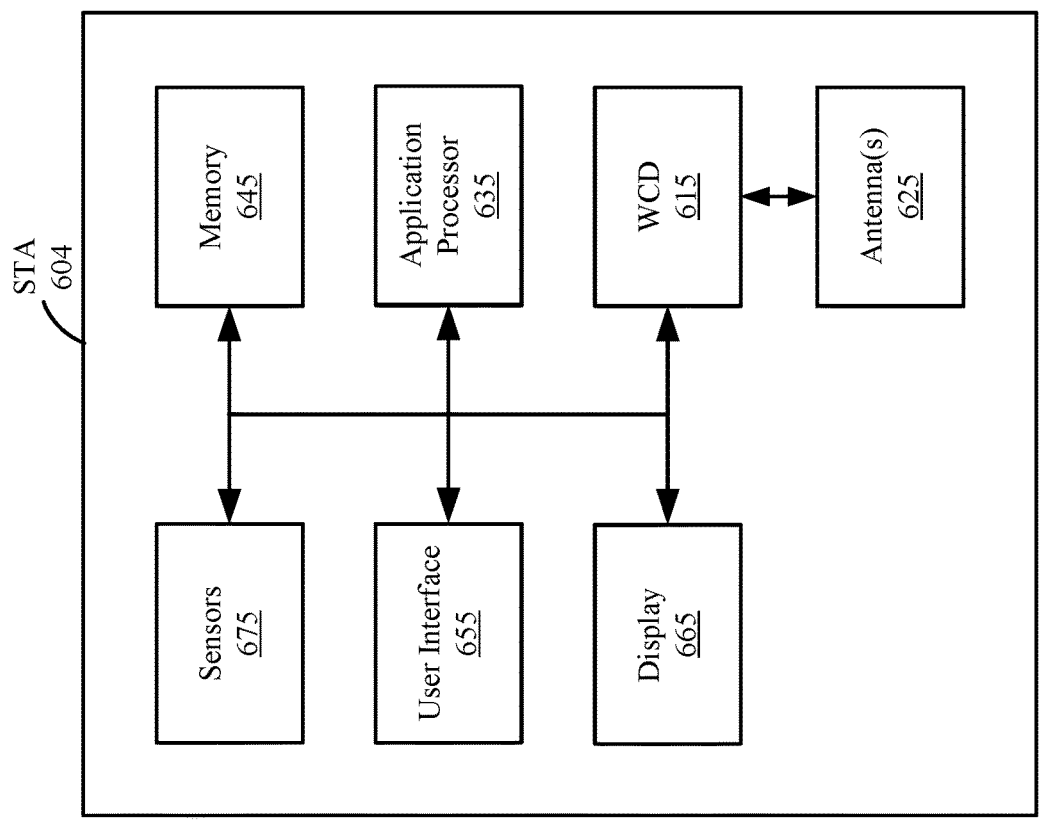
FIG. 6B shows a block diagram of an example STA.
Figure 6A:
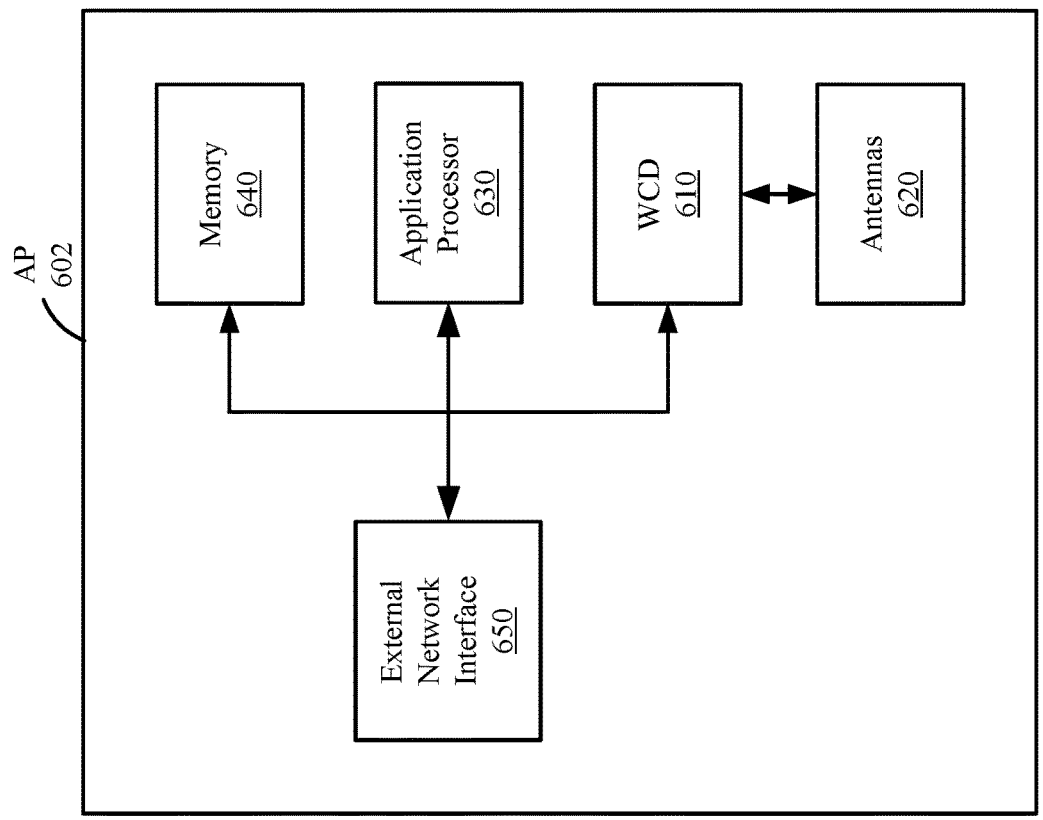
FIG. 6A shows a block diagram of an example AP.

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Aspects of the present disclosure recognize that wireless communications conforming to the IEEE 802.11 family of standards may be well-suited for RF sensing. RF sensing is a technique for sensing objects or movement in an environment based, at least in part, on the transmission and reception of electromagnetic signals. More specifically, changes in the environment can be detected based on changes in the wireless communication channel between the transmitting device and the receiving device. For example, the presence or movement of objects in the environment may interfere with or otherwise alter the phase or amplitude of wireless communication signals transmitted from a transmitting device to a receiving device, and thus, the wireless channel. The range of applications or accuracy of RF sensing may depend on the amount or detail of information communicated between the transmitting device and the receiving device.

As described herein, existing IEEE 802.11 standards define a channel sounding procedure, for beamforming, whereby a beamformer transmits sounding signals (in the form of NDPs) to a beamformee. The beamformee may perform measurements on the wireless channel based on the received sounding signals. The beamformee generates a compressed feedback matrix based on the channel measurements and transmits the compressed feedback matrix back to the beamformer. However, due to compression, the feedback matrix may not be suitable for some RF sensing applications. For example, small changes in the environment (such as a person breathing) may not translate to detectable changes in a compressed feedback matrix associated therewith. Changes in the feedback matrix can also be attributed to changes in the transmission parameters of the transmitting device or changes in the reception parameters of the receiving device. However, neither the sounding signals nor the feedback matrices defined by existing IEEE 802.11 standards provide adequate indication of the transmission parameters or the reception parameters.

In some implementations, a wireless communication network conforming to the IEEE 802.11 family of standards (such as a WLAN) may be used to implement an RF sensing system. A transmitting device may transmit a sounding dataset, over a wireless channel, to a receiving device. The sounding dataset may include information carried in one or more training fields configured for channel estimation and sounding control information based, at least in part, on a configuration of the transmitting device. The receiving device may acquire CSI for the wireless channel based on the received sounding dataset and selectively generate a channel report for the wireless channel based, at least in part, on the CSI and the sounding control information. For example, the receiving device may generate the channel report only when the characteristics of the wireless channel have changed by at least a threshold amount. The channel report may indicate changes to the wireless channel which, in turn, may be used to sense objects in the vicinity of the transmitting device or the receiving device.

Particular implementations of the subject matter described in this disclosure can be implemented to realize one or more of the following potential advantages. In some implementations, the described techniques can be used to facilitate RF sensing that can support a wide range of applications. For example, by including the configuration of the transmitting device in the sounding data transmitted to the receiving device, the receiving device can obtain more accurate measurements of the wireless channel. Further, by generating channel reports only when the wireless channel changes by a threshold amount, aspects of the present disclosure may reduce the overhead associated with the channel sounding procedure.

Figure 7A:
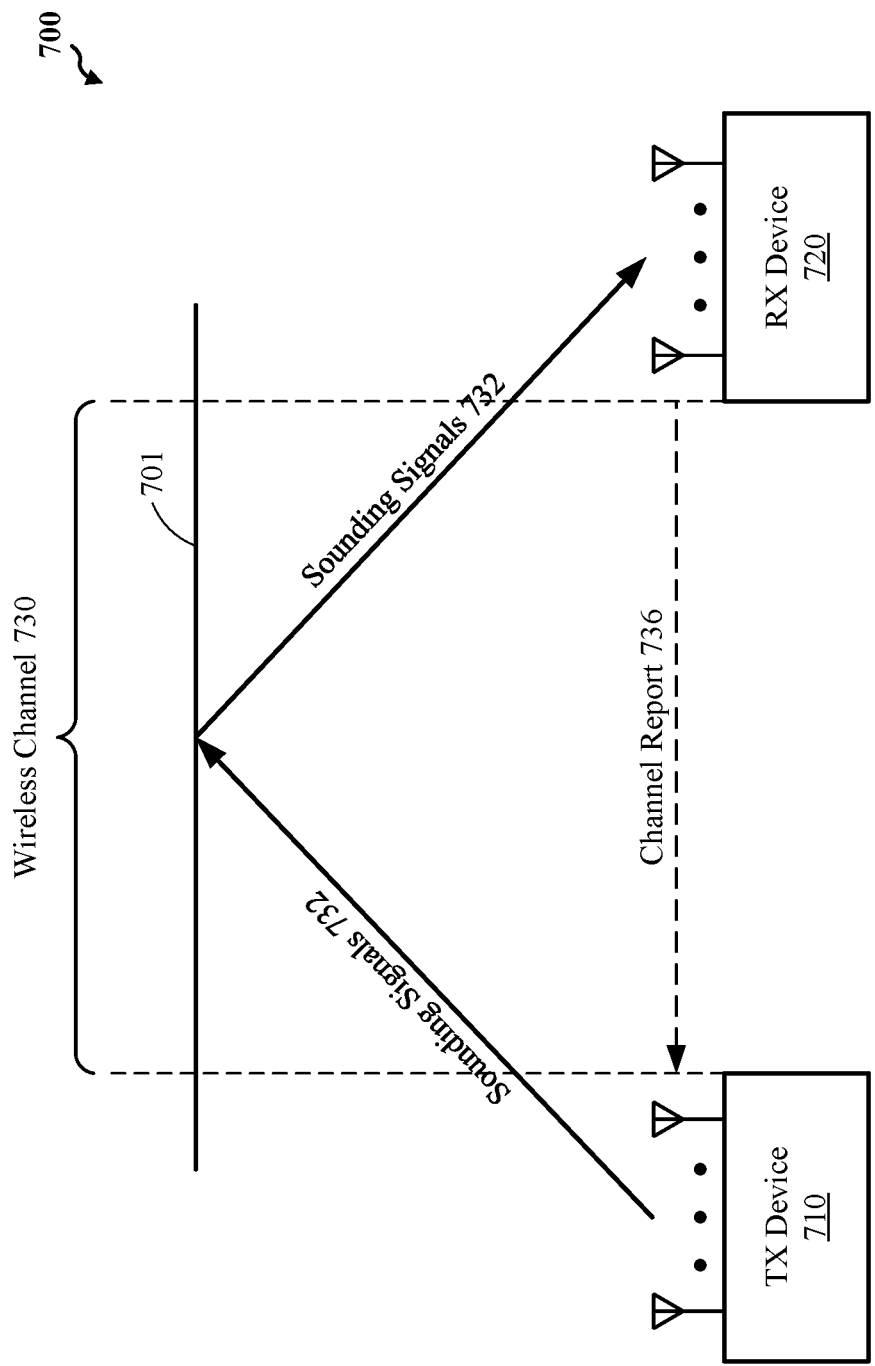
FIGS. 7A and 7B shows an example radio frequency (RF) sensing system according to some implementations.
Figure 7B:
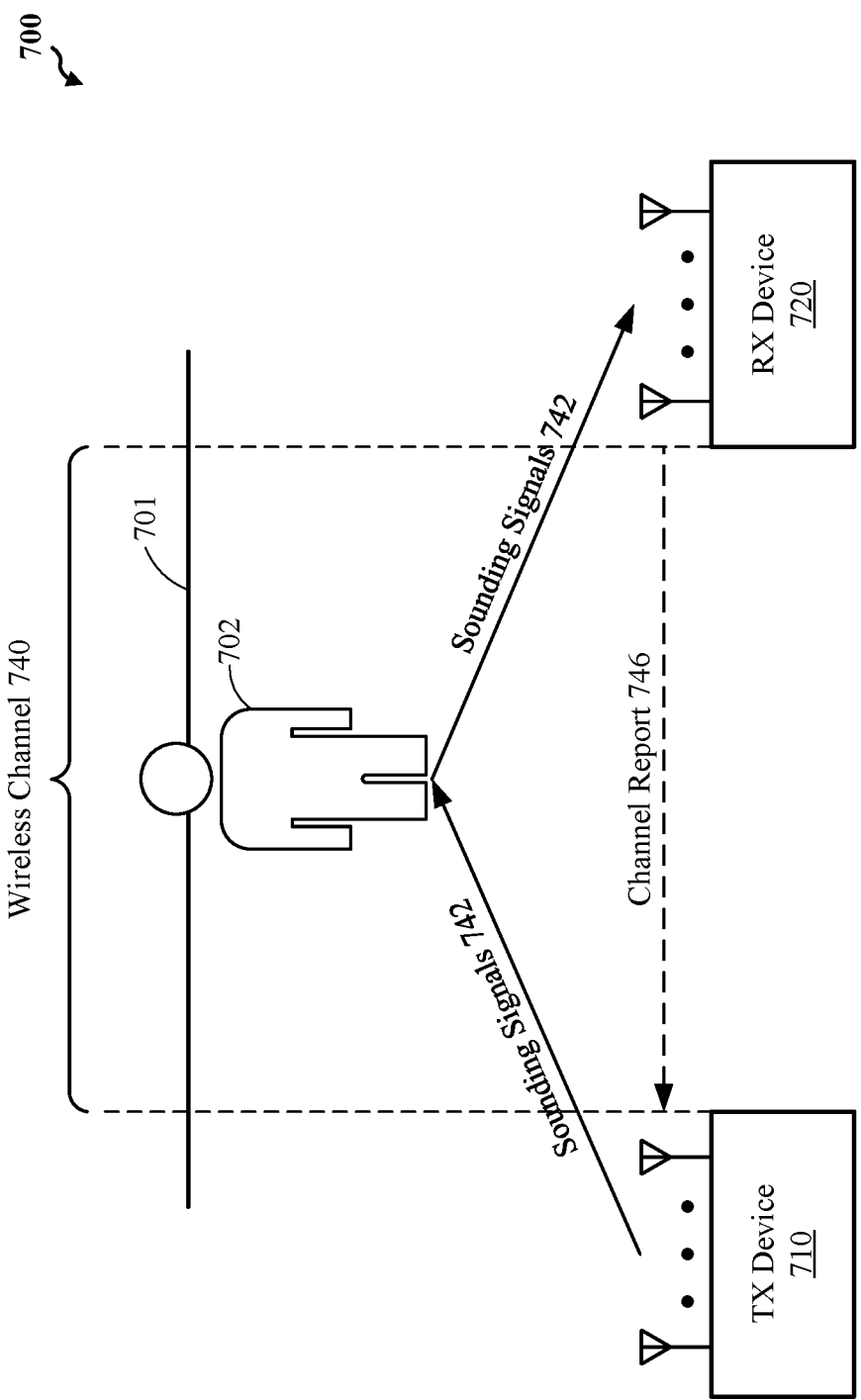

FIGS. 7A and 7B shows an example RF sensing system 700 according to some implementations. The RF sensing system 700 includes a transmitting (TX) device 710 and a receiving (RX) device 720. In some implementations, the transmitting device 710 may be one example of the AP 102 of FIG. 1 or the AP 602 of FIG. 6A. In some other implementations, the transmitting device 710 may be one example of the STA 104 of FIG. 1 or the STA 604 of FIG. 6B. In some implementations, the receiving device 720 may be one example of the AP 102 of FIG. 1 or the AP 602 of FIG. 6A. In some other implementations, the receiving device 720 may be one example of the STA 104 of FIG. 1 or the STA 604 of FIG. 6B.

With reference to FIG. 7A, the transmitting device 710 is configured to transmit sounding signals, over a wireless channel 730, to the receiving device 720. Some sounding signals may reflect off objects and surfaces in the environment before reaching the receiving device 734. As shown in FIG. 7A, a static object or surface 701 (such as a wall) is located along the path of sounding signals 732. More specifically, the surface 701 reflects the sounding signals 732 in a direction of the receiving device 720. The receiving device is configured to measure one or more characteristics of the wireless channel 730 based on the received sounding signals 732. For example, the sounding signals 732 may include one or more training fields (such as one or more of the LTFs described with respect to FIGS. 2, 3A, and 3B) that can be used for channel estimation. In some implementations, the receiving device 720 may transmit a channel report 736, based on the measured characteristics of the wireless channel 730, back to the transmitting device 710.

With reference to FIG. 7B, a new object 702 (such as a person) may enter the environment of the RF sensing system 700. The transmitting device 710 may transmit sounding signals 742, in the presence of the object 702, to the receiving device 720. The receiving device 720 may measures one or more characteristics of a wireless channel 740 based on the received sounding signals 742. In comparison to FIG. 7A, the new object 702 may alter the propagation paths of at least some of the sounding signals transmitted by the transmitting device 710. For example, the phases or amplitudes of sounding signals received (by the receiving device 720) in the presence of the object 702 may be different than the phases or amplitudes of sounding signals received in the absence of the object 702. As a result, the wireless channel 740 may be different than the wireless channel 730 previously measured by the receiving device 720. In some implementations, the receiving device 720 may transmit a channel report 746, based on the measured characteristics of the wireless channel 740, back to the transmitting device 710.

The transmitting device 710 may detect a presence or movement of the object 702 based on differences or changes between the wireless channel 740 and the wireless channel 730. For example, the transmitting device 710 may compare the characteristics of the wireless channel 740 (based on the channel report 746) with the characteristics of the wireless channel 730 (based on the channel report 736) to detect changes in the wireless channel. Assuming the transmitting device 710 and the receiving device 720 remain static (from FIG. 7A to FIG. 7B), the differences between wireless channel 730 and wireless channel 740 may be attributed to the presence or movement of the new object 702. Example characteristics that may be detectable based on the changes in the wireless channel include, but are not limited to, movement (or lack thereof) of an object, movement patterns (such as walking, falling, or gestures), object tracking (such as movement direction, range, or location), and vital signs (such as breathing).

As described herein, the range of applications for RF sensing may depend on the detail and accuracy of information communicated between the transmitting device 710 and the receiving device 720. For example, compression may reduce the level of detail needed to detect slight changes in the environment. In some implementations, the channel reports 736 and 746 generated by the receiving device 720 may include raw or uncompressed channel state information (CSI). In some aspects, the CSI may include an in-phase (I) and quadrature (Q) representation of the associated wireless channel. In some other aspects, the CSI may include a phase and amplitude representation of the associated wireless channel. In some implementations, the channel report may include a raw or uncompressed amplitude-only representation of the wireless channel. In some other implementations, the channel report may include a raw or uncompressed phase-only representation of the wireless channel. Aspects of the present disclosure recognize that an amplitude-only or phase-only representation of the wireless channel may be sufficient for some RF sensing applications and may help reduce overhead.

In some cases, the receiving device 720 may perform pre-processing on the channel measurement. For example, the CSI may be normalized to a particular reference antenna of the receiving device 720. Alternatively, or in addition, the CSI may be normalized with respect to phase (and not amplitude), amplitude (and not phase), or a combination of thereof. In some implementations, the receiving device 720 may include an indication of the pre-processing performed on the CSI (such as an indication of the reference antenna for which the CSI is normalized) in the channel report sent back to the transmitting device 710. In some other implementations, the receiving device may determine a level of quantization to be performed on the CSI. The receiving device 720 may include an indication of the quantization level of the CSI in the channel report sent back to the transmitting device 710.

Aspects of the present disclosure recognize that the properties of the wireless channel depend on the transmission parameters of the transmitting device 710 and the reception parameters of the receiving device 720, in addition to the characteristics of the environment. In other words, changing the transmission parameters of the transmitting device 710 or the reception parameters of the receiving device 720, between sounding operations, may cause the receiving device 720 to measure different CSI responsive to each sounding even if the environment did not change. To accurately attribute changes in the wireless channel to changes in the environment, additional information may be conveyed by the transmitting device 710 to the receiving device 720 (or by the receiving device 720 to the transmitting device 710) in association with the sounding signals.

In some implementations, the transmitting device 710 may be configured to transmit sounding control information to the receiving device 720 in association with each sounding signal. The sounding control information may indicate a configuration of the transmitting device 710 when transmitting a corresponding sounding signal (or set of sounding signals) to the receiving device 720. In some aspects, the sounding control information may indicate one or more transmission parameters used by the transmitting device 710 to transmit the sounding signal. Example transmission parameters may include, but are not limited to, transmit antenna indexes, transmit power per antenna, cyclic shift delays (CSDs), and any spatial mapping of the sounding signal to different transmit antennas. Thus, the indication of the transmission parameters may be used to control for variations in CSI that could otherwise be attributed to changes in the transmission parameters of the transmitting device 710.

In some other aspects, the sounding control information may include a sequence number for the corresponding sounding signal. The sequence number may provide a general indication of the transmission parameters used in transmitting the sounding signal. For example, the transmitting device 710 may change the sequence number for subsequent sounding signals if the transmitting device 710 uses different transmission parameters to transmit the subsequent sounding signals. Thus, the sequence number also may be used to control for variations in CSI that could otherwise be attributed to changes in the transmission parameters of the transmitting device 710.

Still further, in some aspects, the sounding control information may include a timing synchronization function (TSF) value of the transmitting device 710. The TSF value of the transmitting device 710 may indicate (or may be used to determine) a time at which the associated sounding signal is transmitted by the transmitting device 710. More specifically, the TSF value may be used to determine a propagation delay between the transmission of the sounding signal by the transmitting device 710 to the reception of the sounding signal by the receiving device 720. The propagation delay may be useful for some RF sensing applications (such as ranging and object tracking).

In some implementations, the receiving device 720 may include at least a subset of the sounding control information in the channel reports sent back to the transmitting device 710. In some other implementations, the channel report may indicate a configuration of the receiving device 720 when receiving a corresponding sounding signal used to generate the CSI included in the channel report. For example, the channel report may include the TSF value indicating the time at which the corresponding sounding signal was transmitted by the transmitting device 710. In some aspects, the channel report also may include a TSF value of the receiving device 720. The TSF value of the receiving device 720 may indicate a time at which the corresponding sounding signal was received by the receiving device 720. The transmitting device 710 may compare the TSF value of the receiving device 720 with the TSF value of the transmitting device 710 to determine the propagation delay of the corresponding sounding signal.

Additionally, or alternatively, the channel report may include the sequence number of the corresponding sounding signal. In some aspects, the channel report may indicate a change in the sequence number (such as with a new sequence number) if the reception parameters used to receive the corresponding sounding signal are different the reception parameters previously used to receive other sounding signals having the same sequence number. To control for variations in CSI that could otherwise be attributed to changes in transmission parameters or reception parameters, the transmitting device 710 may compare only the CSI reported by the receiving device 720 against other CSI associated with the same sequence number.

Still further, in some implementations, the channel report may indicate one or more reception parameters used by the receiving device 720 to receive the corresponding sounding signal. Example reception parameters may include, but are not limited to, receive antenna indexes, automatic gain control (AGC) per receive chain, estimated carrier frequency offset (CFO) or pre-correction, receive signal strength indication (RSSI) per antenna, or any spatial mapping of the sounding signal to different receive antennas. To control for variation in CSI that could otherwise be attributed to changes in reception parameters, the transmitting device 710 may compare only the CSI reported by the receiving device 720 against other CSI associated with at least the same reception parameters.

The sounding control information and the training fields (used for channel estimation) may be collectively referred to as a sounding dataset. In some implementations, the sounding dataset may be transmitted as a single sounding packet or PDU. For example, the sounding control information and the training fields may be included in different portions of the same sounding packet. Alternatively, or additionally, at least some of the sounding control information may be included in the same portion of the sounding packet that includes the training fields. In some other implementations, the sounding dataset may be distributed across multiple packets. For example, the training fields may be included in a sounding packet or PDU and the sounding control information may be included in a separate message or packet associated with (or immediately preceding) the sounding packet or PDU.

Figure 8A:
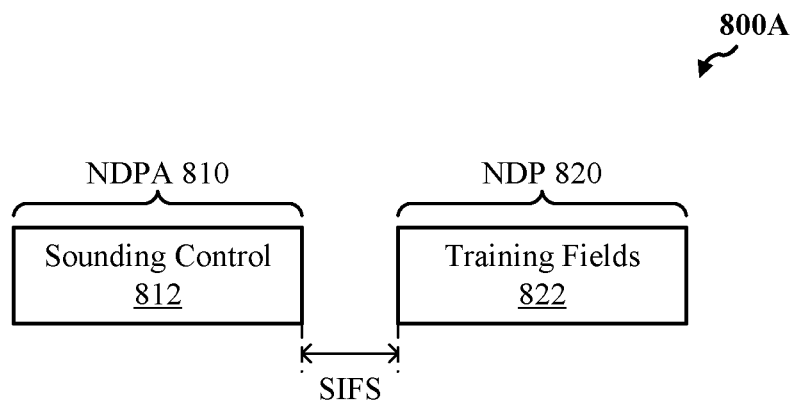
FIG. 8A shows an example sounding dataset usable for RF sensing according to some implementations.

FIG. 8A shows an example sounding dataset 800A usable for RF sensing according to some implementations. In some implementations, the sounding dataset 800A may be one example of any of the sounding signals 732 or 742 of FIGS. 7A and 7B, respectively. The sounding dataset 800A includes sounding control information 812 and one or more training fields 822 that may be used for channel estimation. As shown in FIG. 8A, the sounding control information 812 is included in a null data packet announcement (NDPA) 810 and the training fields 822 are included in a null data packet (NDP) 820 immediately following the NDPA 810. The NDP 820 and the NDPA 810 may be separated by a short interframe space (SIFS) duration.

In some implementations, the sounding control information 812 may indicate a configuration of the transmitting device to be used in transmitting the sounding dataset 800A (such as described with respect to FIGS. 7A and 7B). In some other implementations, the sounding control information 812 may indicate one or more parameters to be used by a receiving device to encode a channel report. Example encoding parameters may include, but are not limited to, a minimum or maximum quantization level for the CSI, a bandwidth or resource unit (RU) allocation, a number of spatial streams, or one or more antenna indexes. Still further, in some implementations, the sounding control information 812 may identify a group of receiving devices as intended recipients of the sounding dataset 800A.

Figure 8B:
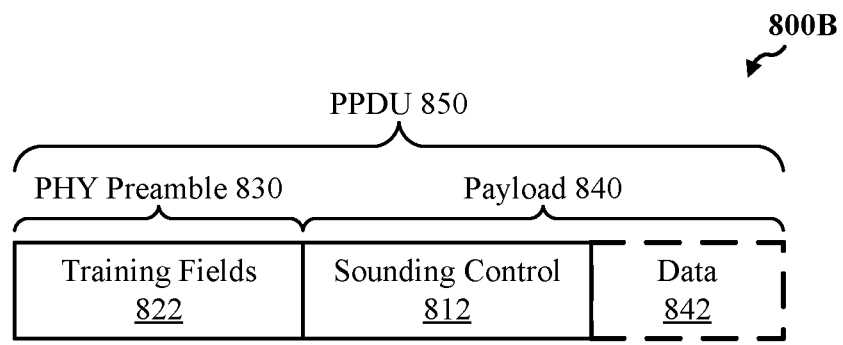
FIG. 8B shows another example sounding dataset usable for RF sensing according to some implementations.

FIG. 8B shows another example sounding dataset 800B usable for RF sensing according to some implementations. In some implementations, the sounding dataset 800B may be one example of any of the sounding signals 732 or 742 of FIGS. 7A and 7B, respectively. As shown in FIG. 8B, the sounding control information 812 and the training fields 822 are included in a single PPDU 850. More specifically, the training fields 822 are included in a PHY preamble 830 of the PPDU 850 while the sounding control information 812 is included in a payload 840 of the PPDU 850. In some implementations, the PPDU 850 may be a sounding PPDU such as defined by existing or future IEEE 802.11 standards. In this case, the training fields 822 may include sounding LTFs that are configured for full channel estimation. In some other implementations, the PPDU 850 may be a data PPDU such as defined by existing or future IEEE 802.11 standards. In this case, the training fields 822 may include standard LTFs that can be used for channel estimation limited to the MIMO configuration used for transmitting the PPDU 850. Still further, in some implementations, the payload 840 also may include data 842 intended for the receiving device(s).

Figure 8C:
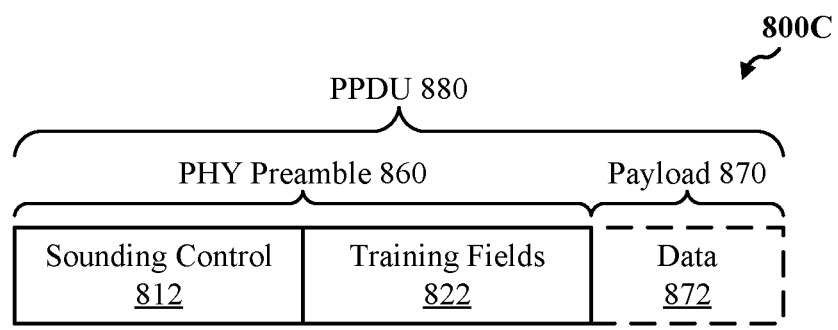
FIG. 8C shows another example sounding dataset usable for RF sensing according to some implementations.

FIG. 8C shows another example sounding dataset 800C usable for RF sensing according to some implementations. In some implementations, the sounding dataset 800C may be one example of any of the sounding signals 732 or 742 of FIGS. 7A and 7B, respectively. As shown in FIG. 8C, the sounding control information 812 and the training fields 822 are included in a single PPDU 880. More specifically, the sounding control information 812 and the training fields 822 are included together in a PHY preamble 860 of the PPDU 880. The PPDU 880 may correspond to a new PPDU format that is not defined by existing IEEE 802.11 standards. In some implementations, the PPDU 880 may further include a payload 870 which may include data 872 intended for the receiving device(s).

As described herein, the receiving device in an RF sensing system may generate a channel report based on a received sounding dataset. The channel report may include raw or uncompressed CSI as well as additional information that may be used to characterize the wireless channel. To reduce overhead, the channel reports may be generated or transmitted less frequently than the sounding datasets. In some implementations, the receiving device may generate a channel report only after receiving a number (n) of sounding datasets from the transmitting device. In some other implementations, the receiving device may generate a channel report only after one or more conditions are satisfied. Still further, in some implementations, the receiving device may not transmit any channel reports to the transmitting device. For example, some receiving devices (rather than transmitting devices) may be configured to interpret differences in CSI for RF sensing purposes. Alternatively, or additionally, the transmitting device and the receiving device may be communicatively coupled to a shared backhaul. To further reduce wireless communications overhead, the receiving device may provide the channel reports to the backhaul rather than transmit the channel reports over the wireless medium.

Figure 9:
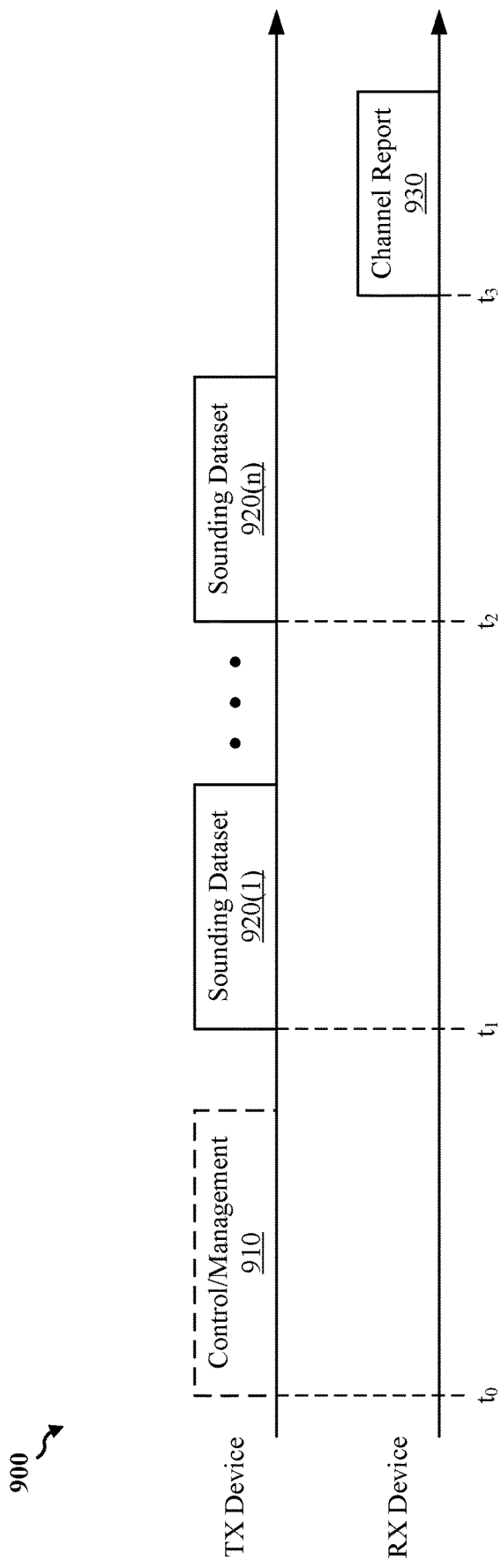
FIG. 9 shows a timing diagram illustrating an example message exchange between a transmitting device and a receiving device in an RF sensing system.

FIG. 9 shows a timing diagram illustrating an example message exchange 900 between a transmitting (TX) device and a receiving (RX) device in an RF sensing system according to some implementations. In some implementations, the TX device and the RX device may be examples of the transmitting device 710 and the receiving device 720, respectively, of FIGS. 7A and 7B. For simplicity, only one RX device is shown in FIG. 9. However, in actual implementations, the RF sensing system may include any number of RX devices.

In some implementations, the TX device may transmit a control or management frame 910 to the RX device at time t0. The control or management frame 910 may include sounding control information that is generally applicable to a number (n) of datasets 920(1)-920(n) to be transmitted as part of an RF sensing procedure. As described herein, each of the sounding dataset 920(1)-920(n) may include sounding control information which may indicate a configuration of the TX device at the time the respective sounding datasets is transmitted, one or more parameters to be used by a receiving device to encode a channel report, or a group of RX devices to receive the sounding datasets. To reduce overhead, any sounding control information that is common to the sounding datasets 920(1)-920(n) may be included in the control management frame 910 (rather than in individual sounding datasets).

In some implementations, the sounding control information included in the control or management frame 910 (or alternatively, in one or more of the sounding datasets 920(1)-920(n)) may indicate one or more conditions for generating or transmitting a channel report. In some aspects, the TX device may require the RX device to generate channel reports based on aggregated data from multiple sounding datasets. For example, the sounding control information may indicate that the RX device should receive all n sounding datasets 920(1)-9201(n) before generating a channel report (if at all). In some other aspects, the TX device may require the RX device to generate a channel report only if the RSSI of a corresponding dataset exceeds an RSSI threshold. For example, CSI generated from a weak sounding signal may be less accurate or reliable than CSI generated from stronger sounding signals. Thus, the sounding control information may indicate the RSSI threshold that must be satisfied in order to generate a corresponding channel report.

Aspects of the present disclosure recognize that RF sensing techniques depend on changing channel conditions to detect objects or movement in the environment. Thus, to reduce overhead, the RX device may report only differences in CSI from two or more sounding datasets. The sounding control information included in the control or management frame 910 (or in one or more of the sounding datasets) may indicate which of the sounding datasets 920(1)-920(n) is to be used as a "reference" dataset in determining the difference in CSI. Alternatively, or additionally, the sounding control information included in the control or management frame 910 may identify multiple reference datasets among the sounding datasets 920(1)-920(n) and the RX device may be separately notified as to which of the reference datasets to use in generating a particular channel report. In some implementations, the RX device may require the TX device to generate a channel report only if the difference in CSI exceeds a threshold amount. For example, the sounding control information may indicate the CSI threshold that must be satisfied to generate a channel report.

At time $t_1$, the TX device transmits a first sounding dataset 920(1) to the RX device. In some implementations, the sounding dataset 920(1) may be one example of any of the sounding datasets 800A-800C described with respect to FIGS. 8A-8C, respectively. The sounding dataset 920(1) may include sounding control information and one or more training fields to be used by the RX device to obtain a first measurement of the wireless communications channel between the TX device and the RX device. In some implementations, the sounding control information may indicate whether the first sounding dataset 920(1) corresponds to a reference dataset. Assuming the first sounding dataset 920(1) is a reference dataset, the RX device may store the CSI acquired from the sounding dataset 920(1) as a reference CSI.

At time $t_2$, the TX device transmits an $n^{th}$ sounding dataset 920(n) to the RX device. In some implementations, the sounding dataset 920(n) also may be one example of any of the sounding datasets 800A-800C described with respect to FIGS. 8A-8C, respectively. The sounding dataset 920(n) may include sounding control information and one or more training fields to be used by the RX device to obtain an $n^{th}$ measurement of the wireless communications channel between the TX device and the RX device. Since the sounding dataset 920(n) is the final dataset in the sounding sequence, the RX device may selectively transmit a channel report 930 back to the TX device at time $t_3$. As described herein, the channel report 930 may include a subset of the sounding control information received from the TX device. Additionally, or alternatively, the channel report 930 may indicate a configuration of the RX device at the time one or more of the sounding datasets 920(1)-920(n) was received.

In some implementations, the channel report 930 may include an average or aggregate CSI measured by the RX device based the received sounding datasets 920(1)-920(n). In some other implementations, the channel report 930 may include a difference in the CSI acquired based on the $n^{th}$ sounding dataset 920(n) and a reference CSI (such as the CSI acquired based on the first sounding dataset 920(1)). For example, the difference in CSI may be expressed as an error vector magnitude (EVM). In some implementations, the RX device may determine a level of quantization to be performed on the difference in CSI. For example, the RX device may select any quantization level that conforms to the maximum or minimum quantization thresholds indicated in the sounding control information. The RX device may include an indication of the quantization level in the channel report 930.

In some implementations, the RX device may generate or transmit a channel report only if one or more conditions are satisfied. For example, the reporting conditions may be indicated in the sounding control information received from the TX device. In some aspects, the RX device may not generate a channel report if the RSSI threshold associated with the received sounding datasets 920(1)-920(n) is below an RSSI threshold. In some other aspects, the RX device may not generate a channel report if the difference in the CSI is below a CSI threshold. Still further, in some aspects, the RX device also may not generate a channel report if it was unable to correctly receive or decode one or more of the sounding datasets 920(1)-920(n). For example, the RX device may fail to receive one or more of the sounding datasets 920(1)-920(n) as a result of too much interference on the wireless channel, a failed cyclic redundancy check (CRC), among other examples.

In some implementations, the RX device may transmit a response to the TX device, at time $t_3$, even if no channel report was generated. For example, the response may provide a reason for which no channel report was generated or indicate which reporting conditions were not satisfied. Alternatively, the response may be a short acknowledgement frame (ACK or QoS null) which does not include a channel report. In some other implementations, the RX device may not send any response to the TX device at time $t_3$. As described herein, the TX device may not expect to receive any channel report or response from the RX device in some RF sensing configurations (such as where the RX device performs RF sensing or the TX device and the RX device are communicatively coupled to a shared backhaul). The TX device also may explicitly indicate, in the sounding control information, that no channel report is to be sent back to the TX device.

In the example of FIG. 9, the RX device selectively generates a channel report for every n sounding datasets (where n is depicted as an integer number greater than 1). However, in some other implementations, the RX device may selectively generate channel reports after each sounding dataset received from the TX device. As described herein, the channel report may include raw or uncompressed CSI or a difference in CSI acquired in response to each sounding dataset received from the TX device. In some implementations, the RX device may use the CSI acquired from the most recent sounding dataset as a reference CSI to be compared against the CSI acquired from the next sounding dataset received from the TX device. In some other implementations, the RX device may compare the reference CSI against the CSI acquired from the $n^{th}$ sounding dataset received thereafter (where n is any integer number greater than 1).

In some implementations, sensing operations disclosed herein may use frame sequences that allow a wireless communication device additional time to generate certain types of channel reports. Specifically, some types of channel reports may take longer to generate by a respective device than other types of channel reports. In some instances, the time needed for the respective device to generate a specific type of channel report, which may be referred to herein as the channel report processing time of the respective device, may be longer than the period of time within which the receiver device is to respond to sounding sequences and sounding frames (such as NDPs) transmitted over the wireless channel by the transmitter device. For example, a first type of channel report that includes CSI responsive to sounding sequences and to the transmit parameters used for transmitting the sounding sequences may take longer to generate by the respective device than a second type of channel report that includes CSI responsive only to the sounding sequences. As such, implementations of the subject matter disclosed herein may use one or more different frame sequences to ensure that the respective device has enough time to generate any type of channel report prior to its solicitation by or transmission to a requesting device.

Figure 10A:
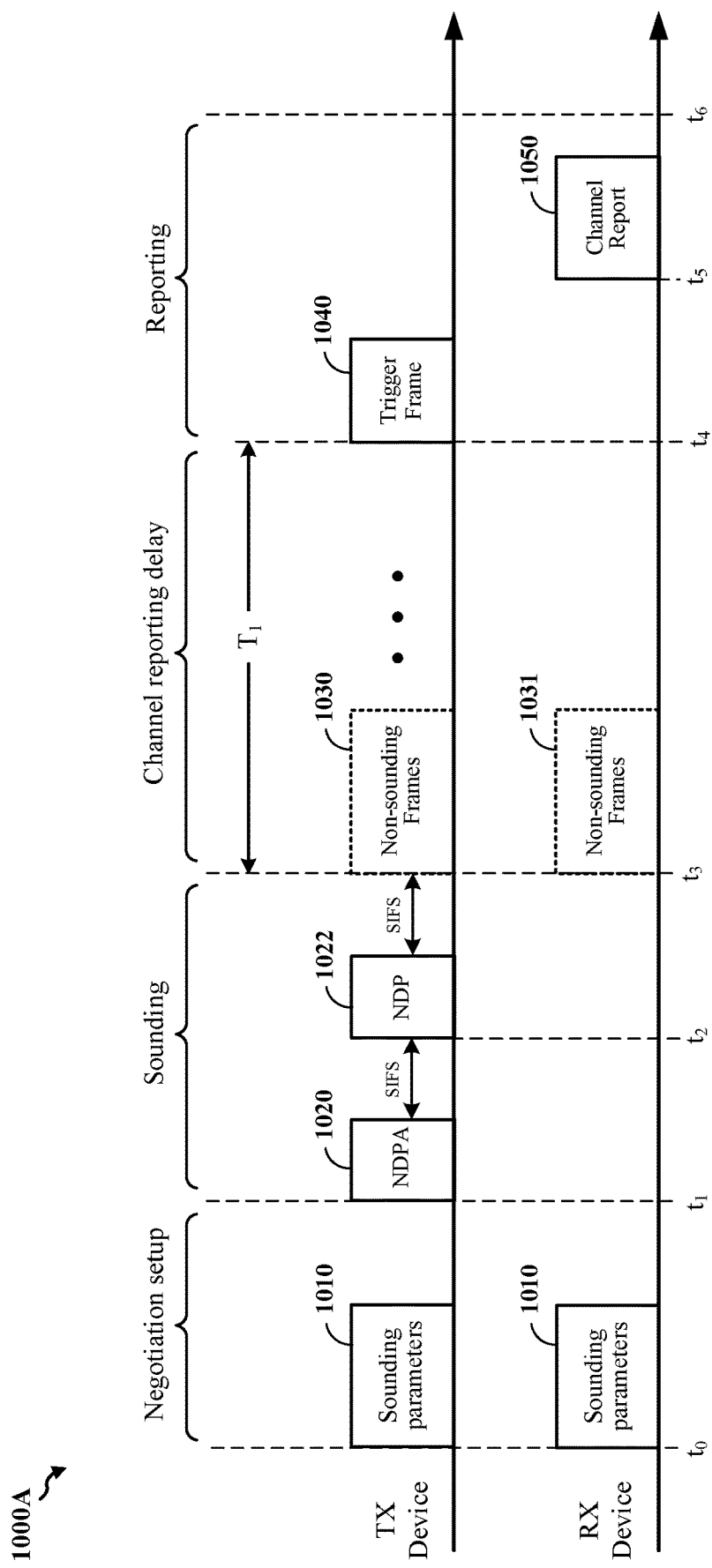
FIG. 10A shows a timing diagram illustrating an example sensing operation that supports explicit channel sounding.

FIG. 10A shows a timing diagram illustrating an example sensing operation 1000A that supports explicit channel sounding. The communications shown in the example of FIG. 10A are exchanged between a transmitter device and a receiver device. The transmitter device and the receiver device may be any suitable wireless communication devices. In some implementations, the transmitter device may be an AP such as the APs 102 and 602 described with reference to FIGS. 1 and 6A, respectively, and the receiver device may be a wireless station such as the STAs 104 and 604 described with reference to FIGS. 1 and 6B, respectively. In some other implementations, the transmitter device may be a STA, and the receiver device may be an AP. Further, although only one transmitter device and one receiver device are shown in the example of FIG. 10A, in some other implementations, the sensing operation 1000A may include one or more additional transmitter devices, one or more additional receiver devices, or both.

At time to, the transmitter device and receiver device may exchange capability information and sounding parameters 1010 with each other during a negotiation setup. The capability information may indicate supported operating modes, supported transmission bandwidths, the maximum number of space-time streams, extended range (ER) capabilities, and so on of each device. The sounding parameters 1010 may indicate the channel report processing time of the receiver device. In some instances, the sounding parameters may indicate the channel report processing time for different types of channel reports.

In some implementations, the sounding parameters 1010 may indicate transmission schedules for one or more of sounding sequences, trigger frames, or channel reports associated with the sensing operation 1000A. For example, in some aspects, the sounding parameters 1010 may indicate one or more of a minimum time period between respective transmissions of sounding sequences and trigger frames over the wireless channel, a maximum time period between respective transmissions of sounding sequences and trigger frames over the wireless channel, or scheduled times for the transmissions of sounding sequences and trigger frames over the wireless channel. In some other aspects, the sounding parameters 1010 may indicate one or more of a minimum time period between respective transmissions of sounding sequences and channel reports over the wireless channel, a maximum time period between respective transmissions of sounding sequences and channel reports over the wireless channel, or scheduled times for transmissions of the sounding sequences and the channel reports over the wireless channel.

In some other implementations, the sounding parameters 1010 may indicate one or more conditions for generating the channel report. In some instances, the sounding parameters 1010 may indicate that the receiver device is to generate a channel report only if the RSSI of the sounding sequences exceeds an RSSI threshold. That is, if the RSSI of the sounding sequences is less than the RSSI threshold, the receiver device does not generate the channel report. In some other instances, the sounding parameters 1010 may indicate that the receiver device is to generate a channel report only when the characteristics of the wireless channel have changed by at least a threshold amount.

During a sounding phase, the transmitter device may send sounding sequences over the wireless channel to the receiver device, the sounding sequences configured for obtaining channel state information (CSI) of the wireless channel. Specifically, at time $t_1$, the transmitter device transmits a null data packet announcement (NDPA) 1020 to the receiver device over the wireless channel, followed by a null data packet (NDP) 1022 at time $t_2$. The NDPA 1020 may announce the transmission of the NDP 1022 following the NPDA 1020, and may include or indicate the transmit parameters used by the transmitter device for transmitting sounding sequences over the wireless channel. The NDP 1022 may carry one or more sounding sequences configured for obtaining channel state information (CSI) of the wireless channel. Transmissions of the NDPA 1020 and the NDP 1022 may be separated by a short interframe space (SIFS) duration.

The transmit parameters may include (but are not limited to) the transmission bandwidth of the NDP 1022 (or other sounding frames), the MCS, the number of spatial streams, the transmit antenna indexes, the transmit power levels, phase shifts, cyclic shift delays (CSDs), estimated carrier frequency offsets (CFOs), or spatial mappings between the sounding sequences and the transmit antennas. In some instances, the sounding parameters also may indicate a sequence number for a corresponding transmission of sounding sequences over the wireless channel.

In some implementations, the NDPA 1020 may indicate a type of channel report requested by the transmitter device. For example, in some instances, the type of channel report may be one of a compressed beamforming report (CBR), a channel report including uncompressed CSI, a channel report including normalized CSI, a channel report including CSI processed with the transmit parameters, or a channel report including CSI processed with one or more receive parameters used by the receiver device to receive the NDP 1022. In some other implementations, the indicated type of channel report may include CSI encoded with encoding parameters indicating one or more of a minimum quantization level for the CSI, a maximum quantization level for the CSI, a specified number of bits to be used for encoding each orthogonal frequency division multiplexed (OFDM) tone in the channel report, a subset of OFDM tones to be included in the channel report, a bandwidth allocation, a resource unit (RU) allocation, a tone grouping value, a number of spatial streams, or one or more antenna indexes.

The channel report type indication may be carried in any suitable portion of the NDPA 1020. In some aspects, one or more reserved bits of a field in the PHY header of the NDPA 1020 may be used to carry the channel report type indication. In other some aspects, one or more reserved bits of a field in a MAC header of the NDPA 1020 may be used to carry the channel report type indication. For example, in an NDPA having a high-efficiency (HE) subfield and Ranging subfield set to 1 (which identifies the frame as an EHT NDP Announcement frame), bits 29-31 are reserved and can be used to indicate one or more new CSI feedback types containing various type of channel report disclosed herein. For another example, in an NDPA having bit 25 set to 0, bits 26 and 28 are reserved and can be used to indicate one or more of the new CSI feedback types disclosed herein.

In some other implementations, the NDPA 1020 may indicate one or more encoding parameters to be used by the receiver device when encoding the requested channel report. Example encoding parameters may include (but are not limited to) a minimum or maximum quantization level for the CSI (such as the number of bits to be used for encoding each OFDM tone to be included in the channel report), a subset of OFDM tones to be reported, a bandwidth or resource unit (RU) allocation, a tone grouping value (such as a subsampling of tones within the bandwidth), a number of spatial streams, or one or more antenna indexes. The encoding indication may be carried in any suitable portion of the NDPA 1020. In some aspects, one or more reserved bits of a field in the PHY header of the NDPA 1020 may be used to carry the encoding indication. In other some aspects, one or more reserved bits of a field in a MAC header of the NDPA 1020 may be used to carry the encoding indication. As discussed, in an NDPA having a high-efficiency (HE) subfield and Ranging subfield set to 1, bits 29-31 are reserved and can be used to indicate one or more new CSI feedback types containing various types of channel reports disclosed herein. Also, in an NDPA with bit 25 set to 0, bits 26 and 28 are reserved and can be used to indicate one or more of the new CSI feedback types disclosed herein.

At time $t_3$, the transmitter device or the receiver device may begin transmitting one or more non-sounding frames over the wireless channel for a time period $T_1$ until time $t_4$. Transmission of the non-sounding frames 1030 over the wireless channel can maintain the wireless channel in a busy state and prevent other wireless communication devices from accessing the wireless channel during the time period $T_1$. The time period $T_1$ may be based on the channel report processing time of the receiver device such that other wireless communication devices do not gain access to the wireless channel while the receiver device is generating the channel report. In this way, if the channel report processing time of the receiver device is longer than a SIFS duration, or longer than the period of time between transmission of the NDP 1022 and transmission of the Trigger Frame 1040 (or a Beamforming Report Poll frame), transmission of the non-sounding frames 1030 over the wireless channel during the time period $T_1$ may prevent the other wireless communication devices from accessing the wireless channel before or when the receiver device is ready to send the channel report to the transmitter device.

In some instances, the time period $T_1$ may be selected or based on the channel report processing time for the type of channel report requested by the transmitter device. The channel report processing time for some types of channel reports may be longer than the channel report processing time for other types of channel reports. For example, a first type of channel report that includes CSI responsive to sounding sequences and transmit parameters may take longer to generate than a second type of channel report that includes CSI responsive only to the sounding sequences. In some instances, the channel report processing time for the first type of channel report may be longer than a SIFS duration or the period of time between respective transmissions of the NDP 1022 and the Trigger Frame 1040, and transmission of the non-sounding frames 1030 over the wireless channel may allow the transmitter device to maintain medium control while delaying transmission of the trigger frame 1040 until the receiver device has generated the channel report. In some other instances, the channel report processing time for the second type of channel report may fit within the SIFS duration and the period of time between respective transmissions of the NDP 1022 and the trigger frame 1040, and transmission of the non-sounding frames 1030 over the wireless channel between times $t_3$ and $t_4$ may not be necessary.

The non-sounding frames 1030 may be any suitable frame or packet that can prevent other wireless communication devices from accessing the wireless channel during the time period $T_1$. In some implementations, the non-sounding frames 1030 can be frames transmitted over the wireless channel by a wireless communication device associated with the transmitter device or the receiver device. In this way, frame transmissions from other devices that are associated with either the transmitter device or the receiver device (and not participating in the sensing operation) can be used to maintain the wireless channel in a busy state while the receiver device generates the channel report. In some other implementations, the non-sounding frame 1030 may include (but is not limited to) a trigger frame that does not identify the receiver device, a poll frame that does not identify the receiver device, a CTS frame, a QoS Null frame, an ACK frame, a buffer status request poll (BSRP) trigger frame, or a bandwidth query report poll (BQRP) frame. In some instances, the trigger frame or poll frame may be configured to address or identify fictious devices so that the trigger frame or poll frame does not solicit responses from other nearby wireless devices. In some other implementations, the receiver device may transmit, after a SIFS duration from reception of the NDP 1022, a Compressed Beamforming Report (CBR) according to the protocol defined by one or more amendments to the IEEE 802.11 family of wireless communication standards for beamforming feedback operations. Although the CBRs generated by the receiver device may not include sufficiently detailed CSI for at least some applications of the sensing operation 1000A (or may not include any CSI), transmitting the CBRs over the wireless channel may allow the transmitter device to maintain control of the channel while the receiver device generates the channel report. In some instances, the transmitter device may send a Trigger frame or a Beamforming Report Poll frame over the wireless channel to the receiver device. The receiver device may transmit a CBR to the transmitter device within a SIFS duration after reception of the Trigger frame or Beamforming Report Poll frame. As discussed, transmission of the CBR (or a series of CBRs) may allow the transmitter device to maintain control of the channel while the receiver device generates the channel report.

At time $t_4$, the transmitter device transmits a trigger frame 1040 soliciting transmission of the requested channel report from the receiver device. The trigger frame 1040 may be any suitable frame that can solicit channel reports from the receiver device. In some implementations, the trigger frame 1040 may be one of an NDP feedback report procedure (NFRP) trigger frame, a Ranging trigger frame, or a DL PPDU carrying a trigger frame. In some instances, the trigger frame 1040 may solicit channel reports from a group of receiver devices. For example, a NFRP trigger frame can solicit channel reports from a plurality of receiver devices identified by association identifier (AID) values carried in the trigger frame.

At time $t_5$, a reporting phase begins during which the receiver device transmits the channel report 1050 to the transmitter device over the wireless channel. As discussed, the transmitter device may request different types of channel reports by including a channel report type indicator in the NDPA 1020. When the channel report 1050 includes CSI responsive to the sounding sequences and the transmit parameters of the transmitter device, the receiver device may perform additional processing on the CSI to generate the channel report (such as compared with channel reports including CSI responsive only to the sounding sequences). As such, in some instances, the receiver device may include a subset of the transmit parameters in the channel report 1050.

In some other implementations, the channel report 1050 may indicate one or more receive parameters used by the receiver device to receive the sounding sequences carried by the NDP 1022. Example receive parameters may include (but are not limited to) receive antenna indexes, automatic gain control (AGC) per receive chain, estimated CFO, received signal strength indication (RSSI) per antenna, or any spatial mapping of the sounding sequences to different receive antennas.

By time $t_6$, the transmitter device receives the requested channel report 1050 from the receiver device. The transmitter device may use the channel report 1050 to detect changes in channel estimates or channel conditions indicative of the presence, absence, or movement of various objects in the surrounding environment. When the channel report 1050 includes CSI based on the sounding sequences and the transmit parameters used for transmitting the sounding sequences over the wireless channel, the transmitter device may compensate for variations in CSI that could otherwise be attributed to changes in the transmit parameters. For example, the transmitter device may compare only the CSI reported by the receiver device with other CSI associated with the same transmit parameters. When the channel report 1050 includes CSI based on the sounding sequences and the receive parameters used by the receiver device to receive the sounding sequences, the transmitter device may compensate for variations in CSI that could otherwise be attributed to changes in the receive parameters of the receiver device. For example, the transmitter device may compare only the CSI reported by the receiver device with other CSI associated with the same receive parameters. In this way, implementations of the subject matter disclosed herein may compensate for changes in CSI resulting from variations in either the transmission characteristics of the transmitter device or the reception characteristics of the receiver device (rather than changes in CSI resulting from the movement of objects within a wireless coverage area of the transmitter device).

Figure 10B:
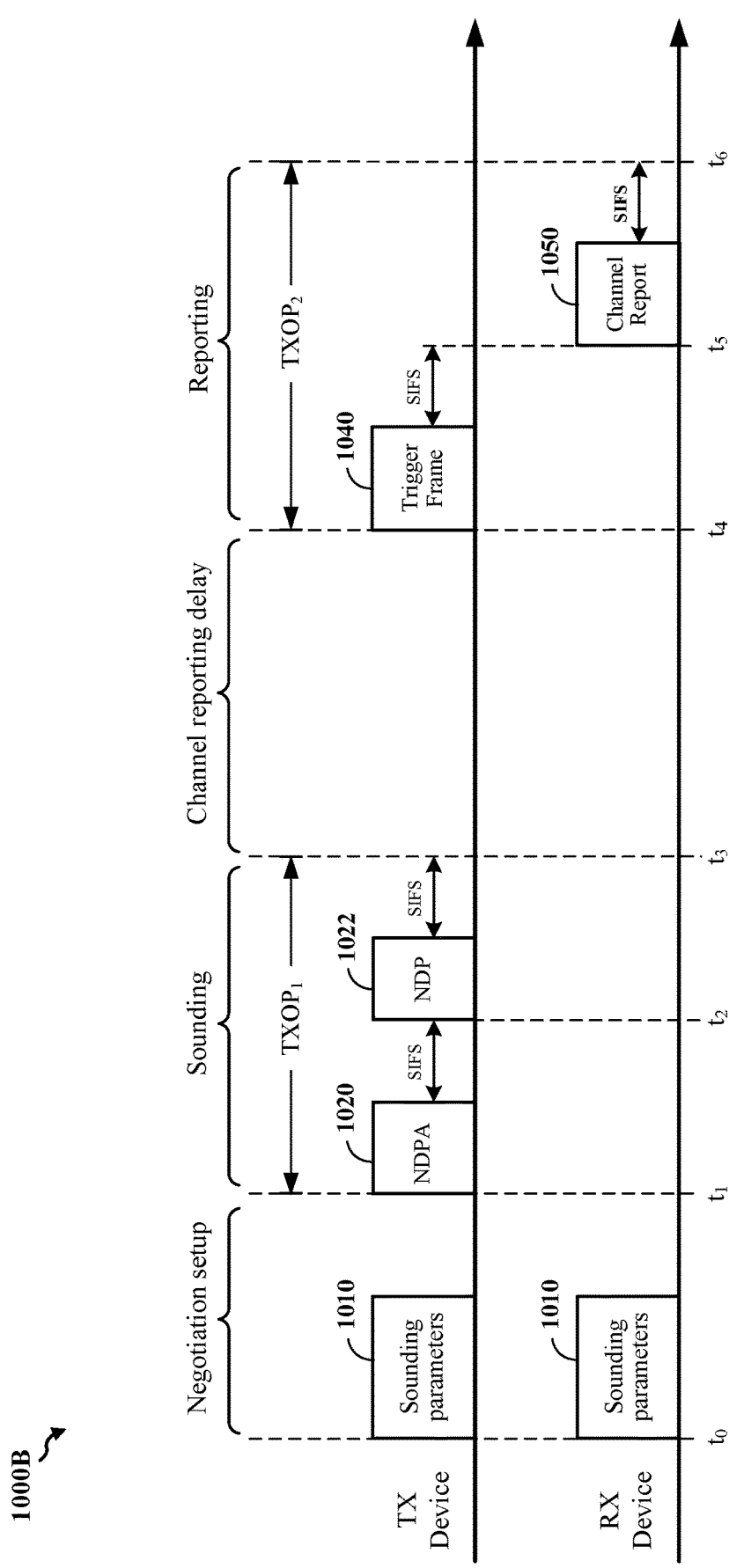
FIG. 10B shows a timing diagram illustrating another example sensing operation that supports explicit channel sounding.

FIG. 10B shows a timing diagram illustrating another example sensing operation 1000B that supports explicit channel sounding. The communications shown in the example of FIG. 10B are exchanged between the transmitter device and the receiver device described with reference to FIG. 10A. Although only one transmitter device and one receiver device are shown in the example of FIG. 10B, in some other instances, the sensing operation 1000B may include one or more transmitter devices, one or more additional receiver devices, or both.

At time to, the transmitter device and receiver device may exchange capability information and sounding parameters 1010 with each other during negotiation setup, as described with reference to FIG. 10A. In some implementations, the sounding parameters 1010 negotiated between the transmitter device and the receiver device may explicitly indicate that NDPs transmitted during the sensing operation 1000B do not require an immediate response from the receiver device. That is, the receiver device does not need to transmit a response to the NDP 1022 within one of the interframe spacing (IFS) durations defined by the IEEE 802.11 family of wireless communication standards, and may instead provide the channel report to the transmitter device at a later time.

The sounding parameters 1010 also may indicate that channel reports responsive to NDPs may be solicited or scheduled for transmission to the transmitter device separately from the reception of the NDPs. In some implementations, trigger frame transmissions to the receiver device may be scheduled based on the channel report processing time of the receiver device. In some instances, transmission of the trigger frame 1040 may be delayed for a time period similar to the channel report processing time of the receiver device, thereby allowing the receiver device sufficient time to generate any type of channel report requested by the transmitter device. In some other instances, transmission of the trigger frame 1040 may be delayed for a time period greater than the channel report processing time of the receiver device. In this way, trigger frame transmissions, and thus the delivery of solicited channel reports to the transmitter device, may be scheduled at later times (such as when network congestion is expected to decrease).

The scheduled later times may or may not fall within the same TXOP as the transmission or reception of the NDP 1022. That is, the trigger frame may be scheduled for transmission in the same TXOP as the transmission of sounding sequences over the wireless channel (such as TXOP1), or may be scheduled for transmission in a subsequent TXOP (such as TXOP2), for example, as depicted in FIG. 10B. In some instances, the sounding parameters 1010 may indicate one or more of a minimum time period between respective transmissions of the sounding sequences and the trigger frame, a maximum time period between respective transmissions of the sounding sequences and the trigger frame, or a specified time period between respective transmissions of the sounding sequences and the trigger frame.

In some other implementations, transmissions of the NDP 1022, the trigger frame 1040, and the channel report 1050 may be scheduled during an availability window on the wireless channel. In some instances, the availability window may employ one or more frame sequences, frame formats, scheduling protocols, or trigger-based reporting mechanisms associated with a target wait time (TWT) session. In some implementations, the availability window may correspond to a service period of a TWT session.

By allowing the receiver device to transmit the channel report 1050 in response to the trigger frame 1040 (such as rather than within a SIFS duration after reception of the NDP 1022), the sensing operation 1000B may allow the receiver device additional time to generate any type of channel report requested by the transmitter device. In this way, channel reports generated by the receiver device will be ready when solicited by the transmitter device.

During the sounding phase, the transmitter device sends the NDPA 1020 over the wireless channel to the receiver device at time $t_1$, and sends the NDP 1022 over the wireless channel to the receiver device at time $t_2$. As discussed, the NDPA 1020 may include or indicate transmit parameters used by the transmitter device for transmitting the NDP 1022 over the wireless channel. The NDPA 1020 also may indicate the type of channel report requested by the transmitter device, as described with reference to FIG. 10A. In some instances, neither the transmitter device nor the receiver device actively sounds the channel between times $t_3$ and $t_4$, which may correspond to the channel report processing time of the receiver device.

At time $t_4$, the transmitter device transmits a trigger frame 1040 over the wireless channel to the receiver device. The trigger frame 1040 may be any suitable frame that can solicit channel reports from the receiver device. In some instances, the trigger frame 1040 may be one of a NFRP trigger frame, a Beamforming Report Poll frame, a BFRP trigger frame, a Ranging trigger frame, or a DL PPDU carrying a trigger frame. In some instances, the trigger frame 1040 may solicit channel reports from a group of receiver devices.

In response to receiving the trigger frame 1040, the receiver device transmits the requested channel report 1050 to the transmitter device at time $t_5$. By time $t_6$, the transmitter device receives the requested channel report 1050 from the receiver device. The transmitter device may use the channel report 1050 to detect changes in channel estimates or channel conditions indicative of the presence, absence, or movement of various objects in the surrounding environment.

Figure 10C:
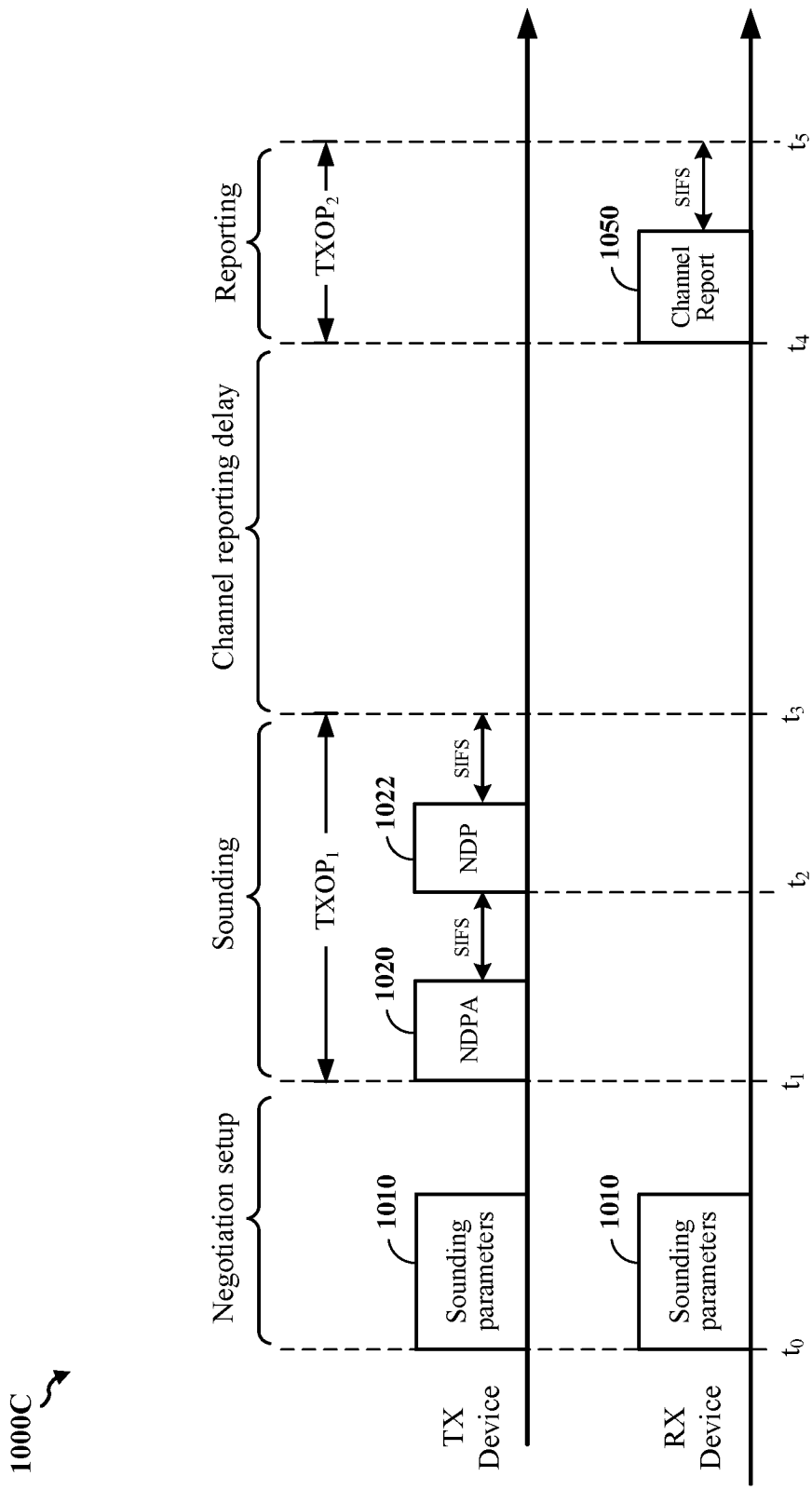
FIG. 10C shows a timing diagram illustrating another example sensing operation that supports explicit channel sounding.

FIG. 10C shows a timing diagram illustrating another example sensing operation 1000C that supports explicit channel sounding. The communications shown in the example of FIG. 10C are exchanged between the transmitter device and the receiver device described with reference to FIG. 10A. Although only one transmitter device and one receiver device are shown in the example of FIG. 10C, in some other instances, the sensing operation 1000C may include one or more transmitter devices, one or more additional receiver devices, or both.

The sensing operation 1000C of FIG. 10C is similar in some aspects to the sensing operation 1000B of FIG. 10B. One notable exception is that the transmitter device does not transmit frames to solicit channel reports from the receiver device in the sensing operation 1000C of FIG. 10C. Instead, the sounding parameters 1010 exchanged or negotiated during the negotiation setup may indicate one or more times at which the receiver device is scheduled to transmit channel reports to the transmitter device. That is, the transmitter device and the receiver device may determine a transmission schedule for channel reports generated by the receiver device. In some instances, the sounding parameters 1010 may indicate one or more of a minimum time period between respective transmissions of the NDPs 1022 (or other sounding frames) and the channel report 1050, a maximum time period between respective transmissions of the NDPs 1022 and the channel report 1050, or a specified time period between respective transmissions of the NDPs 1022 and the channel report 1050.

In some implementations, the sounding parameters 1010 may explicitly indicate that NDPs transmitted during the sensing operation 1000C do not require an immediate response from the receiver device. That is, the receiver device does not need to transmit a response to the NDP 1022 within one of the IFS durations defined by the IEEE 802.11 family of wireless communication standards, and may instead provide the channel report to the transmitter device at a later time indicated by the sounding parameters 1010, at a later time negotiated between the transmitter device and the receiver device, or at the discretion of the receiver device In some other implementations, the sounding parameters 1010 may indicate that transmissions of channel reports responsive to NDPs or other sounding frames are to be scheduled (rather than solicited) separately from the reception of the NDPs or other sounding frames. In some instances, the transmission of channel reports 1050 to the transmitter device may be scheduled based on the channel report processing time of the receiver device. In some instances, transmission of the channel report 1050 may be delayed for a time period similar to the channel report processing time of the receiver device, thereby allowing the receiver device sufficient time to generate any type of channel report requested by the transmitter device. In this way, the sensing operation 1000C may ensure that channel reports provided to the transmitter device are complete. In some other instances, transmission of the channel report 1050 may be delayed for a time period greater than the channel report processing time of the receiver device. In this way, channel report transmissions to the transmitter device may be scheduled at later times (such as when network congestion is expected to decrease).

The scheduled later times may or may not fall within the same TXOP as the transmission or reception of the NDP. That is, the channel report 1050 may be scheduled for transmission in the same TXOP (such as TXOP1) as the transmission of sounding sequences over the wireless channel, or may be scheduled for transmission in a subsequent TXOP (such as TXOP2), for example, as depicted in FIG. 10C. In some instances, the sounding parameters 1010 may indicate one or more of a minimum time period between respective transmissions of the NDP 1022 (or other sounding frames) and the channel report 1050, a maximum time period between respective transmissions of the NDP 1022 and the channel report 1050, or a specified time period between respective transmissions of the NDP 1022 and the channel report 1050.

In some other implementations, transmissions of the NDP 1022 and the channel report 1050 may be scheduled during an availability window on the wireless channel. In some instances, the availability window may employ one or more frame sequences, frame formats, or scheduling protocols associated with a TWT session. In one implementation, the availability window may correspond to a service period of a TWT session.

Figure 10D:
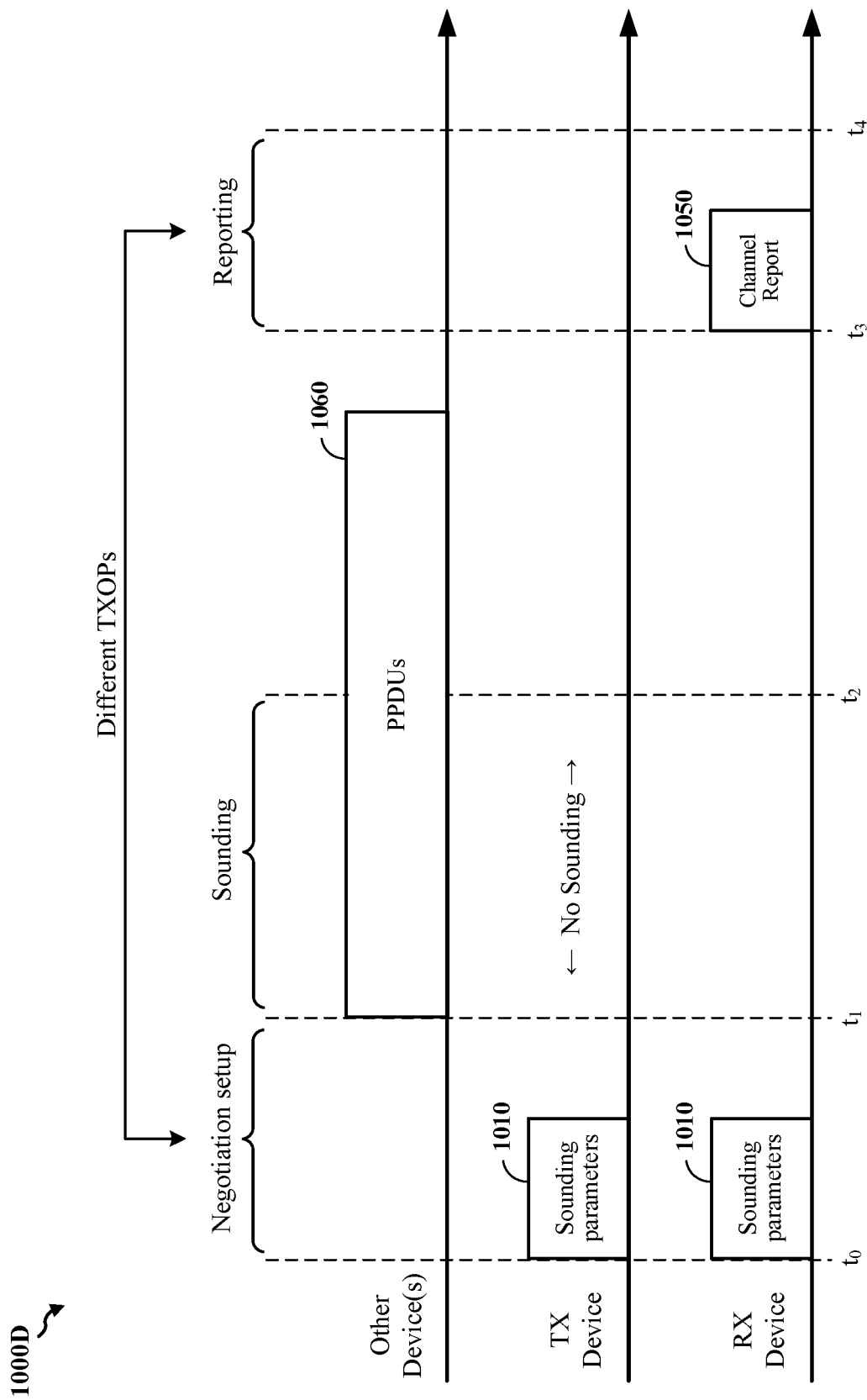
FIG. 10D shows a timing diagram illustrating an example sensing operation on a wireless channel.

FIG. 10D shows a timing diagram illustrating another example sensing operation 1000D that supports explicit channel sounding. The communications shown in the example of FIG. 10D are exchanged between the transmitter device and the receiver device described with reference to FIG. 10A. Although only one transmitter device and one receiver device are shown in the example of FIG. 10D, in some other instances, the sensing operation 1000D may include one or more transmitter devices, one or more additional receiver devices, or both.

The sensing operation 1000D of FIG. 10D is similar in some aspects to the sensing operation 1000C of FIG. 10C. One notable exception is that the transmitter device does not transmit sounding sequences or trigger frames to the receiver device in the sensing operation 1000D of FIG. 10D. Instead, the receiver device may obtain the CSI of certain frames or PPDUs transmitted over the wireless channel without involvement of the transmitter device, generate a channel report based on the obtained CSI, and transmit the channel report to the transmitter device at a scheduled time. As such, the sounding parameters 1010 exchanged or negotiated between the transmitter device and the receiver device during the negotiation setup between times $t_1$ and $t_2$ may indicate a schedule for transmitting channel reports to the transmitter device.

In some implementations, the sounding parameters 1010 may explicitly indicate that the transmitter device is not scheduled to transmit sounding sequences from which the receiver device can estimate channel conditions or generate channel reports. The sounding parameters 1010 also may indicate that the receiver device is to select or determine which frames or PPDUs transmitted over the wireless channel from one or more other devices may be used to estimate channel conditions and generate channel reports. In some instances, the sounding parameters 1010 may specify or define a group of frames or PPDUs that the receiver device may use to estimate channel conditions and generate channel reports.

In some aspects, the sounding parameters 1010 may permit the receiver device to generate channel reports based on frames for which the transmitter address (TA), the receiver address (RA), or the BSSID MAC address matches one or more reference addresses. In some other aspects, the sounding parameters 1010 may permit the receiver device to generate channel reports based on frames having a specified transmission bandwidth or on frames having a transmission bandwidth greater than a threshold bandwidth. In some other aspects, the sounding parameters 1010 may permit the receiver device to generate channel reports based on frames transmitted using a specified number of space-time streams or on frames transmitted using more than a threshold number of space-time streams. In some other aspects, the sounding parameters 1010 may permit the receiver device to generate channel reports based on frames having a specified PHY (such as HE or EHT PPDUs) or on frames having a specified type (such as beacon frames or ACKs). Additionally, the sounding parameters 1010 may indicate that the receiver device is not to use frames older than a specified lifespan to estimate channel conditions and generate channel reports.

As shown in the example of FIG. 10D, neither the transmitter device nor the receiver device actively participate in channel sounding during the sounding phase between times $t_1$ and $t_2$. That is, the transmitter device does not transit sounding sequences, NDPs, or sounding frames over the wireless channel during the sounding phase (or during other portions of the sensing operation 1000D). The receiver device may use frames or PPDUs 1060 transmitted over the wireless channel by the one or more other devices that satisfy one or more of the frame requirements indicated by the sounding parameters 1010 to generate a channel report. In some implementations, the receiver device may compare transmission parameters, bandwidths, frame types, frame formats, and other characteristics of the PPDUs 1060 with reference information to determine whether a respective PPDU 1060 can be used to generate a channel report. For example, when a respective PPDU 1060 is transmitted using the same number of space-time streams or the same transmission bandwidth indicated by the sounding parameters 1010, the receiver device may use the CSI of the respective PPDU 1060 to generate the channel report 1050.

In some instances, the receiver device may use long training fields (LTFs) carried in the PHY headers of the PPDUs 1060 to estimate channel conditions or obtain the CSI of the wireless channel. The receiver device may use the CSI obtained from the LTFs of the PPDUs 1060 to generate the channel report 1050. In the example of FIG. 10D, the receiver device transmits the channel report 1050 to the transmitter device at time $t_3$, which may be scheduled according to the sounding parameters 1010.

By time $t_4$, the transmitter device receives the channel report 1050 from the receiver device. The transmitter device may use the channel report 1050 to detect changes in channel estimates or channel conditions indicative of the presence, absence, or movement of various objects in the surrounding environment. In some instances, the channel report 1050 may include information associated with the reception of frames or PPDUs 1060 from which the CSI included in the channel report 1050 was obtained. Example information of a frame may include (but is not limited to) the time-of-arrival (TOA) of the frame, the angle-of-arrival (AoA) of the frame, the TSF value of the frame, the MAC address of the frame, the RSSI of the frame, the type of frame, or the format of the frame.

In some other implementations, transmissions of the channel report 1050 may be scheduled within an availability window on the wireless channel. In some instances, the availability window may have a duration selected or based on the channel report processing time of the receiver device. In one implementation, transmissions of the channel report 1050 may be scheduled during a TWT session established on the wireless channel.

Figure 11A:
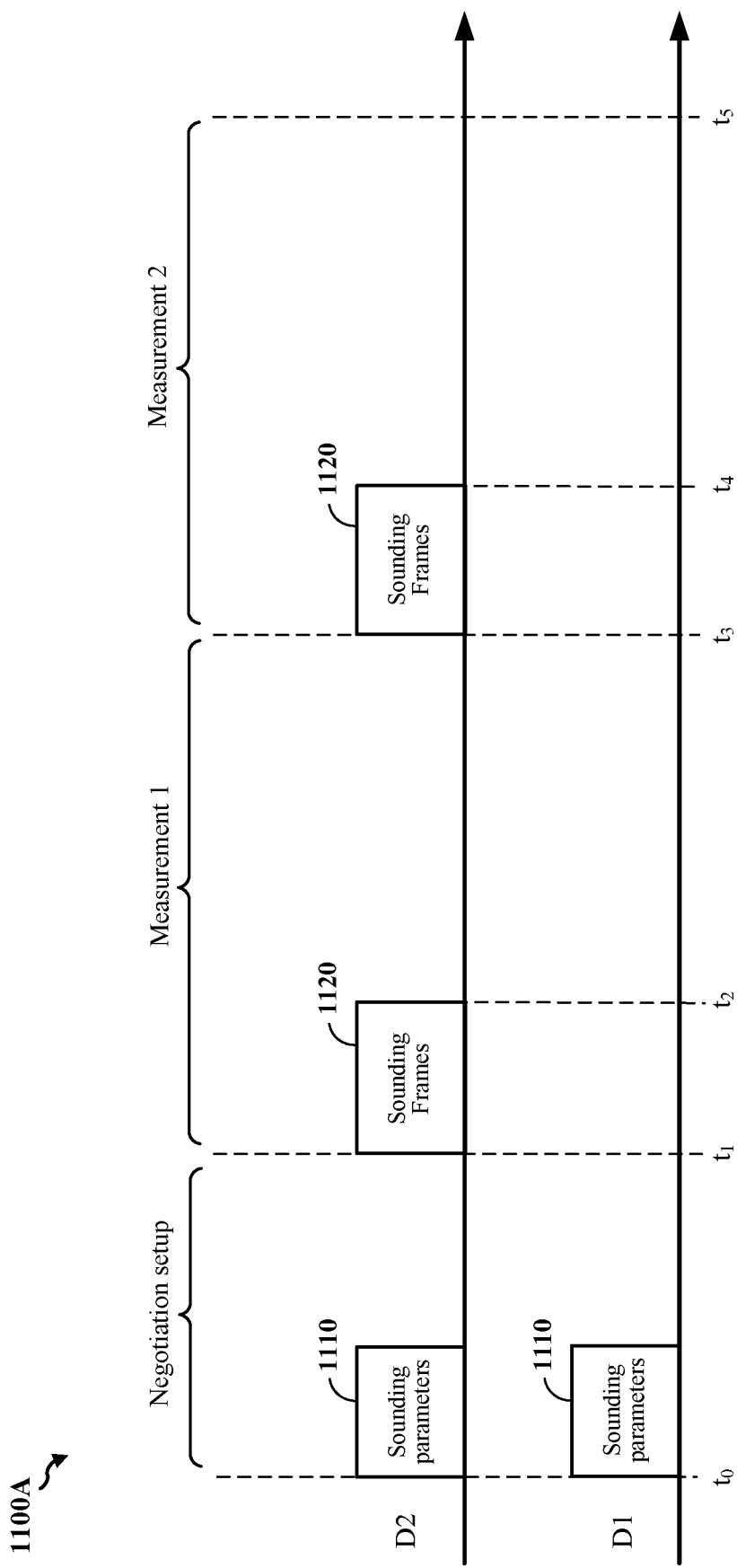
FIG. 11A shows a timing diagram illustrating an example sensing operation that supports implicit channel sounding.

FIG. 11A shows a timing diagram illustrating an example sensing operation 1100A that supports implicit channel sounding. The communications shown in the example of FIG. 11A are exchanged between a first wireless communication device (D1) and one or more second wireless communication devices (D2). The first and second wireless communication devices D1 and D2 may be any suitable wireless communication devices. In some implementations, the first wireless communication device D1 may be a wireless station such as the STAs 104 and 604 described with reference to FIGS. 1 and 6B, respectively, and the second wireless communication devices D2 may be an AP such as the APs 102 and 602 described with reference to FIGS. 1 and 6A, respectively. In some other implementations, the first and second wireless communication devices D1 and D2 may be wireless stations such as the STAs 104 and 604 described with reference to FIGS. 1 and 6B, respectively. Further, although only one of the second wireless communication devices D2 is shown in the example of FIG. 11A, in some other instances, the sensing operation 1100A may include any number of second wireless communication devices D2 that transmit sounding frames over the wireless channel to the first wireless communication device D1.

At time $t_0$, the first and second wireless communication devices D1 and D2 may exchange capability information and negotiate sounding parameters 1110 with each other during a negotiation setup. The capability information may indicate supported operating modes, supported transmission bandwidths, the maximum number of space-time streams, extended range (ER) capabilities, and so on of each device. The sounding parameters 1110 may include a transmission schedule and transmit parameters for D2 to send sounding frames to D1 over the wireless channel.

The transmission schedule may indicate periodic times or intervals at which D2 is to transmit sounding frames over the wireless channel. In some implementations, the transmission schedule may be based on an availability window on the wireless channel. In some instances, the transmission schedule may be based on or include one or more aspects of a TWT session or protocol. In some instances, the availability window spans the duration of the sensing operation 1100A. In some other instances, the availability window spans the duration of a corresponding measurement session of the sensing operation 1100A. In some other implementations, the sensing operation 1100A may include or employ other suitable mechanisms to ensure that wireless communication devices participating in the sensing operation 1100A are awake at the appropriate times (such as to transmit sounding sequences over the wireless channel, to receive sounding sequences from the wireless channel, to transmit channel reports over the wireless channel, or to receive channel reports from the wireless channel).

The transmit parameters may be used by D2 for transmitting sounding sequences configured for obtaining channel state information (CSI) of the wireless channel. Example transmit parameters may include (but are not limited to) the transmission bandwidth of the sounding frames, MCS values, the number of spatial streams used to transmit the sounding frames, the type of PHY headers of PPDUs carrying the sounding frames, the transmit antenna indexes of D2, the power levels of sounding frame transmissions, phase shifts and cyclic shift delays (CSDs) associated with sounding frame transmissions, estimated carrier frequency offsets (CFOs), or spatial mappings between the sounding sequences and the transmit antennas.

In some instances, the transmit parameters also may include the transmitter address (TA) carried in the MAC header of sounding frames. The TA, which may be an individual MAC address, a broadcast MAC address, or an association identifier (AID) value, may be used to determine whether a corresponding sounding frame was requested by D1 or by another wireless communication device. In some aspects, broadcast MAC addresses and AID values may be used for peer-to-peer (P2P) sounding operations.

In some implementations, D1 may request or propose the transmission schedule and transmit parameters. In some instances, D2 may accept the transmission schedule and transmit parameters proposed by D1. In some other instances, D2 may propose a different transmission schedule or different transmit parameters. By time $t_1$, the first and second wireless communication devices D1 and D2 agree on the transmission schedule and transmit parameters, which may be included in the sounding parameters 1110 negotiated for the sensing operation 1100A.

A first measurement session begins with D2 transmitting one or more sounding frames 1120 over the wireless channel to D1 between times $t_1$ and $t_2$. D2 may use the transmit parameters indicated by the sounding parameters 1110 when transmitting the sounding frames 1120 to D1. The sounding frames 1120 may be any suitable frame, packet, or signal from which D1 can estimate channel conditions or obtain CSI. In some instances, the sounding frames 1120 may be an NDPA followed by an NDP, for example, as described with reference to FIGS. 10A-10C. D1 receives the sounding frames 1120 by time $t_2$, and uses sounding sequences (such as LTFs) carried in the sounding frames 1120 to obtain CSI of the wireless channel. D1 may use the CSI to generate a channel report, and may use the channel report to detect changes in channel estimates or channel conditions indicative of the presence, absence, or movement of various objects in the surrounding environment. In some instances, D1 may use the transmit parameters associated with transmitting the sounding frames 1120 to determine the CSI or generate the channel report. In some other instances, D1 may use the receive parameters associated with receiving the sounding frames 1120 to determine the CSI or generate the channel report.

At time $t_3$, the first measurement session ends. Just after time $t_3$ (such as a SIFS duration after time $t_3$), a second measurement session begins with D2 transmitting one or more sounding frames 1120 over the wireless channel to D1 between times $t_3$ and $t_4$. D1 may use sounding sequences carried in the sounding frames 1120 to generate channel reports, as described with reference to the first measurement session. The sensing operation 1100A may continue for as many measurement sessions as agreed upon by the first and second wireless communication devices D1 and D2. In some implementations, D2 may contend for channel access at each of the scheduled times or intervals using any suitable medium access contention operation. Upon gaining channel access, D2 may obtain a TXOP and transmit the sounding frames 1120 over the wireless channel to D1.

Figure 11B:
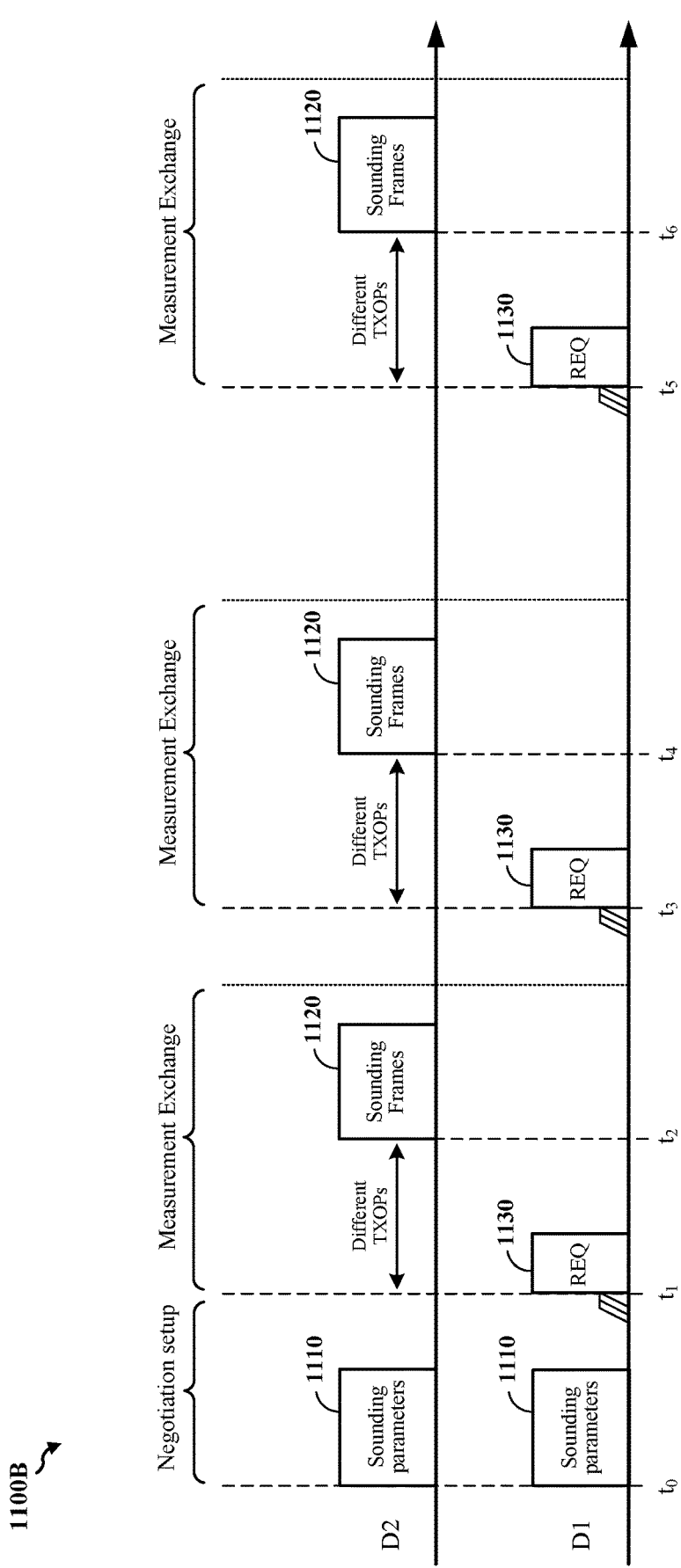
FIG. 11B shows a timing diagram illustrating another example sensing operation that supports implicit channel sounding.

FIG. 11B shows a timing diagram illustrating another example sensing operation 1100B that supports implicit channel sounding. The communications shown in the example of FIG. 11B are exchanged between the first wireless communication device (D1) and the second wireless communication device (D2) described with reference to FIG. 11A. Although only one of the second wireless communication devices D2 is shown in the example of FIG. 11B, in some other instances, the sensing operation 1100B may include any number of second wireless communication devices D2 that can transmit sounding sequences over the wireless channel to the first wireless communication device D1.

The sensing operation 1100B of FIG. 11B is similar in some aspects to the sensing operation 1100A of FIG. 11A. One notable exception is that the transmission of sounding frames 1120 in the example of FIG. 11B is requested by the first wireless communication device D1, rather than scheduled at periodic times or intervals as described with reference to FIG. 11A. In this way, the sensing operation 1100B may allow for dynamic sounding frame transmissions between the first and second wireless communication devices D1 and D2 without a persistent transmission schedule.

In some implementations, the first wireless communication device D1 may request the second wireless communication device D2 to transmit one or more sounding frames over the wireless channel at any time. At time $t_1$, D1 contends for channel access, obtains a transmission opportunity (TXOP), and transmits a request (REQ) frame 1130 over the wireless channel to D2. The request frame 1130 may be any suitable frame that can solicit the transmission of sounding frames from D2. In some instances, the request frame 1130 may indicate the number of sounding frames 1120 to be sent over the wireless channel. In some other instances, the request frame 1130 may request one or more bursts of sounding frames to be sent over the wireless channel.

D2 receives the request frame 1130, and contends for channel access. D2 obtains a TXOP, and transmits one or more sounding frames 1120 over the wireless channel to D1.

In some instances, the request frame 1130 and the sounding frames 1120 may be transmitted over the wireless channel during different TXOPs.

D1 receives the sounding frames 1120, and uses the sounding sequences (such as LTFs) carried in the sounding frames 1120 to obtain CSI of the wireless channel. D1 may use the CSI to generate one or more types of channel reports, for example, as described with reference to FIGS. 10A-10D. D1 may use the channel reports to detect changes in channel estimates or channel conditions indicative of the presence, absence, or movement of various objects in the surrounding environment. In some instances, D1 may use the transmit parameters to determine the CSI or generate the channel report. In some other instances, D1 may use the receive parameters to determine the CSI or generate the channel report.

In some implementations, the sensing operation 1100B may employ scheduling mechanisms to ensure that D2 is awake to receive the request frames 1130 or to ensure that D1 is awake to receive the sounding frames 1120. In some instances, the sensing operation 1100B may include an availability window during which D1 maintains control of the wireless medium, for example, by transmitting frames over the wireless channel during the availability window. In some implementations, the availability window spans the duration of the sensing operation 1100B. In some other instances, the availability window spans the duration of a corresponding measurement exchange over the wireless channel. In some aspects, the sounding parameters negotiated during setup may indicate a maximum delay time between respective transmissions of the request frame 1130 and the sounding frames 1120.

As shown in the example of FIG. 11B, the first wireless communication device D1 contends for channel access and sends request frames 1130 to the second wireless communication devices D2 at times $t_3$ and $t_5$, thereby initiating two additional measurement exchanges over the wireless channel. The sensing operation 1100B may continue in this manner until terminated.

Figure 11C:
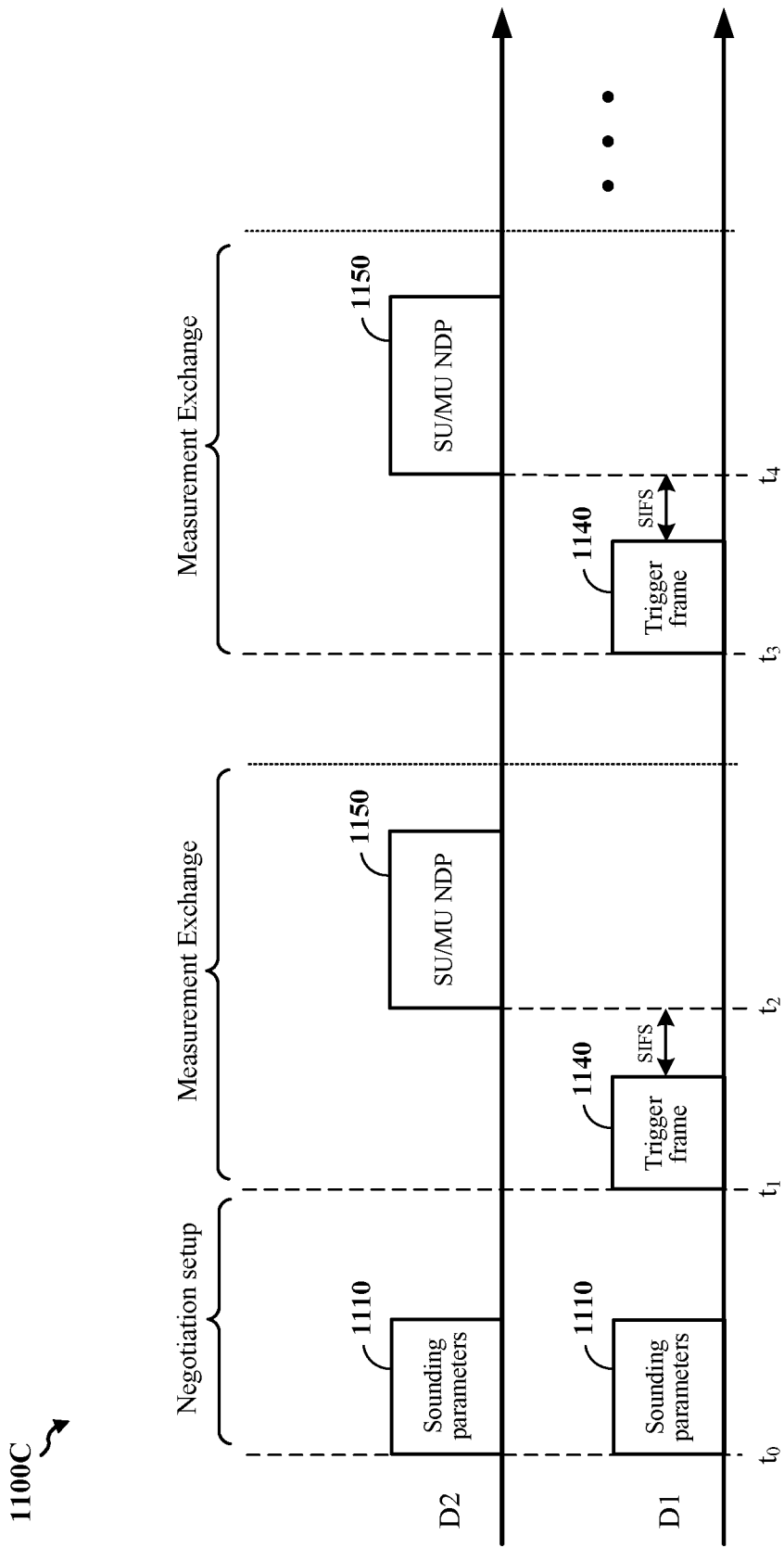
FIG. 11C shows a timing diagram illustrating another example sensing operation that supports implicit channel sounding.

FIG. 11C shows a timing diagram illustrating another example sensing operation 1100C that supports implicit channel sounding. The communications shown in the example of FIG. 11C are exchanged between the first wireless communication device (D1) and the second wireless communication device (D2) described with reference to FIG. 11A. Although only one of the second wireless communication devices D2 is shown in the example of FIG. 11C, in some other instances, the sensing operation 1100C may include any number of second wireless communication devices D2 that can transmit sounding sequences over the wireless channel to the first wireless communication device D1.

The sensing operation 1100C of FIG. 11C is similar in some aspects to the sensing operation 1100B of FIG. 11B. One notable exception is that D2 transmits sounding frames immediately (such as within a SIFS duration) after receiving a request or trigger frame soliciting transmission of the sounding frames. For example, at time $t_1$, D1 transmits a trigger frame 1140 over the wireless channel to D2. The trigger frame 1140 may be any suitable frame that can solicit the transmission of sounding frames from D2. In some instances, the trigger frame 1140 may be (but is not limited to) a NFRP trigger frame, a Ranging trigger frame, or a DL PPDU carrying a trigger frame.

D2 receives the trigger frame 1140, and transmits an NDP 1150 over the wireless channel to D1 at time $t_2$ (which may be a SIFS duration after D2 receives the trigger frame 1140).

In some implementations, the NDP 1150 may be proceeded by a corresponding NDPA (not shown for simplicity), for example, such as the NDPA 1020 and NDP 1022 described with reference to FIG. 10A. The NDP 1150 carries sounding sequences (such as LTFs) configured for channel estimation or for obtaining channel state information (CSI) of the wireless channel. In some instances, the NDP may be a single-user (SU) NDP. In some other instances, the NDP may be a multi-user (MU) NDP.

D1 receives the NDP 1150 from D2, and obtains CSI based on the sounding sequences carried in the NDP. D1 may use the CSI to generate one or more types of channel reports, for example, as described with reference to FIGS. 10A-10D. D1 may use the channel reports to detect changes in channel estimates or channel conditions indicative of the presence, absence, or movement of various objects in the surrounding environment. In some instances, D1 may use the transmit parameters to determine the CSI or generate the channel report. In some other instances, D2 may use the receive parameters to determine the CSI or generate the channel report.

Figure 12:
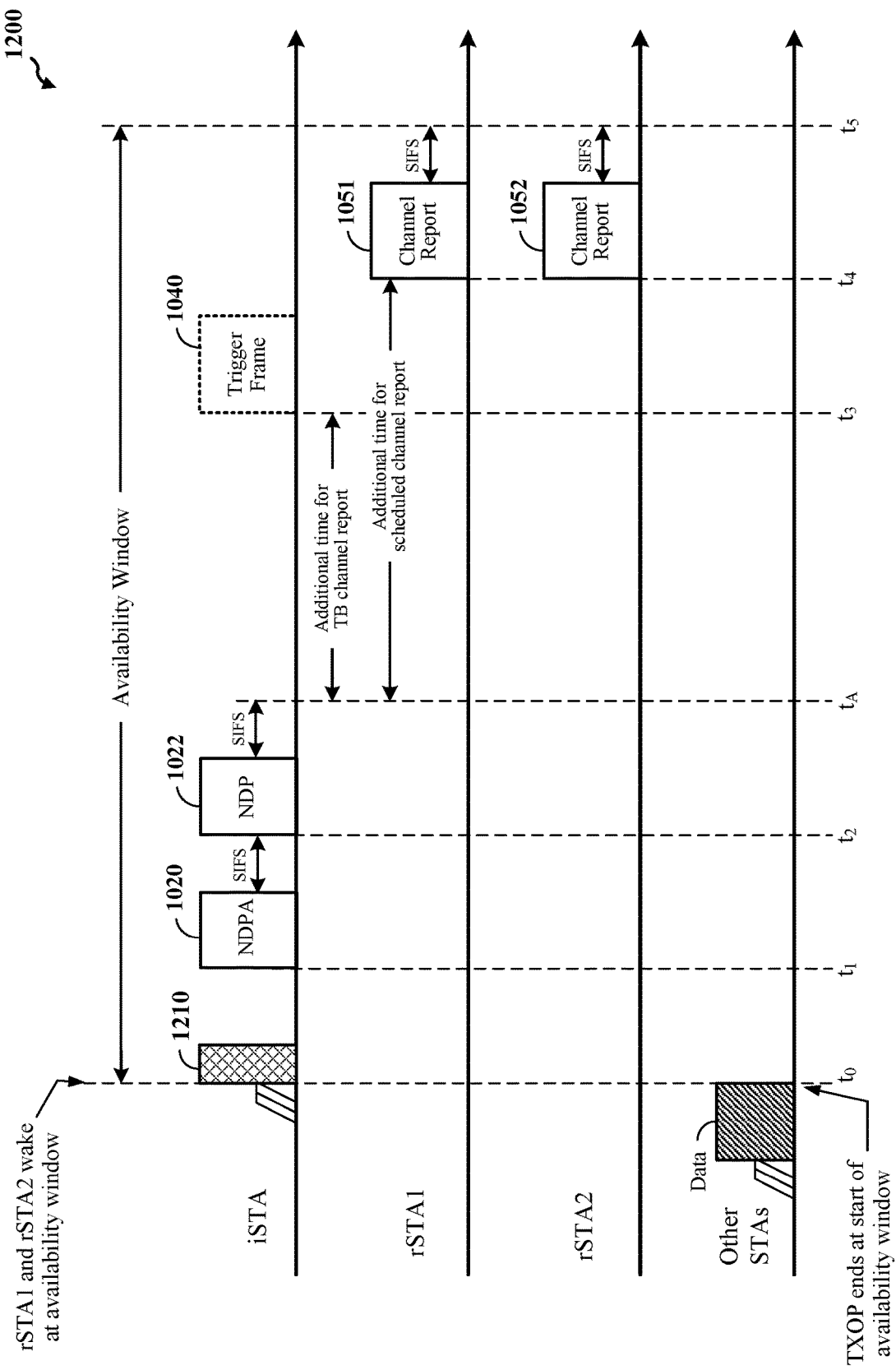
FIG. 12 shows a timing diagram illustrating an example sensing operation that supports explicit channel sounding within an availability window.

FIG. 12 shows a timing diagram illustrating an example sensing operation 1200 that supports explicit channel sounding scheduled in an availability window on a wireless channel. The communications shown in the timing diagram 1200 are exchanged between an initiator device (TSTA) and two responder devices (rSTAs) that are members of or belong to a sounding session on the wireless channel, one or more other STAs that are in communication range of the AP but are not members of the sounding session. The iSTA may be an AP such as one of the APs 102 and 602 described with reference to FIGS. 1 and 6A, respectively. The responder devices rSTA1 and rSTA2 may be a wireless station such as one of the STAs 104 and 604 described with reference to FIGS. 1 and 6B, respectively. The other STAs may examples of the STAs 104 and 604 described with reference to FIGS. 1 and 6B, respectively. For simplicity, the example of FIG. 12 depicts only two responder devices rSTA1 and rSTA2 associated with the sounding session. In some other implementations, the sounding session may include fewer or more rSTAs than those depicted in the example of FIG. 12.

Prior to time to, the TSTA may establish a sounding session for a group of STAs participating in a wireless sensing operation. The sounding session includes at least one availability window during which the TSTA reserves access to the wireless medium only for STAs associated with or participating in the sounding session. As discussed, rSTA1 and rSTA2 belong to the sounding session and participate in the wireless sensing operation, and the other STAs do not participate in the wireless sensing operation and do not belong to the sounding session. In some implementations, the sounding session may include a plurality of availability windows.

Prior to time to, which indicates the start of the availability window, the responder devices rSTA1 and rSTA2 wake up from a power-save (PS) mode or sleep state to listen for beacon frames and other management frames. Also prior to time to, the iSTA contends for medium access and obtains a TXOP on the wireless channel. In some implementations, the iSTA may transmit a frame 1210 over the wireless channel at time $t_0$. The frame 1210 may identify one or more STAs permitted to contend for channel access during the sounding session. The frame 1210 also may indicate that each STA not identified by the frame 1210 is to refrain from contending for channel access during the TXOP (or during the availability window). In some aspects, the frame 1210 may indicate that each STA not identified by the frame 1210 is to enter a power-save (PS) mode after reception of the frame 1210. In some instances, the frame 1210 may be a CTS frame. In some other instances, the frame 1210 may be a MU-RTS trigger frame. In some other implementations, the iSTA may not transmit the frame 1210.

At time $t_1$, the iSTA transmits an NDPA 1020 over the wireless channel to rSTA1 and rSTA2, followed by an NDP 1022 at time $t_2$. The NDPA 1020 may announce the transmission of the NDP 1022, and may indicate the transmit parameters to be used by the iSTA for transmitting the NDP 1022 over the wireless channel. The NDP 1022 may carry one or more sounding sequences configured for channel estimation or for obtaining CSI of the wireless channel.

In some implementations, the iSTA may, at time $t_3$, transmit a trigger frame 1040 that solicits channel reports 1051 and 1052 from respective responder devices rSTA1 and rSTA2. In some other implementations, the sounding parameters may indicate a channel report transmission schedule for rSTA1 and rSTA2, for example, such that the iSTA does not transmit the trigger frame 1040 to rSTA1 and rSTA2. In some instances, rSTA1 and rSTA2 may transmit respective channel reports 1051 and 1052 at one or more channel report transmission times or intervals indicated by the sounding parameters. In this way, the transmissions of channel reports 1051 and 1052 from respective responder devices rSTA1 and rSTA2 in the example of FIG. 12 may be scheduled by the sounding parameters, rather than solicited from the iSTA.

At time $t_4$, rSTA1 and rSTA2 transmit respective channel reports 1051 and 1052 over the wireless channel to the iSTA. As discussed, in some implementations, the transmission of respective channel reports 1051 and 1052 from rSTA1 and rSTA2 may be solicited by the trigger frame 1040. In some instances, the period of time between times $t_4$ and $t_3$ may be based on the channel report processing time of the responder devices, thereby providing the responder devices with additional time to generate respective channel reports 1051 and 1052.

In some other implementations, the transmission of respective channel reports 1051 and 1052 from rSTA1 and rSTA2 may be scheduled according to the sounding parameters. In some instances, the period of time between times $t_A$ and $t_4$ may be responsive to the channel report processing time of the responder devices, thereby providing the responder devices with additional time to generate respective channel reports 1051 and 1052. At time $t_5$, the availability window ends, and the other STAs may contend for channel access.

Figure 13:
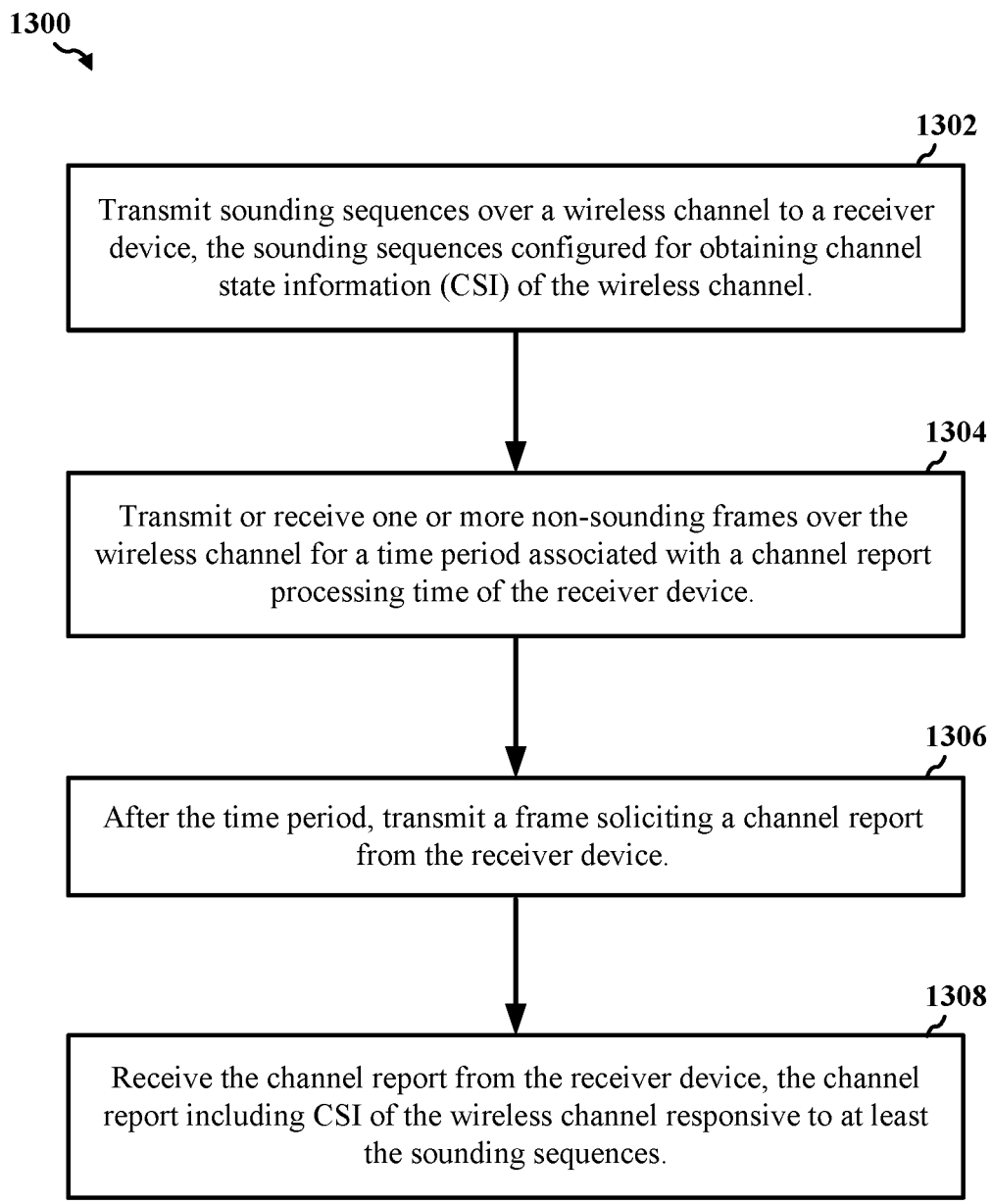
FIG. 13 shows a flowchart illustrating an example operation for wireless sensing that supports explicit channel sounding.

FIG. 13 shows a flowchart illustrating an example operation 1300 for wireless sensing that supports explicit channel sounding. The operation 1300 may be performed by or between a transmitter device and a receiver device. In some implementations, the transmitter device may be an AP such as one of the APs 102 or 602 described with reference to FIGS. 1 and 6A, respectively, and the receiver device may be a STA such as one of the STAs 104 or 604 described with reference to FIGS. 1 and 6B, respectively.

At block 1302, the transmitter device transmits sounding sequences over a wireless channel to a receiver device, the sounding sequences configured for obtaining channel state information (CSI) of the wireless channel. At block 1304, the transmitter device transmits or receives one or more non-sounding frames over the wireless channel associated with a channel report of the receiver device. In some implementations, the transmitter device communicates the one or more non-sounding frames over the wireless channel for a time period associated with a channel report processing time of the receiver device. At block 1306, the transmitter device transmits a frame soliciting a channel report from the receiver device. In some implementations, the transmitter device transmits the frame after the time period associated with the channel report processing time of the receiver device. At block 1308, the transmitter device receives the channel report solicited from the receiver device, the channel report including CSI of the wireless channel responsive to at least the sounding sequences.

In some instances, the one or more non-sounding frames may be frames transmitted over the wireless channel by a wireless communication device associated with the transmitter device or the receiver device. In some other instances, the one or more non-sounding frames may be a trigger frame that does not identify the receiver device, a poll frame that does not identify the receiver device, a clear-to-send (CTS) frame, a request-to-send (RTS) trigger frame, a buffer status request poll (BSRP) trigger frame, a bandwidth query report poll (BQRP) frame, a quality of service (QoS) Null frame, or an acknowledgement (ACK) frame. Transmission of the one or more non-sounding frames over the wireless channel during the time period may preventing other wireless communication devices from accessing the wireless channel while the receiver device is generating the channel report.

FIG. 14 shows a flowchart illustrating an example operation 1400 for wireless sensing that supports explicit channel sounding. The operation 1400 may be performed by or between the transmitter device and receiver device described with reference to FIG. 13. In some implementations, the transmitter device may be an AP such as one of the APs 102 or 602 described with reference to FIGS. 1 and 6A, respectively, and the receiver device may be a STA such as one of the STAs 104 or 604 described with reference to FIGS. 1 and 6B, respectively.

In some instances, the operation 1400 may be performed prior to or in conjunction with transmitting the sounding sequences over the wireless channel in block 1302 of FIG. 13. For example, at block 1402, the transmitter device transmits, to the receiver device, an indication of the transmit parameters used for transmitting the sounding sequences, where the channel report is further responsive to the indicated transmit parameters.

In some implementations, the indication of the transmit parameters may be transmitted over the wireless channel in a Null Data Packet Announcement (NDPA). The sounding sequences may be transmitted over the wireless channel in a Null Data Packet (NDP), and the NDPA may indicate a type of channel report requested by the transmitter device. In some instances, the type of channel report may be one of a compressed beamforming report (CBR), a channel report including uncompressed CSI, a channel report including CSI normalized according to the indicated transmit parameters, or a channel report including CSI normalized according to receive parameters used by the receiver device to receive the NDP. In some aspects, the NDP, the frame, and the channel report may be transmitted over the wireless channel during the same transmission opportunity (TXOP). In some other aspects, the NDP may be transmitted over the wireless channel during a first TXOP, and the frame and channel report may be transmitted over the wireless channel during a second TXOP. In some other implementations, the transmit parameters may be provided to the receiver device as part of the sounding parameters exchanged during a negotiation setup of the sensing operation.

FIG. 15 shows a flowchart illustrating an example operation 1500 for wireless sensing that supports explicit channel sounding. The operation 1500 may be performed by or between the transmitter device and receiver device described with reference to FIG. 13. In some implementations, the transmitter device may be an AP such as one of the APs 102 or 602 described with reference to FIGS. 1 and 6A, respectively, and the receiver device may be a STA such as one of the STAs 104 or 604 described with reference to FIGS. 1 and 6B, respectively.

In some instances, the operation 1500 may be performed prior to transmitting the sounding sequences over the wireless channel in block 1302 of FIG. 13. For example, at block 1502, the transmitter device exchanges sounding parameters with the receiver device. In some implementations, the sounding parameters may indicate one or more of a minimum period of time between respective transmissions of the sounding sequences and the frame, a maximum period of time between respective transmissions of the sounding sequences and the frame, a minimum period of time between respective transmissions of the sounding sequences and the channel report, a maximum period of time between respective transmissions of the sounding sequences and the channel report, conditions under which the receiver device is to generate the channel report, or conditions under which the receiver device is to delay transmission of the channel report. In some instances, the minimum period of time between respective transmissions of the sounding sequences and the frame may be the same as the minimum period of time between respective transmissions of the sounding sequences and the channel report, and the maximum period of time between respective transmissions of the sounding sequences and the frame may be the same as the maximum period of time between respective transmissions of the sounding sequences and the channel report.

FIG. 16 shows a flowchart illustrating an example operation 1600 for wireless sensing that supports explicit channel sounding. The operation 1600 may be performed by or between the transmitter device and receiver device described with reference to FIG. 13. In some implementations, the transmitter device may be an AP such as one of the APs 102 or 602 described with reference to FIGS. 1 and 6A, respectively, and the receiver device may be a STA such as one of the STAs 104 or 604 described with reference to FIGS. 1 and 6B, respectively.

In some instances, the operation 1600 may be performed after transmitting the sounding sequences over the wireless channel in block 1302 of FIG. 13. For example, at block 1602, the transmitter device receives one or more empty frames from the receiver device during the time period. In some aspects, the sounding parameters may permit the receiver device to transmit empty frames responsive to the sounding sequences. The time period may be indicative of the channel report processing time of the receiver device. In this way, transmission of the empty frames over the wireless channel may maintain the wireless channel in a busy state, thereby preventing other wireless communication devices from accessing the wireless channel while the receiver device is generating the channel report.

Figure 17:
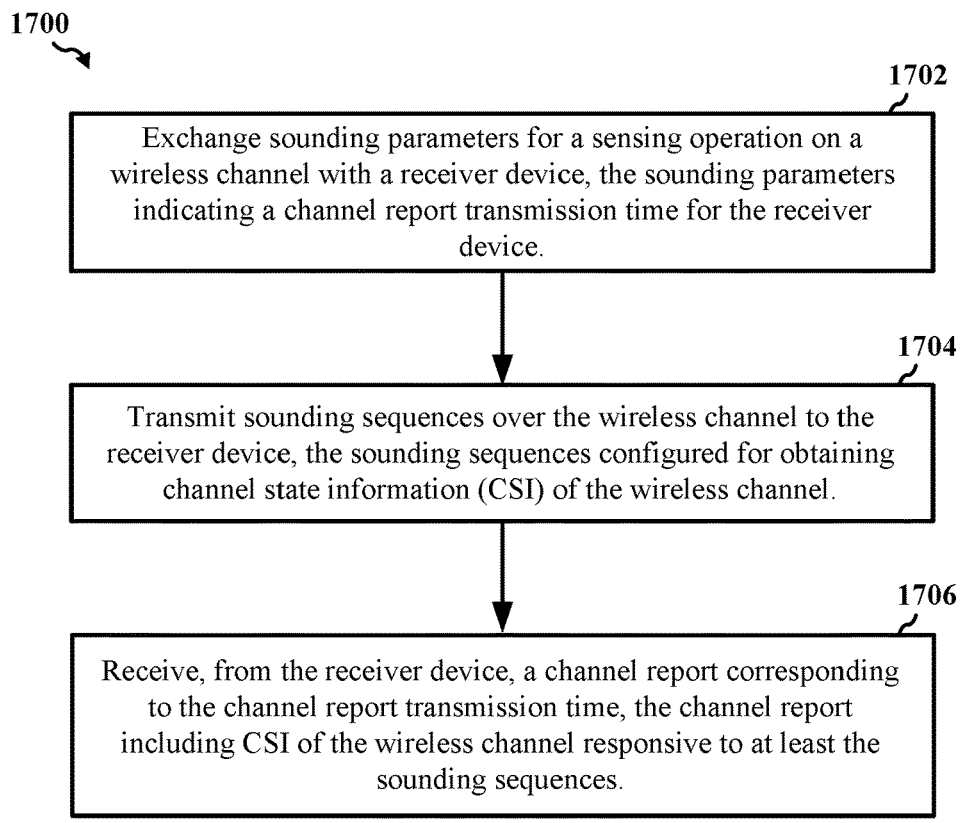
FIG. 17 shows a flowchart illustrating another example operation for wireless sensing that supports explicit channel sounding.

FIG. 17 shows a flowchart illustrating another example operation 1700 for wireless sensing that supports explicit channel sounding. The operation 1700 may be performed by or between a transmitter device and a receiver device. In some implementations, the transmitter device may be an AP such as one of the APs 102 or 602 described with reference to FIGS. 1 and 6A, respectively, and the receiver device may be a STA such as one of the STAs 104 or 604 described with reference to FIGS. 1 and 6B, respectively.

At block 1702, the transmitter device exchanges sounding parameters for a sensing operation on a wireless channel with a receiver device, the sounding parameters indicating a channel report transmission time for the receiver device. At block 1704, the transmitter device transmits sounding sequences over the wireless channel to the receiver device, the sounding sequences configured for obtaining channel state information (CSI) of the wireless channel. At block 1706, the transmitter device receives, from the receiver device, a channel report sent according to the channel report transmission time, the channel report including CSI of the wireless channel responsive to at least the sounding sequences.

In some instances, the channel report transmission time may be based on the channel report processing time of the receiver device. By scheduling the receiver device to transmit the channel report after passage of the channel report processing time, the receiver device may have sufficient time to generate any type of channel report requested by the transmitter device. In some implementations, the sounding parameters also may indicate one or more of a minimum period of time between respective transmissions of the sounding sequences and the channel report or a maximum period of time between respective transmissions of the sounding sequences and the channel report. In some other implementations, the sounding parameters also may indicate conditions under which the receiver device is to generate the channel report or conditions under which the receiver device is to delay transmission of the channel report.

Figure 18A:
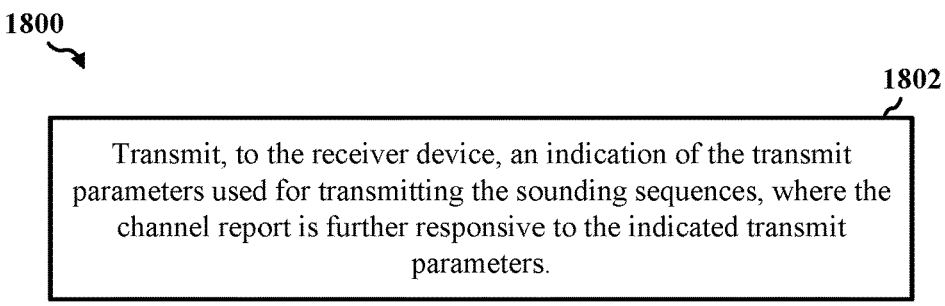
FIG. 18A shows a flowchart illustrating an example operation for wireless sensing that supports explicit channel sounding.

FIG. 18A shows a flowchart illustrating another example operation 1800 for wireless sensing that supports explicit channel sounding. The operation 1800 may be performed by or between the transmitter device and receiver device described with reference to FIG. 17. In some implementations, the transmitter device may be an AP such as one of the APs 102 or 602 described with reference to FIGS. 1 and 6A, respectively, and the receiver device may be a STA such as one of the STAs 104 or 604 described with reference to FIGS. 1 and 6B, respectively.

In some instances, the operation 1800 may be performed prior to or in conjunction with transmitting the sounding sequences over the wireless channel in block 1704 of FIG. 17. For example, at block 1802, the transmitter device transmits, to the receiver device, an indication of the transmit parameters used for transmitting the sounding sequences, where the channel report is further responsive to the indicated transmit parameters. In some implementations, the indication of the transmit parameters may be transmitted over the wireless channel in an NDPA, the sounding sequences may be transmitted over the wireless channel in an NDP, and the NDPA may indicate a type of channel report requested by the transmitter device. In some instances, the NDPA may indicate whether the receiver device is to use the indicated transmit parameters to generate the channel report. The type of channel report may be one of a CBR, a channel report including uncompressed CSI, a channel report including CSI normalized according to the indicated transmit parameters, or a channel report including CSI normalized according to receive parameters used by the receiver device to receive the NDP.

Figure 18B:
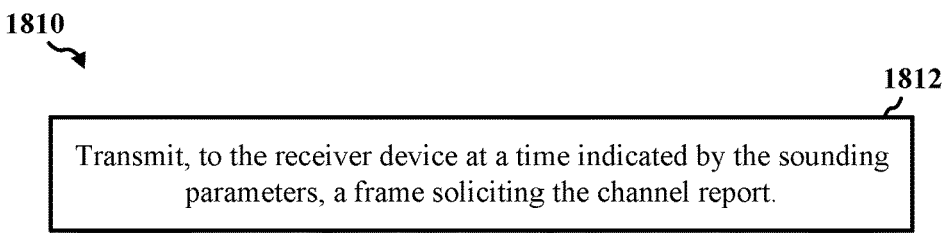
FIG. 18B shows a flowchart illustrating another example operation for wireless sensing that supports explicit channel sounding.

FIG. 18B shows a flowchart illustrating another example operation 1810 for wireless sensing that supports explicit channel sounding. The operation 1810 may be performed by or between the transmitter device and receiver device described with reference to FIG. 17. In some implementations, the transmitter device may be an AP such as one of the APs 102 or 602 described with reference to FIGS. 1 and 6A, respectively, and the receiver device may be a STA such as one of the STAs 104 or 604 described with reference to FIGS. 1 and 6B, respectively.

Figure 19:
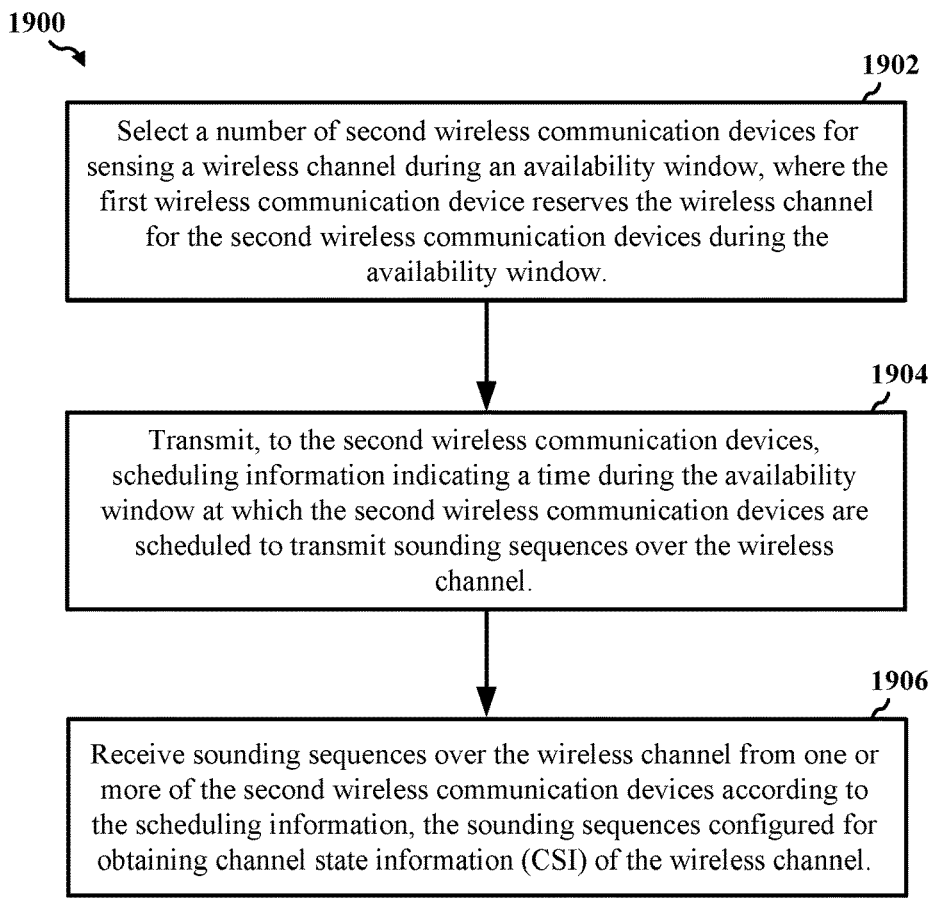
FIG. 19 shows a flowchart illustrating an example operation for wireless sensing that supports implicit channel sounding.

In some instances, the operation 1810 may be performed after transmitting the sounding sequences over the wireless channel in block 1704 of FIG. 17. For example, at block 1812, the transmitter device transmits, to the receiver device at a time indicated by the sounding parameters, a frame soliciting the channel report. In some implementations, the FIG. 19 shows a flowchart illustrating an example operation 1900 for wireless sensing that supports implicit channel sounding. The operation 1900 may be performed by or between a first wireless communication device (D1) and one or more second wireless communication devices (D2). In some implementations, the first wireless communication device may be a STA such as one of the STAs 104 or 604 described with reference to FIGS. 1 and 6B, respectively, and the second wireless communication devices may be APs such as one of the APs 102 or 602 described with reference to FIGS. 1 and 6A, respectively. In some other implementations, the second wireless communication devices may be STAs such as one of the STAs 104 or 604 described with reference to FIGS. 1 and 6B, respectively.

At block 1902, the first wireless communication device selects a number of second wireless communication devices for sensing a wireless channel during an availability window on the wireless channel, where the first wireless communication device reserves the wireless channel for the second wireless communication devices. At block 1904, the first wireless communication device transmits, to the second wireless communication devices, scheduling information indicating a time during the availability window at which the selected second wireless communication devices are scheduled to transmit sounding sequences over the wireless channel. At block 1906, the first wireless communication device receives sounding sequences over a wireless channel from the second wireless communication devices, the sounding sequences configured for obtaining channel state information (CSI) of the wireless channel. In some instances, a duration of the availability window corresponds to a processing time of the first wireless communication device associated with generating a certain type of channel report.

Figure 20:
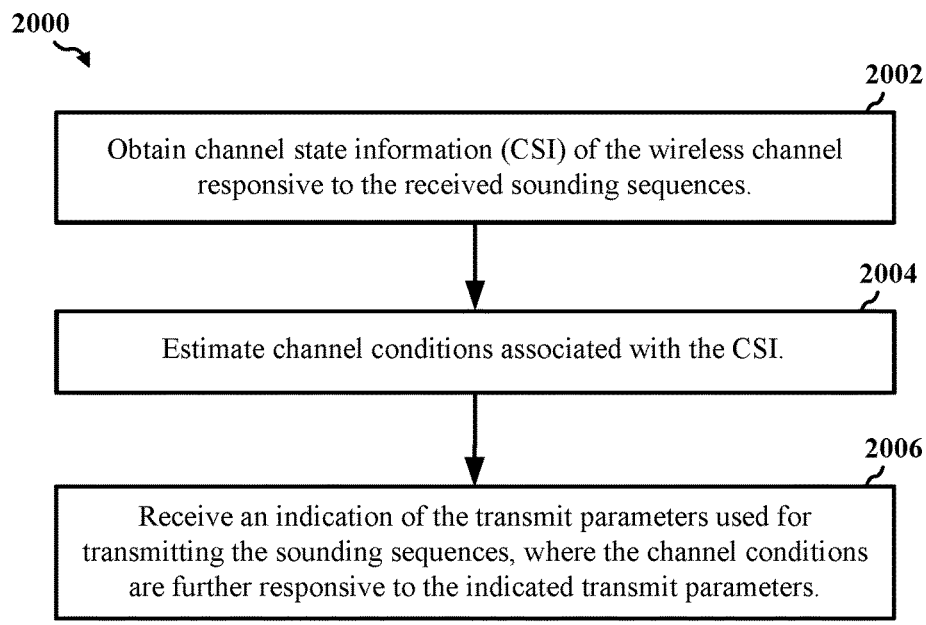
FIG. 20 shows a flowchart illustrating another example operation for wireless sensing that supports implicit channel sounding.

FIG. 20 shows a flowchart illustrating an example operation 2000 for wireless sensing that supports implicit channel sounding. The operation 2000 may be performed by or between the first wireless communication device and the one or more second wireless communication devices described with reference to FIG. 19. In some implementations, the first wireless communication device may be a STA such as one of the STAs 104 or 604 described with reference to FIGS. 1 and 6B, respectively, and the second wireless communication devices may be APs such as one of the APs 102 or 602 described with reference to FIGS. 1 and 6A, respectively. In some other implementations, the second wireless communication devices may be STAs such as one of the STAs 104 or 604 described with reference to FIGS. 1 and 6B, respectively.

In some instances, the operation 2000 may be performed after receiving the sounding sequences in block 1906 of FIG. 19. For example, at block 2002, the first wireless communication device obtains channel state information (CSI) of the wireless channel responsive to the received sounding sequences. At block 2004, the first wireless communication device estimates channel conditions of the wireless channel associated with the CSI. At block 2006, the first wireless communication device receives an indication of the transmit parameters used for transmitting the sounding sequences, where the channel conditions are further responsive to the indicated transmit parameters. In some instances, the transmit parameters include one or more of a bandwidth of the NDP transmission, an antenna configuration of the respective second wireless communication device used for the NDP transmission, the number of spatial streams associated with the NDP transmission, cyclic shift delay (CSD) values associated with the NDP transmission, or a type of physical layer (PHY) header of the NDP.

Figure 21:
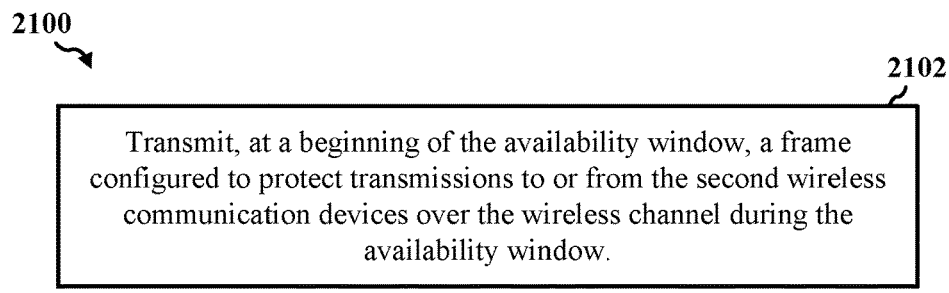
FIG. 21 shows a flowchart illustrating another example operation for wireless sensing that supports implicit channel sounding.

FIG. 21 shows a flowchart illustrating an example operation 2100 for wireless sensing that supports explicit channel sounding. The operation 2100 may be performed by or between the first wireless communication device and the one or more second wireless communication devices described with reference to FIG. 19. In some implementations, the first wireless communication device may be a STA such as one of the STAs 104 or 604 described with reference to FIGS. 1 and 6B, respectively, and the second wireless communication devices may be APs such as one of the APs 102 or 602 described with reference to FIGS. 1 and 6A, respectively. In some other implementations, the second wireless communication devices may be STAs such as one of the STAs 104 or 604 described with reference to FIGS. 1 and 6B, respectively.

In some instances, the operation 2100 may be performed prior to or in conjunction with transmitting the scheduling information in block 1904 of FIG. 19. For example, at block 2102, the first wireless communication device transmits, at a beginning of the availability window, a frame configured to protect transmissions to or from the second wireless communication devices over the wireless channel during the availability window.

In some implementations, the frame may indicate that wireless communication devices other than the selected second wireless communication devices are to set their respective network allocation vectors (NAVs) to a duration of an availability window associated with the wireless channel. In some instances, the frame may be a clear-to-send (CTS) frame or a CTS-to-self frame including a receiver address (RA) set to a predefined medium access control (MAC) address indicating that only the second wireless communication devices are permitted to access the wireless channel during the availability window. In some other instances, the frame may be a trigger frame including association identifier (AID) values identifying only wireless communication devices outside a coverage area of the first wireless communication device.

Figure 22:
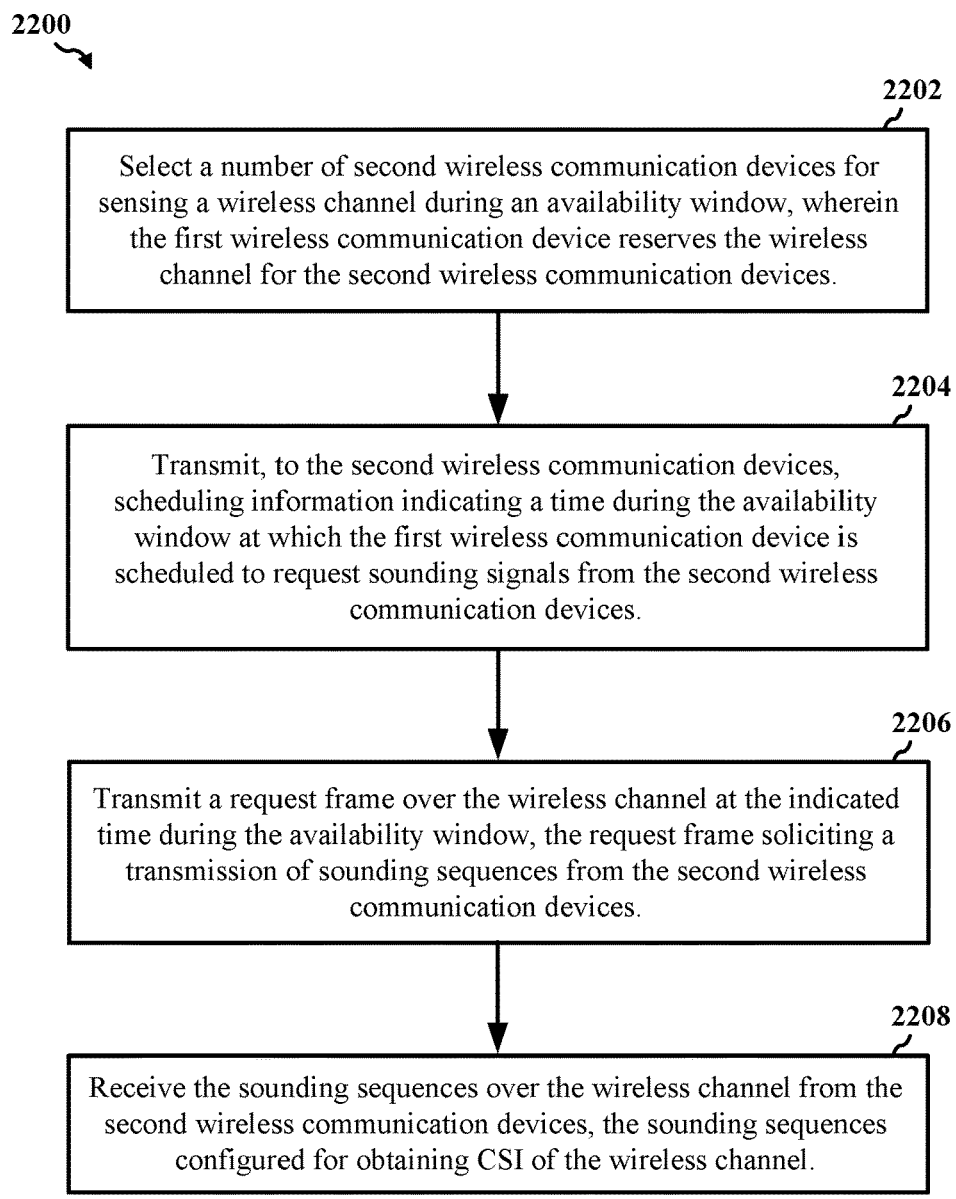
FIG. 22 shows a flowchart illustrating another example operation for wireless sensing that supports implicit channel sounding.

FIG. 22 shows a flowchart illustrating an example operation 2200 for wireless sensing that supports implicit channel sounding. The operation 2200 may be performed by or between a first wireless communication device and one or more second wireless communication devices. In some implementations, the first wireless communication device may be a STA such as one of the STAs 104 or 604 described with reference to FIGS. 1 and 6B, respectively, and the second wireless communication devices may be APs such as one of the APs 102 or 602 described with reference to FIGS. 1 and 6A, respectively. In some other implementations, the second wireless communication devices may be STAs such as one of the STAs 104 or 604 described with reference to FIGS. 1 and 6B, respectively.

At block 2202, the first wireless communication device selects a number of second wireless communication devices for sensing a wireless channel during an availability window on the wireless channel. At block 2204, the first wireless communication device transmits, to the selected second wireless communication devices, scheduling information indicating a time during the availability window at which the first wireless communication device is scheduled to request sounding sequences from the selected second wireless communication devices. At block 2206, the first wireless communication device transmits a request frame over the wireless channel at the indicated time during the availability window, the request frame soliciting a transmission of sounding sequences from the selected second wireless communication devices. At block 2208, the first wireless communication device receives the sounding sequences over the wireless channel from the selected second wireless communication devices, the sounding sequences configured for obtaining CSI of the wireless channel. In some implementations, a duration of the availability window corresponds to a processing time of the first wireless communication device for generating a certain type of channel report.

Figure 23:
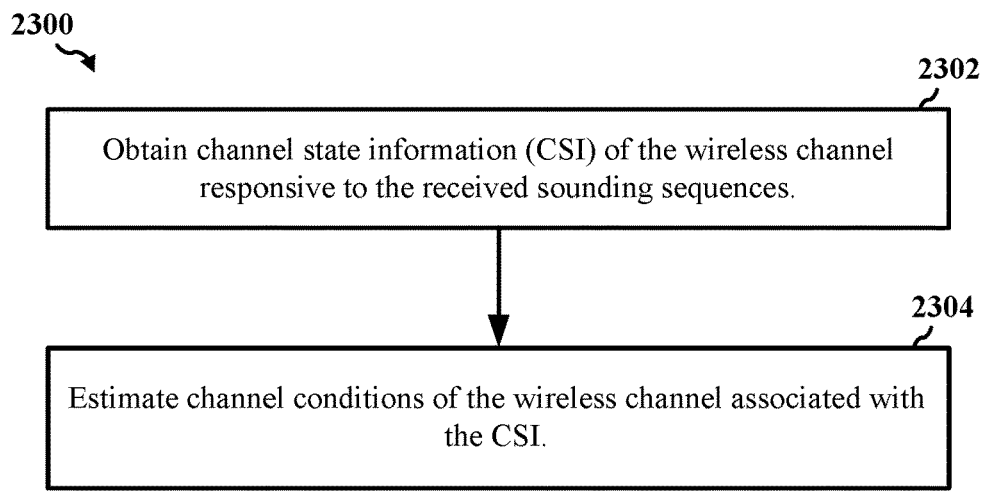
FIG. 23 shows a flowchart illustrating another example operation for wireless sensing that supports implicit channel sounding.

FIG. 23 shows a flowchart illustrating an example operation 2300 for wireless sensing that supports implicit channel sounding. The operation 2300 may be performed by or between the first wireless communication device and the one or more second wireless communication devices described with reference to FIG. 22. In some implementations, the first wireless communication device may be a STA such as one of the STAs 104 or 604 described with reference to FIGS. 1 and 6B, respectively, and the second wireless communication devices may be APs such as one of the APs 102 or 602 described with reference to FIGS. 1 and 6A, respectively. In some other implementations, the second wireless communication devices may be STAs such as one of the STAs 104 or 604 described with reference to FIGS. 1 and 6B, respectively.

In some instances, the operation 2300 may be performed after receiving the sounding sequences in block 2208 of FIG. 22. For example, at block 2302, the first wireless communication device obtains channel state information (CSI) of the wireless channel responsive to the received sounding sequences. At block 2304, the first wireless communication device estimates channel conditions of the wireless channel associated with the CSI.

Figure 24:
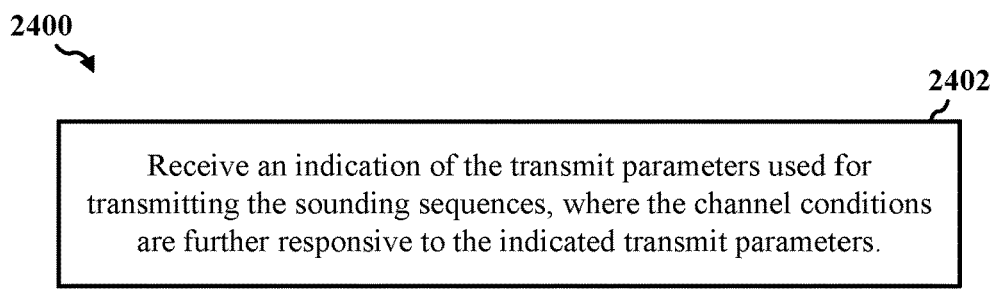
FIG. 24 shows a flowchart illustrating another example operation for wireless sensing that supports implicit channel sounding.

FIG. 24 shows a flowchart illustrating an example operation 2400 for wireless sensing that supports implicit channel sounding. The operation 2400 may be performed by or between the first wireless communication device and the second wireless communication devices described with reference to FIG. 22. In some implementations, the first wireless communication device may be a STA such as one of the STAs 104 or 604 described with reference to FIGS. 1 and 6B, respectively, and the second wireless communication devices may be APs such as one of the APs 102 or 602 described with reference to FIGS. 1 and 6A, respectively. In some other implementations, the second wireless communication devices may be STAs such as one of the STAs 104 or 604 described with reference to FIGS. 1 and 6B, respectively.

In some instances, the operation 2400 may be performed in conjunction with receiving the sounding sequences in block 2208 of FIG. 22. For example, at block 2402, the first wireless communication device receives an indication of the transmit parameters used for transmitting the sounding sequences, where the channel conditions are further responsive to the indicated transmit parameters. In some implementations, the transmit parameters include one or more of a bandwidth of the sounding sequence transmission, an antenna configuration of the respective second wireless communication device used for transmitting the sounding sequences, the number of spatial streams associated with the sounding sequence transmission, cyclic shift delay (CSD) values associated with the sounding sequence transmission, or a type of physical layer (PHY) header of a frame or packet carrying the sounding sequences.

In some implementations, the indication of the transmit parameters may be transmitted over the wireless channel in a Null Data Packet Announcement (NDPA), the sounding sequences may be transmitted over the wireless channel in a Null Data Packet (NDP), and the NDPA may indicate a type of channel report to be generated by the first wireless communication device. In some other implementations, the scheduling information may indicate a maximum period of time between transmission of a respective request frame from the first wireless communication device and reception of the sounding sequences from the respective second wireless communication device.

Figure 25:
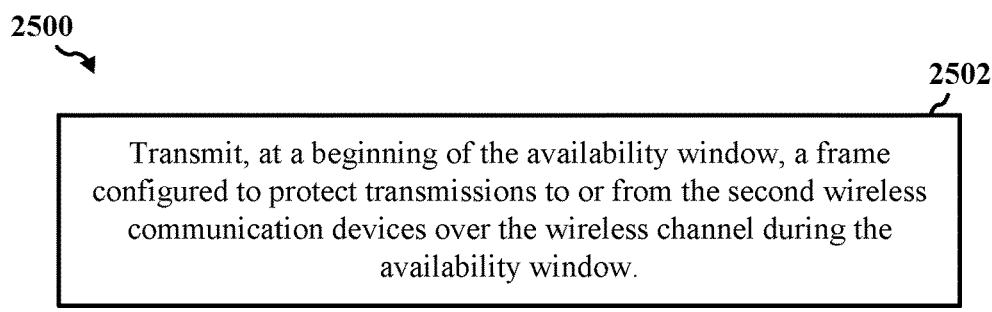
FIG. 25 shows a flowchart illustrating another example operation for wireless sensing that supports implicit channel sounding.

FIG. 25 shows a flowchart illustrating an example operation 2500 for wireless sensing that supports implicit channel sounding. The operation 2500 may be performed by or between the first wireless communication device and the second wireless communication devices described with reference to FIG. 22. In some implementations, the first wireless communication device may be a STA such as one of the STAs 104 or 604 described with reference to FIGS. 1 and 6B, respectively, and the second wireless communication devices may be APs such as one of the APs 102 or 602 described with reference to FIGS. 1 and 6A, respectively. In some other implementations, the second wireless communication devices may be STAs such as one of the STAs 104 or 604 described with reference to FIGS. 1 and 6B, respectively.

In some instances, the operation 2500 may be performed prior to transmitting the request frame in block 2206 of FIG. 22. For example, at block 2502, the first wireless communication device transmits, at a beginning of the availability window, a frame configured to protect transmissions to or from the second wireless communication devices over the wireless channel during the availability window. In some implementations, the frame may be a clear-to-send (CTS) frame or a CTS-to-self frame including a receiver address (RA) set to a predefined medium access control (MAC) address indicating that only the selected second wireless communication devices are permitted to access the wireless channel during the availability window. In some other implementations, the frame may be a trigger frame including association identifier (AID) values identifying only wireless communication devices outside a coverage area of the first wireless communication device.

Figure 26A:
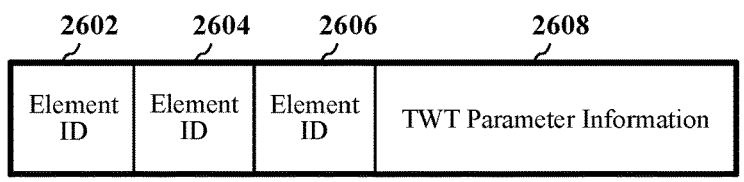
FIG. 26A shows an example structure of a target wait time (TWT) Element usable for wireless communications according to some implementations.

FIG. 26A shows an example structure of a TWT Element 2600 usable for wireless communications that support restricted TWT sessions. The TWT Element 2600 may include an element ID field 2602, a length field 2604, a control field 2608, and a TWT parameter information field 2608. The element ID field 2602 indicates that the element is a TWT Element. The length field 2604 indicates a length of the TWT Element 2600. The control field 2606 includes various control information for the restricted TWT session. The TWT parameter information field 2608 contains either a single individual TWT Parameter Set field or one or more Broadcast TWT Parameter Set fields.

Figure 26B:
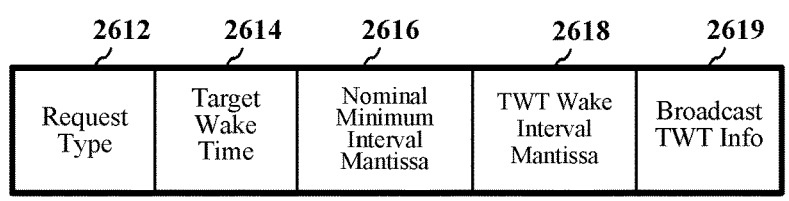
FIG. 26B shows an example structure of a broadcast TWT Parameter Set field usable for wireless communications according to some implementations.

FIG. 26B shows an example structure of a broadcast TWT Parameter Set field 2610 usable for wireless communications that support restricted TWT sessions. The broadcast TWT Parameter Set field 2610 may include a request type field 2612, a target wake time field 2614, a nominal minimum TWT wake duration field 2616, a TWT wake interval mantissa field 2618, and a broadcast TWT Info field 2619.

Figure 26C:
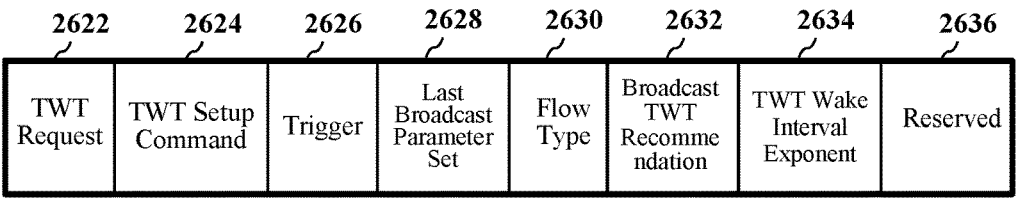
FIG. 26C shows an example structure of a Request Type field in a Broadcast TWT Parameter Set field usable for wireless communications according to some implementations.

FIG. 26C shows an example structure of a Request Type field 2620 of a Broadcast TWT Parameter Set field usable for wireless communications that support restricted TWT sessions. The Request Type field 2620 may include a TWT request field 2622, a TWT setup command field 2624, a trigger field 2626, a last broadcast parameter set field 2628, a flow type field 2630, a broadcast TWT recommendation field 2632, a TWT wake interval exponent field 2634, and a number of reserved bits 2636. In some implementations, the broadcast TWT recommendation field 2632 may indicates whether the restricted TWT session is a peer-to-peer TWT session or a broadcast TWT session.

Figure 27:
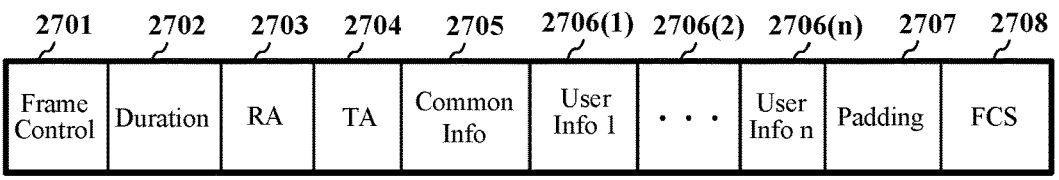
FIG. 27 shows an example structure of a trigger frame usable for wireless communications according to some implementations.

FIG. 27 shows an example trigger frame 2700. The trigger frame 2700 may be used as one or more of the trigger frames described with reference to the sequence diagram 1000A of FIG. 10A, the sequence diagram 1000B of FIG. 10B, or the sequence diagram 1200 of FIG. 12. The trigger frame 2700 is shown to contain a frame control field 2701, a duration field 2702, a receiver address (RA) field 2703, a transmitter address (TA) field 2704, a Common Info field 2705, a number of User Info fields 2706(1)-2706(n), an optional Padding field 2707, and a frame check sequence (FCS) field 2708. In some implementations, the trigger frame 2700 may be an UL OFDMA mode (RUs) trigger frame. In some other implementations, the trigger frame 2700 may be an UL MU-MIMO mode (NSS) trigger frame. The frame control field 2701 contains a Type field and a Sub-type field (not shown for simplicity). The Type field 2701A may store a value to indicate that the trigger frame 2700 is a control frame, and the Sub-type field 2701B may store a value indicating a type of the trigger frame 2700.

The duration field 2702 may store information indicating a duration or length of the trigger frame 2700. The RA field 2703 may store the address of a receiving device, such as one of the receiver devices of FIGS. 10A-10D and FIG. 11. The TA field 2704 may store the address of a transmitting device, such as one of the APs 102 and 602 of FIG. 1 and FIG. 6A, respectively. The Common Info field 2705 may store information common to one or more receiving devices. Each of the User Info fields 2706(1)-2706(n) may store information for a particular receiving device containing, for example, the AID of the receiving device. The Padding field 2707 may extend a length of the trigger frame 2700, for example, to give a receiving device additional time to generate a response. The FCS field 2708 may store a frame check sequence (such as for error detection).

Implementation examples are described in the following numbered clauses:

1. A method for wireless sensing performed by an apparatus of a transmitter device, including:
   transmitting sounding sequences over a wireless channel to a receiver device, the sounding sequences configured for obtaining channel state information (CSI) of the wireless channel;
   transmitting or receiving one or more non-sounding frames over the wireless channel associated with a channel report of the receiver device;
   transmitting a frame soliciting the channel report from the receiver device; and
   receiving the channel report from the receiver device, the channel report including CSI of the wireless channel responsive to at least the sounding sequences.
2. The method of clause 1, where the one or more non-sounding frames include frames transmitted over the wireless channel by a wireless communication device associated with the transmitter device or the receiver device.
3. The method of any one or more of clauses 1-2, where the one or more non-sounding frames include a trigger frame that does not identify the receiver device, a poll frame that does not identify the receiver device, a clear-to-send (CTS) frame, a request-to-send (RTS) trigger frame, a buffer status request poll (BSRP) trigger frame, a bandwidth query report poll (BQRP) frame, a quality of service (QoS) Null frame, or an acknowledgement (ACK) frame.
4. The method of any one or more of clauses 1-3, further including:
   transmitting, to the receiver device, an indication of the transmit parameters used for transmitting the sounding sequences, where the channel report is further responsive to the indicated transmit parameters.
5. The method of clause 4, where the indication of the transmit parameters is transmitted over the wireless channel in a Null Data Packet Announcement (NDPA), the sounding sequences are transmitted over the wireless channel in a Null Data Packet (NDP), and the NDPA indicates a type of channel report requested by the transmitter device.
6. The method of clause 5, where the type of channel report is one of a compressed beamforming report (CBR), a channel report including uncompressed CSI, a channel report including CSI normalized according to the indicated transmit parameters, or a channel report including CSI normalized according to receive parameters used by the receiver device to receive the NDP.
7. The method of clause 5, where the indicated type of channel report includes CSI encoded with encoding parameters indicating one or more of a minimum quantization level for the CSI, a maximum quantization level for the CSI, a specified number of bits to be used for encoding each orthogonal frequency division multiplexed (OFDM) tone in the channel report, a subset of OFDM tones to be included in the channel report, a bandwidth allocation, a resource unit (RU) allocation, a tone grouping value, a number of spatial streams, or one or more antenna indexes.
8. The method of clause 5, where the NDP, the frame, and the channel report are transmitted over the wireless channel during the same transmission opportunity (TXOP).
9. The method of any one or more of clauses 1-8, further including:
   exchanging sounding parameters with the receiver device, the sounding parameters indicating one or more of a minimum period of time between respective transmissions of the sounding sequences and the frame, a maximum period of time between respective transmissions of the sounding sequences and the frame, a minimum period of time between respective transmissions of the sounding sequences and the channel report, a maximum period of time between respective transmissions of the sounding sequences and the channel report, conditions under which the receiver device is to generate the channel report, or conditions under which the receiver device is to delay transmission of the channel report.
10. The method of clause 9, where the minimum period of time between respective transmissions of the sounding sequences and the frame is the same as the minimum period of time between respective transmissions of the sounding sequences and the channel report, and the maximum period of time between respective transmissions of the sounding sequences and the frame is the same as the maximum period of time between respective transmissions of the sounding sequences and the channel report.

11. The method of clause 9, where the sounding parameters permit the receiver device to transmit empty frames responsive to the sounding sequences during the time period, the method further including:

receiving one or more empty frames from the receiver device during the time period.

12. A wireless communication device, including:
a processing system; and
an interface configured to:
   output sounding sequences over a wireless channel to a receiver device, the sounding sequences configured for obtaining channel state information (CSI) of the wireless channel;
   output or obtain one or more non-sounding frames over the wireless channel associated with a channel report of the receiver device;
   output a frame soliciting the channel report from the receiver device; and
   obtain the channel report from the receiver device, the channel report including CSI of the wireless channel responsive to at least the sounding sequences.

13. The wireless communication device of clause 12, where the one or more non-sounding frames include a trigger frame that does not identify the receiver device, a poll frame that does not identify the receiver device, a clear-to-send (CTS) frame, a request-to-send (RTS) trigger frame, a buffer status request poll (BSRP) trigger frame, a bandwidth query report poll (BQRP) frame, a quality of service (QoS) Null frame, or an acknowledgement (ACK) frame.

14. The wireless communication device of any one or more of clauses 12-13, where the interface is further configured to:

output, to the receiver device, an indication of the transmit parameters used for transmitting the sounding sequences, where the channel report is further responsive to the indicated transmit parameters.

15. The wireless communication device of clause 14, where the indication of the transmit parameters is transmitted over the wireless channel in a Null Data Packet Announcement (NDPA), the sounding sequences are transmitted over the wireless channel in a Null Data Packet (NDP), and the NDPA indicates a type of channel report requested by the transmitter device.

16. A method for wireless sensing performed by an apparatus of a transmitter device, including:
exchanging sounding parameters for a sensing operation on a wireless channel with a receiver device, the sounding parameters indicating a channel report transmission time for the receiver device;
transmitting sounding sequences over the wireless channel to the receiver device, the sounding sequences configured for obtaining channel state information (CSI) of the wireless channel; and
receiving, from the receiver device, a channel report sent according to the channel report transmission time, the channel report including CSI of the wireless channel responsive to at least the sounding sequences.

17. The method of clause 16, where the channel report transmission time is indicative of a channel report processing time of the receiver device.

18. The method of any one or more of clauses 16-17, where the sounding sequences are transmitted over the wireless channel during a first transmission opportunity (TXOP), and the channel report is transmitted over the wireless channel during a second TXOP.

19. The method of any one or more of clauses 16-18, further including:
transmitting, to the receiver device, an indication of the transmit parameters used for transmitting the sounding sequences, where the channel report is further responsive to the indicated transmit parameters.

20. The method of clause 19, where the indication of the transmit parameters is transmitted over the wireless channel in a Null Data Packet Announcement (NDPA), the sounding sequences are transmitted over the wireless channel in a Null Data Packet (NDP), and the NDPA indicates a type of channel report requested by the transmitter device.

21. The method of clause 20, where the NDPA indicates whether the receiver device is to use the indicated transmit parameters when generating the channel report.

22. The method of any one or more of clauses 16-21, further including:
transmitting, to the receiver device at a time indicated by the sounding parameters, a frame soliciting the channel report.

23. The method of clause 22, where transmissions of the NDP, the frame, and the channel report are scheduled in an availability window on the wireless channel.

24. The method of any one or more of clauses 16-24, where the sounding parameters indicate one or more of conditions under which the receiver device is to generate the channel report or conditions under which the receiver device is to delay transmission of the channel report.

25. A wireless communication device, including:
a processing system; and
an interface configured to:
   obtain or output sounding parameters for a sensing operation on a wireless channel with a receiver device, the sounding parameters indicating a channel report transmission time for the receiver device;
   output sounding sequences over the wireless channel to the receiver device, the sounding sequences configured for obtaining channel state information (CSI) of the wireless channel; and
   obtain, from the receiver device, a channel report sent according to the channel report transmission time, the channel report including CSI of the wireless channel responsive to at least the sounding sequences.

26. The wireless communication device of clause 25, where the interface is further configured to:
output an indication of the transmit parameters used for transmitting the sounding sequences over the wireless channel, where the channel report is further responsive to the indicated transmit parameters.

27. The wireless communication device of clause 26, where the indication of the transmit parameters is transmitted over the wireless channel in a Null Data Packet Announcement (NDPA), the sounding sequences are transmitted over the wireless channel in a Null Data Packet (NDP), and the NDPA indicates a type of channel report requested by the transmitter device.

28. The wireless communication device of clause 27, where the interface is further configured to:

output, to the receiver device at a time indicated by the sounding parameters, a frame soliciting the channel report.

29. The wireless communication device of clause 28, where output of the NDP, output of the frame, and transmission of the channel report are scheduled within an availability window on the wireless channel.

30. The wireless communication device of clause 29, where a duration of the availability window corresponds to a channel report processing time of the receiver device.

31. A method for wireless sensing performed by an apparatus of a receiver device, including:
receiving sounding sequences over a wireless channel from a transmitter device, the sounding sequences configured for obtaining channel state information (CSI) of the wireless channel;
transmitting or receiving one or more non-sounding frames over the wireless channel associated with a channel report of the receiver device;
receiving, from the transmitter device, a frame soliciting the channel report from the receiver device; and
transmitting the channel report to the transmitter device, the channel report including CSI of the wireless channel responsive to at least the sounding sequences.

32. The method of clause 31, where the one or more non-sounding frames include frames transmitted over the wireless channel by a wireless communication device associated with the transmitter device or the receiver device.

33. The method of any one or more of clauses 31-32, where the one or more non-sounding frames include a trigger frame that does not identify the receiver device, a poll frame that does not identify the receiver device, a clear-to-send (CTS) frame, a request-to-send (RTS) trigger frame, a buffer status request poll (BSRP) trigger frame, a bandwidth query report poll (BQRP) frame, a quality of service (QoS) Null frame, or an acknowledgement (ACK) frame.

34. The method of any one or more of clauses 31-33, further including:
receiving, from the transmitter device, an indication of the transmit parameters used for transmitting the sounding sequences, where the channel report is further responsive to the indicated transmit parameters.

35. The method of clause 34, where the indication of the transmit parameters is transmitted over the wireless channel in a Null Data Packet Announcement (NDPA), the sounding sequences are transmitted over the wireless channel in a Null Data Packet (NDP), and the NDPA indicates a type of channel report requested by the transmitter device.

36. The method of clause 35, where the type of channel report is one of a compressed beamforming report (CBR), a channel report including uncompressed CSI, a channel report including CSI normalized according to the indicated transmit parameters, or a channel report including CSI normalized according to receive parameters used by the receiver device to receive the NDP.

37. The method of any one or more of clauses 35-36, where the NDP, the frame, and the channel report are transmitted over the wireless channel during the same transmission opportunity (TXOP).

38. The method of any one or more of clauses 31-37, further including:
exchanging sounding parameters with the transmitter device, the sounding parameters indicating one or more of a minimum period of time between respective transmissions of the sounding sequences and the frame, a maximum period of time between respective transmissions of the sounding sequences and the frame, a minimum period of time between respective transmissions of the sounding sequences and the channel report, a maximum period of time between respective transmissions of the sounding sequences and the channel report, conditions under which the receiver device is to generate the channel report, or conditions under which the receiver device is to delay transmission of the channel report.

39. The method of clause 38, where the sounding parameters permit the receiver device to transmit empty frames responsive to the sounding sequences during the time period, the method further including:
transmitting one or more empty frames to the transmitter device during the time period.

40. A wireless communication device, including:
a processing system; and
an interface configured to:
    obtain sounding sequences over a wireless channel from a transmitter device, the sounding sequences configured for obtaining channel state information (CSI) of the wireless channel;
    output or obtain one or more non-sounding frames over the wireless channel associated with a channel report of the wireless communication device;
    obtain, from the transmitter device, a frame soliciting the channel report from the wireless communication device; and
    output the channel report to the transmitter device, the channel report including CSI of the wireless channel responsive to at least the sounding sequences.

41. The wireless communication device of clause 40, where the one or more non-sounding frames include a trigger frame that does not identify the receiver device, a poll frame that does not identify the receiver device, a clear-to-send (CTS) frame, a request-to-send (RTS) trigger frame, a buffer status request poll (BSRP) trigger frame, a bandwidth query report poll (BQRP) frame, a quality of service (QoS) Null frame, or an acknowledgement (ACK) frame.

42. The wireless communication device of any one or more of clauses 40-41, where the interface is further configured to:
obtain, from the transmitter device, an indication of the transmit parameters used for transmitting the sounding sequences, where the channel report is further responsive to the indicated transmit parameters.

43. The wireless communication device of clause 42, where the indication of the transmit parameters is transmitted over the wireless channel in a Null Data Packet Announcement (NDPA), the sounding sequences are transmitted over the wireless channel in a Null Data Packet (NDP), and the NDPA indicates a type of channel report requested by the transmitter device.

44. The wireless communication device of clause 43, where the type of channel report is one of a compressed beamforming report (CBR), a channel report including uncompressed CSI, a channel report including CSI normalized according to the indicated transmit parameters, or a channel report including CSI normalized according to receive parameters used by the receiver device to receive the NDP.

45. A method for wireless sensing performed by an apparatus of a receiver device, including:
exchanging sounding parameters for a sensing operation on a wireless channel with a transmitter device, the sounding parameters indicating a channel report transmission time for the receiver device;
receiving sounding sequences over the wireless channel from the transmitter device, the sounding sequences configured for obtaining channel state information (CSI) of the wireless channel; and
transmitting, to the transmitter device, a channel report corresponding to the channel report transmission time, the channel report including CSI of the wireless channel responsive to at least the sounding sequences.

46. The method of clause 45, where the indicated channel report transmission time corresponds to a channel report processing time of the receiver device.

47. The method of any one or more of clauses 45-46, where the sounding sequences are transmitted over the wireless channel during a first transmission opportunity (TXOP), and the channel report is transmitted over the wireless channel during a second TXOP.

48. The method of any one or more of clauses 45-47, further including:
receiving, from the transmitter device, an indication of the transmit parameters used for transmitting the sounding sequences, where the channel report is further responsive to the indicated transmit parameters.

49. The method of any one or more of clauses 45-48, where the indication of the transmit parameters is transmitted over the wireless channel in a Null Data Packet Announcement (NDPA), the sounding sequences are transmitted over the wireless channel in a Null Data Packet (NDP), and the NDPA indicates a type of channel report requested by the transmitter device.

50. The method of clause 49, where the NDPA indicates whether the receiver device is to use the indicated transmit parameters when generating the channel report.

51. The method of clause 50, further including:
receiving, from the transmitter device at a time indicated by the sounding parameters, a frame soliciting the channel report.

52. The method of clause 51, where transmissions of the NDP, the soliciting frame, and the channel report are scheduled in an availability window on the wireless channel.

53. The method of clause 52, where a duration of the availability window corresponds to a channel report processing time of the receiver device.

54. The method of any one or more of clauses 45-53, where the sounding parameters indicate one or more of conditions under which the receiver device is to generate the channel report or conditions under which the receiver device is to delay transmission of the channel report.

55. A wireless communication device, including:
a processing system; and
an interface configured to:
obtain or output sounding parameters for a sensing operation on a wireless channel with a transmitter device, the sounding parameters indicating a channel report transmission time for the wireless communication device;
obtain sounding sequences over the wireless channel from the transmitter device, the sounding sequences configured for obtaining channel state information (CSI) of the wireless channel; and
output, to the transmitter device, a channel report corresponding to the channel report transmission time, the channel report including CSI of the wireless channel responsive to at least the sounding sequences.

56. The wireless communication device of clause 55, where the interface is further configured to:
obtain an indication of the transmit parameters used for transmitting the sounding sequences over the wireless channel, where the channel report is further responsive to the indicated transmit parameters.

57. The wireless communication device of clause 56, where the indication of the transmit parameters is transmitted over the wireless channel in a Null Data Packet Announcement (NDPA), the sounding sequences are transmitted over the wireless channel in a Null Data Packet (NDP), and the NDPA indicates a type of channel report requested by the transmitter device.

58. The wireless communication device of clause 57, where the interface is further configured to:
obtain, from the transmitter device at a time indicated by the sounding parameters, a frame soliciting the channel report.

59. The wireless communication device of clause 58, where output of the NDP, output of the soliciting frame, and transmission of the channel report are scheduled in an availability window on the wireless channel.

60. The wireless communication device of clause 59, where a duration of the availability window corresponds to a channel report processing time of the wireless communication device.

61. A method for wireless sensing performed by an apparatus of a first wireless communication device, including:
selecting a number of second wireless communication devices for sensing a wireless channel during an availability window;
transmitting, to the second wireless communication devices, scheduling information indicating a time during the availability window at which the second wireless communication devices are scheduled to transmit sounding sequences over the wireless channel; and
receiving sounding sequences over the wireless channel from one or more of the second wireless communication devices according to the scheduling information, the sounding sequences configured for obtaining channel state information (CSI) of the wireless channel.

62. The method of clause 61, where a duration of the availability window corresponds to a channel report processing time of the first wireless communication device.

63. The method of any one or more of clauses 61-62, further including:
obtaining CSI of the wireless channel responsive to the received sounding sequences; and
estimating channel conditions of the wireless channel associated with the CSI.

64. The method of clause 63, further including:
receiving an indication of the transmit parameters used for transmitting the sounding sequences, where the channel conditions are further responsive to the indicated transmit parameters.

65. The method of clause 64, where the transmit parameters include one or more of a bandwidth of the sounding sequence transmission, an antenna configuration of the respective second wireless communication device used for transmitting the sounding sequences, the number of spatial streams associated with the sounding sequence transmission, cyclic shift delay (CSD) values associated with the sounding sequence transmission, or a type of physical layer (PHY) header of a frame or packet carrying the sounding sequences.
66. The method of clause 64, where the indication of the transmit parameters is transmitted over the wireless channel in a Null Data Packet Announcement (NDPA), the sounding sequences are transmitted over the wireless channel in a Null Data Packet (NDP), and the NDPA indicates a type of channel report to be generated by the first wireless communication device.
67. The method of clause 66, where the NDPA indicates whether the first wireless communication device is to use the indicated transmit parameters when generating the channel report.
68. The method of any one or more of clauses 61-68, further including:
transmitting, at a beginning of the availability window, a frame configured to protect transmissions to or from the second wireless communication devices over the wireless channel during the availability window.
69. The method of clause 68, where the frame indicates that wireless communication devices other than the second wireless communication devices are to set their respective network allocation vectors (NAVs) to a duration of the availability window.
70. The method of clause 68 or clause 69, where the frame is a clear-to-send (CTS) frame or a CTS-to-self frame including a receiver address (RA) set to a predefined medium access control (MAC) address indicating that only the selected second wireless communication devices are permitted to access the wireless channel during the availability window.
71. The method of any one or more of clauses 68-70, where the frame is a trigger frame including association identifier (AID) values identifying only wireless communication devices outside a coverage area of the initiator device.
72. A method for wireless sensing performed by an apparatus of a first wireless communication device, including:
selecting a number of second wireless communication devices for sensing a wireless channel during an availability window;
transmitting, to the second wireless communication devices, scheduling information indicating a time during the availability window at which the first wireless communication device is scheduled to request sounding sequences from the second wireless communication devices;
transmitting a request frame over the wireless channel at the indicated time during the availability window, the request frame soliciting a transmission of sounding sequences from the second wireless communication devices; and
receiving the sounding sequences over the wireless channel from the second wireless communication devices, the sounding sequences configured for obtaining channel state information (CSI) of the wireless channel.
73. The method of clause 72, where a duration of the availability window corresponds to a channel report processing time of the first wireless communication device.
74. The method of any one or more of clauses 72-73, further including:
obtaining CSI of the wireless channel responsive to the received sounding sequences; and
estimating channel conditions of the wireless channel associated with the CSI.
75. The method of clause 74, further including:
receiving an indication of the transmit parameters used for transmitting the sounding sequences, where the channel conditions are further responsive to the indicated transmit parameters.
76. The method of clause 75, where the transmit parameters include one or more of a bandwidth of the sounding sequence transmission, an antenna configuration of the respective second wireless communication device used for transmitting the sounding sequences, the number of spatial streams associated with the sounding sequence transmission, cyclic shift delay (CSD) values associated with the sounding sequence transmission, or a type of physical layer (PHY) header of a frame or packet carrying the sounding sequences.
77. The method of any one or more of clauses 75-76, where the indication of the transmit parameters is transmitted over the wireless channel in a Null Data Packet Announcement (NDPA), the sounding sequences are transmitted over the wireless channel in a Null Data Packet (NDP), and the NDPA indicates a type of channel report to be generated by the first wireless communication device.
78. The method of clause 72, where the scheduling information indicates a maximum period of time between transmission of a respective request frame from the first wireless communication device and reception of the sounding sequences from the respective second wireless communication device.
79. The method of any one or more of clauses 72-78, further including:
transmitting, at a beginning of the availability window, a frame configured to protect transmissions to or from the second wireless communication devices over the wireless channel during the availability window.
80. The method of clause 79, where the frame is a clear-to-send (CTS) frame or a CTS-to-self frame including a receiver address (RA) set to a predefined medium access control (MAC) address indicating that only the one or more selected second wireless communication devices are permitted to access the wireless channel during the availability window.
81. The method of clause 61, where the first wireless communication device reserves the wireless channel for the second wireless communication devices during the availability window.
82. The method of clause 72, where the first wireless communication device reserves the wireless channel for the second wireless communication devices during the availability window.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. A method for wireless sensing performed by an apparatus of a transmitter device, comprising:
    transmitting parameters for a sensing operation on a wireless channel with a receiver device, the parameters indicating an availability window;
    transmitting a null data packet (NDP) configuring the receiver device to perform sensing measurements on the wireless channel;
    transmitting or receiving one or more non-sounding frames over the wireless channel associated with the sensing measurements;
    transmitting a frame soliciting a sensing measurement report associated with the sensing measurements from the receiver device; and
    receiving the sensing measurement report from the receiver device according to the availability window, the sensing measurement report comprising channel state information (CSI) values responsive to at least the NDP.

2. The method of claim 1, wherein the one or more non-sounding frames include frames transmitted over the wireless channel by a wireless communication device associated with the transmitter device or the receiver device.

3. The method of claim 1, wherein the one or more non-sounding frames include a trigger frame that does not identify the receiver device, a poll frame that does not identify the receiver device, a clear-to-send (CTS) frame, a request-to-send (RTS) trigger frame, a buffer status request poll (BSRP) trigger frame, a bandwidth query report poll (BQRP) frame, a quality of service (QOS) Null frame, or an acknowledgement (ACK) frame.

4. The method of claim 1, further comprising:
    transmitting, to the receiver device, an indication of transmit parameters associated with transmitting the NDP, wherein the sensing measurement report is further responsive to the transmit parameters.

5. The method of claim 4, wherein the indication of the transmit parameters is transmitted over the wireless channel in a null data packet announcement (NDPA), and the NDPA indicates a type of sensing measurement report requested by the transmitter device.

6. The method of claim 5, wherein the type of sensing measurement report is one of a compressed beamforming report (CBR), a sensing measurement report including uncompressed CSI, a sensing measurement report including CSI normalized according to the transmit parameters, or a sensing measurement report including CSI normalized according to receive parameters used by the receiver device to receive the NDP.

7. The method of claim 5, wherein the indicated type of sensing measurement report includes CSI encoded with encoding parameters indicating one or more of a minimum quantization level for the CSI, a maximum quantization level for the CSI, a specified number of bits to be used for encoding each orthogonal frequency division multiplexed (OFDM) tone in the sensing measurement report, a subset of OFDM tones to be included in the sensing measurement report, a bandwidth allocation, a resource unit (RU) allocation, a tone grouping value, a number of spatial streams, or one or more antenna indexes.

8. The method of claim 5, wherein the NDP, the frame, and the sensing measurement report are transmitted over the wireless channel during a same transmission opportunity (TXOP).

9. The method of claim 1, further comprising:
    transmitting the parameters on the wireless channel with the receiver device, the parameters indicating one or more of a minimum period of time between respective transmissions of the NDP and the frame, a maximum period of time between respective transmissions of the NDP and the frame, a minimum period of time between respective transmissions of the NDP and the sensing measurement report, a maximum period of time between respective transmissions of the NDP and the sensing measurement report, conditions under which the receiver device is to generate the sensing measurement report, or conditions under which the receiver device is to delay transmission of the sensing measurement report.

10. The method of claim 9, wherein the minimum period of time between respective transmissions of the NDP and the frame is the same as the minimum period of time between respective transmissions of the NDP and the sensing measurement report, and the maximum period of time between respective transmissions of the NDP and the frame is the same as the maximum period of time between respective transmissions of the NDP and the sensing measurement report.

11. The method of claim 9, wherein the parameters permit the receiver device to transmit empty frames responsive to the NDP during the time period, the method further comprising:
receiving one or more empty frames from the receiver device during the time period.

12. A wireless communication device, comprising:
a processing system that includes one or more processors and one or more memories coupled with the one or more processors, the processing system configured to cause the wireless communication device to:
output parameters for a sensing operation on a wireless channel with a receiver device, the parameters indicating an availability window;
output a null data packet (NDP) configuring the receiver device to perform sensing measurements on the wireless channel;
output or obtain one or more non-sounding frames over the wireless channel associated with the sensing measurements;
output a frame soliciting a sensing measurement report associated with the sensing measurements from the receiver device; and
obtain the sensing measurement report from the receiver device according to the availability window, the sensing measurement report comprising channel state information (CSI) values responsive to at least the NDP.

13. The wireless communication device of claim 12, wherein the one or more non-sounding frames a trigger frame that does not identify the receiver device, a poll frame that does not identify the receiver device, a clear-to-send (CTS) frame, a request-to-send (RTS) trigger frame, a buffer status request poll (BSRP) trigger frame, a bandwidth query report poll (BQRP) frame, a quality of service (QOS) Null frame, or an acknowledgement (ACK) frame.

14. The wireless communication device of claim 12, wherein the processing system is further configured to cause the wireless communication device to:
output, to the receiver device, an indication of transmit parameters associated with transmitting the NDP, wherein the sensing measurement report is further responsive to the transmit parameters.

15. The wireless communication device of claim 14, wherein the indication of the transmit parameters is transmitted over the wireless channel in a null data packet announcement (NDPA), and the NDPA indicates a type of sensing measurement report requested by the wireless communication device.

16. A method for wireless sensing performed by an apparatus of a transmitter device, comprising:
transmitting parameters for a sensing operation on a wireless channel with a receiver device, the parameters indicating an availability window;
transmitting a null data packet (NDP) configuring the receiver device to perform sensing measurements on the wireless channel; and
receiving, from the receiver device, a sensing measurement report according to the availability window, the sensing measurement report comprising channel state information (CSI) values responsive to at least the NDP.

17. The method of claim 16, wherein the availability window is indicative of a processing time of the receiver device.

18. The method of claim 16, wherein the NDP is transmitted over the wireless channel during a first transmission opportunity (TXOP), and the sensing measurement report is transmitted over the wireless channel during a second TXOP.

19. The method of claim 16, further comprising:
transmitting, to the receiver device, an indication of transmit parameters associated with transmitting the NDP, wherein the sensing measurement report is further responsive to the transmit parameters.

20. The method of claim 19, wherein the indication of the transmit parameters is transmitted over the wireless channel in a null data packet announcement (NDPA), and the NDPA indicates a type of sensing measurement report requested by the transmitter device.

21. The method of claim 20, wherein the NDPA indicates whether the receiver device is to use the transmit parameters when generating the sensing measurement report.

22. The method of claim 16, further comprising:
transmitting, to the receiver device at a time indicated by the NDP, a frame soliciting the sensing measurement report.

23. The method of claim 22, wherein transmissions of the NDP, the frame, and the sensing measurement report are scheduled in the availability window on the wireless channel.

24. The method of claim 16, wherein the NDP indicates one or more of conditions under which the receiver device is to generate the sensing measurement report or conditions under which the receiver device is to delay transmission of the sensing measurement report.

25. A wireless communication device, comprising:
a processing system that includes one or more processors and one or more memories coupled with the one or more processors, the processing system configured to cause the wireless communication device to:
output parameters for a sensing operation on a wireless channel with a receiver device, the parameters indicating an availability window;
output a null data packet (NDP) configuring the receiver device to perform sensing measurements on the wireless channel; and
obtain, from the receiver device, a sensing measurement report according to the availability window, the sensing measurement report comprising channel state information (CSI) values responsive to at least the NDP.

26. The wireless communication device of claim 25, wherein the processing system is further configured to cause the wireless communication device to:
output an indication of transmit parameters associated with transmitting the NDP, wherein the sensing measurement report is further responsive to the transmit parameters.

27. The wireless communication device of claim 26, wherein the indication of the transmit parameters is transmitted over the wireless channel in a null data packet announcement (NDPA), and the NDPA indicates a type of sensing measurement report requested by the wireless communication device.

28. The wireless communication device of claim 27, wherein the processing system is further configured to cause the wireless communication device to:
  output, to the receiver device at a time indicated by the NDP, a frame soliciting the sensing measurement report.

29. The wireless communication device of claim 28, wherein output of the NDP, output of the frame, and transmission of the sensing measurement report are scheduled in the availability window on the wireless channel.

30. The wireless communication device of claim 29, wherein a duration of the availability window corresponds to a processing time of the receiver device.

* * * * *